(12) United States Patent
Elbaz et al.

(10) Patent No.: US 11,755,189 B2
(45) Date of Patent: Sep. 12, 2023

(54) SYSTEMS AND METHODS FOR SYNTHETIC DATA GENERATION

(71) Applicant: Datagen Technologies, Ltd., Tel Aviv (IL)

(72) Inventors: Gil Elbaz, Caesarea (IL); Jonathan Laserson, Tel Aviv (IL); Hadas Sheinfeld, Tel Aviv (IL)

(73) Assignee: DATAGEN TECHNOLOGIES, LTD., Tel Aviv (IL)

( * ) Notice: Subject to any disclaimer, the term of this patent is extended or adjusted under 35 U.S.C. 154(b) by 0 days.

(21) Appl. No.: 17/849,308

(22) Filed: Jun. 24, 2022

(65) Prior Publication Data
US 2023/0131916 A1 Apr. 27, 2023

Related U.S. Application Data

(60) Provisional application No. 63/271,323, filed on Oct. 25, 2021.

(51) Int. Cl.
*G06F 3/04847* (2022.01)
*G06F 16/54* (2019.01)
*G06F 3/0482* (2013.01)

(52) U.S. Cl.
CPC ........ *G06F 3/04847* (2013.01); *G06F 3/0482* (2013.01); *G06F 16/54* (2019.01)

(58) Field of Classification Search
CPC ..... G06F 3/0482; G06F 3/04847; G06F 16/54
See application file for complete search history.

(56) References Cited

U.S. PATENT DOCUMENTS

| 11,188,790 B1* | 11/2021 | Kumar | G06V 40/103 |
| 2018/0024705 A1* | 1/2018 | Silano | G06F 3/0484 |
| | | | 715/720 |
| 2018/0068019 A1* | 3/2018 | Novikoff | G06F 16/739 |
| 2019/0156151 A1* | 5/2019 | Wrenninge | G06F 18/214 |
| 2020/0342242 A1* | 10/2020 | Avidan | G06F 18/2155 |
| 2021/0097346 A1* | 4/2021 | Tremblay | G06N 3/045 |
| 2021/0201565 A1* | 7/2021 | Dibra | G06T 19/00 |
| 2021/0312244 A1* | 10/2021 | Atsmon | G06N 3/006 |

* cited by examiner

*Primary Examiner* — Seth A Silverman
(74) *Attorney, Agent, or Firm* — FINNEGAN, HENDERSON, FARABOW, GARRETT & DUNNER LLP

(57) ABSTRACT

A non-transitory, computer-readable medium includes instructions that causes at least one processing device to display a graphical user interface (GUI) configured to facilitate generating a synthetic dataset including a plurality of images. The GUI includes a dataset size selector to receive user input to indicate a number of images to generate and include in the synthetic dataset; a target object type selector to receive user input indicative of at least one selected target object type to feature in the synthetic dataset; one or more image parameter variability controls to receive user input indicative of at least one variation to include in the synthetic dataset relative to target object representations generated based on the at least one selected target object type; and a dataset generation control to initiate generating the synthetic dataset. The synthetic dataset is generated according to the size input, target object type input, and variability input.

78 Claims, 15 Drawing Sheets

SYSTEMS AND METHODS FOR SYNTHETIC DATA GENERATION

CROSS-REFERENCE TO RELATED APPLICATIONS

This application claims priority to U.S. Provisional Application No. 63/271,323, filed on Oct. 25, 2021, the entirety of which is hereby incorporated by reference.

FIELD

This disclosure relates to the generation of synthetic data. In some embodiments, the synthetic data may represent image data that includes a plurality of images representative of one or more object types. The representations of the one or more object types in the plurality of images may be selectively varied based on user input.

BACKGROUND

Machine learning models are utilized in solving many repetitive tasks. One of the main requirements for machine learning models to work effectively is to be trained using high-quality datasets. Traditionally, training datasets are generated by capturing image data and manually labeling (annotating) the captured image data. Such traditional methods of training data generation are both expensive and time-consuming. Further, in many situations finding or generating training data may be difficult. For example, due to privacy concerns and regulations, generating training data in a healthcare setting may be difficult or impossible. Still further, in many cases, training data sets may lack highly variant data representative of potential outlier or rare scenarios.

Thus, there is a need for technological systems designed to generate synthetic training data sets. Such synthetic data sets may be generated quickly, may be automatically annotated, and may offer selective control over a multitude of variation types that may be applied relative to the generated synthetic data.

SUMMARY

A non-transitory computer-readable media, systems, and methods to facilitate generation of a synthetic dataset including a plurality of images. The non-transitory computer readable medium includes instructions that, when executed by at least one processing device, cause the at least one processing device to perform operations to provide on a display at least one graphical user interface configured to facilitate generation of a synthetic dataset including a plurality of images. The at least one graphical user interface may include a dataset size selector configured to receive a size input from a user indicative of a number of images to generate and include in the plurality of images of the synthetic dataset; a target object type selector configured to receive a target object type input from the user indicative of at least one selected target object type to feature in the synthetic dataset; one or more image parameter variability controls configured to receive one or more variability inputs from the user indicative of at least one variation to include in the synthetic dataset relative to target object representations generated based on the at least one selected target object type; and a dataset generation control configured to receive an initiate generation input from the user and, in response, initiate generation of an output including the synthetic dataset, wherein the synthetic dataset is generated according to the size input, target object type input, and variability input received from the user.

A non-transitory computer-readable media, systems, and methods to facilitate generation of a synthetic dataset including a plurality of images. The non-transitory computer readable medium may include instructions that, when executed by at least one processing device, cause the at least one processing device to perform operations. The operations may include providing on a display at least one graphical user interface configured to facilitate generation of a synthetic image dataset including a plurality of images. The at least one graphical user interface may include a sample image upload interface configured to enable a user to identify one or more sample images to be uploaded. A size input may be received from a user via a dataset size selector associated with the graphical user interface. The size input may be indicative of a number of images to generate and include in the plurality of images of the synthetic image dataset. The identified one or more sample images may be uploaded to the system. The one or more sample images may be analyzed to automatically identify one or more camera characteristics associated with an image capture device used to acquire the one or more sample images. The synthetic image dataset including the plurality of images may be generated based on the identified camera characteristics and the size input.

A non-transitory computer readable media, systems, and methods to facilitate generation of a synthetic dataset including a plurality of images. The non-transitory computer readable medium may include instructions that, when executed by at least one processing device, cause the at least one processing device to perform operations. The operations may include providing on a display at least one graphical user interface configured to facilitate generation of a synthetic image dataset including a plurality of images. The at least one graphical user interface includes a sample image upload interface configured to enable a user to identify one or more sample images to be uploaded. A size input is received from a user, via a dataset size selector associated with the graphical user interface, the size input being indicative of a number of images to generate and include in the plurality of images of the synthetic image dataset. The identified one or more sample images are uploaded. The one or more sample images are analyzed to automatically identify at least one target object represented in the one or more sample images. At least one semantic relationship between the at least one target object and one or more additional objects is determined. The synthetic image dataset is generated, including the plurality of images based on the identified at least one target object, the at least one semantic relationship, and the size input.

A non-transitory computer-readable media, systems, and methods facilitate generation of a synthetic dataset including a plurality of images. For example, in an exemplary embodiment, a non-transitory computer readable medium may include instructions that, when executed by at least one processing device, cause the at least one processing device to perform operations. The operations may include providing to a machine learning model a test dataset including a plurality of images; receiving from the machine learning model an output including one or more predicted labels associated with each of the plurality of images; comparing the one or more predicted labels associated with each of the plurality of images to a set of predetermined test labels associated with the plurality of images; detecting one or more inaccuracies associated with the machine learning model performance based on observed differences between the one or more predicted labels and the set of predetermined test labels; and automatically generating a training dataset including a plurality of training images, wherein one or more image characteristics associated with the plurality of training images are determined based on the detected one or more inaccuracies.

BRIEF DESCRIPTION OF DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
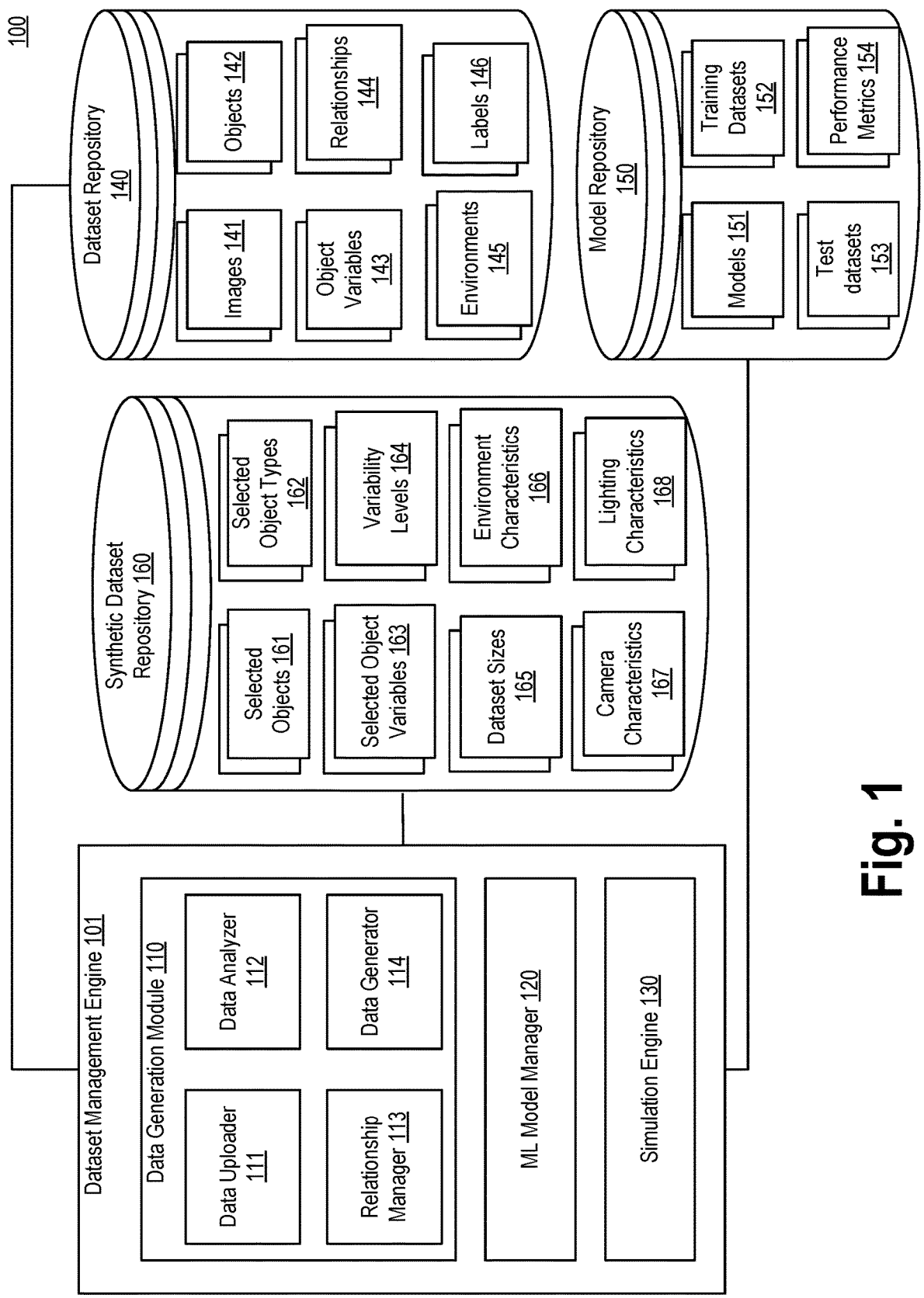
FIG. 1 is a block diagram showing various exemplary components of a system for synthetic dataset generation, according to some embodiments of the present disclosure.

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof may occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms, thus, cover both active forms, and passive forms, of sending and receiving.

In some embodiments, a graphical interface tool (a GUI tool) may provide users with a self-serve synthetic data generation capability. With this tool, users may be able to bypass significant bottlenecks associated with acquisition of actual data and annotation of the acquired data, which is a process that traditionally required months of time and significant investment to complete. The synthetic data may be used to train machine learning systems.

The GUI tool may offer various controls and inputs for use in generating synthetic image data. For example, if the synthetic image data includes humans, the tool may provide a variety of controls to select different characteristics (e.g., age, gender, pose, or facial expression) and a number, percentage, or range (e.g., a range of percentage values) of the generated synthetic data set that should have each of the possible characteristics. By providing the controls with respect to various characteristics, the resulting generated synthetic data set may display a variety of characteristics that are automatically and accurately labeled.

As another example, the tool may provide control to enable the user to determine lighting and background options for the generated synthetic image data. For example, the user may choose between an indoor setting, an outdoor setting, and varying light levels in each setting. The lighting and background options may be in addition to foreground objects (e.g., humans). In another example, there may be a differentiation between a "target object" (i.e., an object that the ML model is to be trained on) and a "non-target object" (i.e., an object that may typically appear in an image with the target object, but that the ML model does not train on).

As another example, camera specifications may be input via the tool and used as a basis for generating the synthetic image data. For example, a user may specify any one or more of a camera orientation, resolution, field of view (FOV), aspect ratio, camera sensor size, camera sensor type, wavelength sensitivity range, etc. Alternatively, sample images from a specific camera may be loaded and used as a basis for generating the synthetic image data (e.g., from a similar viewpoint, resolution, etc.). For example, if the user wants to generate a synthetic data set to train an image recognition algorithm for a camera mounted in a parking lot, the user may upload sample images from the security camera into the tool and the tool may automatically extract the camera parameters (e.g., resolution, orientation, FOV, etc.) to help generate example images that the camera might actually take. By generating a synthetic data set that more closely matches the actual operating environment of the camera, associated image recognition systems (e.g., machine learning systems) may be better trained. For example, if an actual camera of interest is mounted three meters above ground level, the performance of an associated machine learning system (e.g., neural network) may be improved if trained using at least some training data simulating a capture location approximately three meters above ground level, rather than from other capture heights (e.g., ground level, 10 meters, etc.).

The GUI tool may be used to initiate an upload process for receiving any number of images or portions of images. The GUI tool may be used to automatically generate representations of objects or environments at least partially represented in the received images for storage in an object library. The uploaded images may also be used as the basis for or as a guide for generation of the synthetic datasets. For example, an uploaded image may be used as a template and controls may be provided to the user to make adjustments for the generated synthetic data set based on target objects and non-target objects in the uploaded image. For example, if a human is standing in front of a car, the human may be designated as the target object and the car may be designated as the non-target object. The tool may provide controls such that a user may selectively cause the system to generate synthetic image data including variations relative to the target object (e.g., the human) and relative to the non-target objects (e.g., the car). Providing such controls enables a more robust synthetic data set to be generated which may improve the training (and performance) of an ML model.

The GUI tool may accept variability parameters for use in controlling attributes of the generated synthetic image data, including, for example clutter level of the background of an image, lighting type, lighting direction, time of day, lighting source color, room dimensions, room type, object types to include, object types to exclude, level of variability associated with included object types, etc.

The GUI tool may include a preview region or window that provides the user with a preview of renderings of the synthetic image data the system will produce based on the parameter selections and input received. For example, based on the parameter selections made by the user, the preview region may provide an example image of the type of images to be generated. If the user finds the example image to be an acceptable example, the user may proceed to enable the system to generate the full synthetic data set. If the user does not find the example image to be an acceptable example, the user may further adjust the parameter selections and the example image may be updated in real-time to reflect the changes in the parameter selections.

FIG. 1 is a block diagram showing various exemplary components of a system for synthetic dataset generation, according to some embodiments of the present disclosure. As illustrated in FIG. 1, system 100 includes a dataset management engine 101 that may be configured to communicate with various repositories 140, 150, 160 that store datasets and machine learning models trained using datasets.

Dataset management engine 101 may include software programs, such as a data generation module 110 configured to generate datasets, a machine learning (ML) model manager 120 configured to train machine learning models using generated datasets, and a simulation engine 130 configured to simulate the data (e.g., image data) to be generated in one or more synthetic datasets.

Data generation module 110 may include multiple software programs to process input datasets to generate synthetic datasets. A data uploader 111 may be configured to upload example data (e.g., example images) into data generation module 110. A data analyzer 112 may be configured to analyze uploaded images to help prepare an initial dataset to generate synthetic datasets. A relationship manager 113 may be configured to determine various relationships of objects present in uploaded images and to maintain relationships between objects in generated synthetic datasets. A data generator 114 may be configured to generate synthetic datasets by varying objects and adjusting object properties.

Data uploader 111 may be configured to upload datasets including, e.g., training images or three-dimensional (3D) models of objects and environments upon which synthetic datasets may be generated. Uploaded datasets (e.g., images) may be used in the development of training datasets by ML model manager 120 to train machine learning models. In some embodiments, uploaded datasets (e.g., images) may be used to evaluate the performance of machine learning models trained by ML model manager 120. Data generation module 110 may process uploaded datasets (e.g., images) and automatically extract information that may be used in generating one or more synthetic datasets. For example, object representations may be extracted. Additionally or alternatively, information representative of object-to-object relationships or object-to-environment relationships may also be automatically determined based on analysis of uploaded images. Data generation module 110 may store extracted image portions and information in dataset repository 140.

Data uploader 111 may be configured to upload various image files, including two-dimensional image files such as JPEG and BMP files and vector files such as SVG. In some embodiments, data uploader 111 may allow the upload of 3D representations, such as CAD drawing renderings, 3D vector images, etc. In some embodiments, data uploader 111 may accept motion images such as videos, GIFs, etc.

Data uploader 111 may be used to upload complete files, such as full image files. In some embodiments, data uploader 111 may be used to extract a portion of files to be uploaded (e.g., images) before including them in dataset repository 140. For example, data uploader 111 may selectively extract the identified image portions for inclusion in dataset repository 140. The user may select a portion of an image to be uploaded to dataset repository 140. In some embodiments, data uploader 111 alone or with the GUI tool (shown in FIG. 3) may automatically select portions of uploaded images to use as an initial dataset to generate a synthetic dataset. Data uploader 111 may automatically select portions of uploaded images based on the training subject for a machine learning (ML) model. For example, if an ML model needs to be trained to identify cats, data uploader 111 may crop cats from uploaded images. Data uploader 111 may use a specialized ML model to select and extract portions of uploaded images to prepare an initial dataset to generate synthetic datasets.

In some embodiments, the GUI tool (shown in FIG. 3) may provide different tools to select portions of uploaded images manually. Data uploader 111 may use other components of data generation module 110 to select portions of uploaded images and store selected portions in dataset repository 140.

Data uploader 111 may store uploaded images with details of selected portions embedded in them for initial dataset generation. For example, data uploader 111 may store coordinates of the portion of the image without cropping the image. In some embodiments, data uploader 111 may store the start and stop frames of motion images along with the uploaded motion images. In some embodiments, data uploader 111 may include time stamps of the start and stop points of motion images (such as videos) along with uploaded motion images.

Data analyzer 112 may be configured to analyze uploaded images to help prepare an initial dataset to generate synthetic datasets to train ML models. Data analyzer 112 may use an ML model to analyze uploaded images to identify objects. Data analyzer 112 may analyze various objects and their properties, including environment, background, lighting, and camera characteristics, to store in dataset repository 140. Data analyzer 112 may be configured to work in conjunction with data uploader 111 to help identify portions of uploaded images to prepare the initial dataset.

Relationship manager 113 may be configured to determine various relationships of objects present in images uploaded using data uploader 111 and analyzed to identify objects using data analyzer 112. Relationship manager 113 may use ML models to determine relationships between various objects and usages of objects. Relationship manager 113 may store determined relationships as relationships 144 in dataset repository 140.

Relationship manager 113 may also be configured to maintain relationships between objects in generated synthetic datasets. Relationship manager 113 may include an ML model to be trained to understand relationships and maintain them. For example, relationship manager 113 may review uploaded images of restaurants to understand the relationship between tables and chairs and maintain the relationship of chairs surrounding tables in the generated synthetic dataset.

Data generator 114 may be configured to generate synthetic datasets based on initial datasets prepared by data uploader 111 and data analyzer 112. Data generator 114 may be configured to generate a synthetic dataset by varying objects and adjusting object properties identified by data analyzer 112 and relationships between objects determined by relationship manager 113. Data generator 114 may be configured to work in conjunction with simulation engine 130 to present a simulation of a synthetic dataset to be generated by data generator 114.

ML model manager 120 may be configured to manage various ML models in model repository 150 by training the models using available datasets in dataset repository 140 and synthetic dataset repository 160. ML model manager 120 may be configured to connect with data generation module 110 to generate additional datasets to help further train ML models.

In some embodiments, ML model manager 120 may be configured to review the trained ML models to determine the behavior of each ML model stored in model repository 150 using test datasets. ML model manager 120 may be configured to review determined behavior for any discrepancies and request data generator 114 for a specialized synthetic dataset to resolve behavior discrepancies in a previously trained ML model. ML model manager 120 may be configured to continuously make synthetic dataset generation requests to train an ML model further until a set criterion for ML model behavior is met. ML model manager 120 may be configured to check if ML model behavior is within a set threshold of set behavior criteria. For example, an ML model to detect animals may have a set criteria threshold of detecting animals correctly in at least eight out of ten dataset images.

ML model manager 120 may be configured to review ML models based on trigger events, train ML models, and test their efficiency. In some embodiments, ML model manager 120 trigger events may cause ML model manager 120 to interact with data generation module 110 to generate new datasets for training ML models.

Trigger events may occur at set intervals of times. In some embodiments, trigger events may occur based on the behavior of ML models (e.g., models 151) in model repository 150. For example, a trigger event may occur if the effectiveness of an ML model falls below a set threshold value. In some embodiments, system 100 may allow a user to set trigger events manually. For example, ML model manager 120 may request a review of models at set time intervals. ML model manager 120 may automatically review ML models upon updates to synthetic datasets associated with an ML model.

Simulation engine 130 may be configured to simulate the generation of synthetic datasets based on set criteria for generating synthetic datasets. Simulation engine 130 may be configured to operate and display results in real-time or near real-time to display the effects of changing input data to generate synthetic datasets. Simulation engine 130 may also be configured to aid in determining minimum or maximum values of various criteria based on user input of a value for a single criterion. For example, a user of system 100 may adjust various inputs to generate synthetic datasets to observe when a certain change in value no longer results in a change in the synthetic dataset.

Dataset repository 140, model repository 150, and synthetic dataset repository 160 are shown in FIG. 1 as separate entities. In some embodiments, the repositories 140, 150, 160 may be separate entities. In some embodiments, the repositories 140, 150, 160 may be stored as a single entity or as portions of a single entity. For example, dataset repository 140, model repository 150, and synthetic dataset repository 160 each may be an SQL database or NoSQL database, such as those developed by MICROSOFT™, REDIS, ORACLE™, CASSANDRA, MYSQL; various other types of databases; data returned by calling a Web-based service; data returned by calling a computational function, retrieving sensor data, retrieving data from Internet of Things (IoT) devices, or various other data sources.

Dataset repository 140 may be configured to store data that is used or generated during the operation of applications, such as data generation module 110. Dataset repository 140 may provide initial seed data to generate synthetic datasets, and data generation module 110 may be configured to retrieve previously identified objects and their relationships of an initial dataset stored in dataset repository 140. For example, dataset repository 140 may store images 141, objects 142, object variables 143, relationships between objects 144, environments 145, and labels 146.

Images 141 may include various images, including images uploaded to system 100 using data uploader 111. Data analyzer 112 and relationship manager 113 may take images 141 as input to identify various objects (e.g., objects 142) and their meta information (e.g., object variables 143, relationships 144, environments 145) as identified and retrieved from images 141. Images 141 may include details about portions of images 141 to extract objects and their meta information. For example, images 141 may include coordinates of still images and/or frames of motion images to be analyzed to generate an initial dataset. In some embodiments, images 141 may be used as queries to retrieve initial datasets for generating synthetic datasets. For example, images 141 may include objects used to retrieve additional objects from objects 142 matching objects in images 141.

Objects 142 may include various real-world entities with identification and descriptions (e.g., labels 146). Objects 142 may include parts of other objects, such as head, body, arms, etc. of a human or an animal. Objects 142 may include values of various characteristics of objects defined using object variables 143.

Object variables 143 may include variables used to define metadata of objects 142. Object variables 143 may include dependency information between various variables defining characteristics of objects 142. Object variables 143 may include default values of various variables associated with objects 142. In some embodiments, object variables 143 may have different default values based on objects 142. Default values of object variables 143 may also vary based on relationships between object variables 143.

Relationships 144 may include semantic relationships between objects 142. Semantic relationships may include the orientation and placement of objects 142 in relation to each other. For example, relationships 144 may define chair objects to surround a table object to indicate an open restaurant. As another example, relationships 144 may include an additional relationship of chair objects placed upside down on table objects to indicate a closed restaurant. While both scenarios may represent valid semantic relationships, other relationships (e.g., a chair positioned with four legs contacting the top of a table, or a table resting on a single chair, etc.) may be recognized as non-standard semantic relationships.

Environments 145 may define environments used in the background and foreground of objects 142 in images 141. Data analyzer 112 may obtain environments 145 from images 141. In some embodiments, images 141 may solely represent environments 145. In some embodiments, an image 141 may include objects 142 and some unobstructed background portion considered to be an environment and stored in environments 145. In some embodiments, a user of system 100 may define portions of an image 141 to store as environments 145. In some embodiments, system 100 may automatically identify environments in images 141 by outlining objects 142 to remove the objects to store the rest of images 141 as environments 145.

Environments 145 may include descriptions of places and locations of the places. Environments 145 may include descriptions based on visible entities such as objects 142. For example, an image 141 with a grass object may be defined as an outdoor environment 145, and an image 141 of a place with walls may be defined as an indoor environment 145. Environments 145 may include a description of the environment based on other non-visible entities such as lighting characteristics including a number of light sources, orientations of the light sources, positions of the light sources, and types of light sources.

Environments 145 may define classes of environments present in the background and foreground of images 141. Environment classes may be defined based on the presence of certain objects or types of objects 142 in images 141. For example, a place with "net" type objects and "people" type objects on either side and surrounded by "people" type objects may be considered as a stadium class environment.

In some embodiments, classes of environments 145 may be defined by relationships 144 between objects 142 present in images 141. Object relationships may result in considering environments 145 in images 141 to be part of multiple classes of environments. For example, a place with "table" type objects and "chair" type objects with "chair" type objects in a surrounding relationship to "table" type objects may be considered to be part of a "restaurant" class environment and a "convention center" class environment. As another example, a place with "chair" type objects placed upside down on top of "table" type objects may still be defined as a "restaurant" class environment.

Labels 146 may include additional metadata about objects 142. Labels 146 may identify objects 142 by name. In some embodiments, labels 146 may be provided manually by a user of system 100 to identify objects 142. In some embodiments, labels 146 may be applied automatically to an unlabeled object if it is in a same class of labeled objects of objects 142. Classes of objects 142 may be defined based on any one or more of: shape, structure, or function. For example, forks and spoons of different styles and sizes may be grouped under a cutlery object class.

Labels 146 may also include descriptions of environments 145. System 100 may determine the description of environments 145 based on objects 142 present in images 141. For example, an image of a place with several "table" type objects and "people" type objects sitting on "chair" type objects around "table" type objects may be identified as a "restaurant" class environment and may include the label "restaurant." In some embodiments, system 100 may be configured to identify "food" type objects on "table" type objects to identify a "restaurant" class environment as an "Italian" or a "Mexican" restaurant class environment and add an extra label (e.g., as a second label or as a hierarchically structured label) or replace the generic "restaurant" label with a more specific "Italian restaurant" or "Mexican restaurant" label. In some embodiments, labels 146 associated with environments 145 may be arranged in a hierarchical relationship. In the above examples, the "Mexican restaurant" label may be located under a generic "restaurant" label. Hierarchy of labels 146 may help identify unlabeled environments and objects and apply the label that mostly closely matches. In some embodiments, types of objects may identify an environment. For example, a place with "barstool" type objects surrounding tables with food and drinks on them may be identified as a "bar" class environment instead of a "restaurant" class environment.

Model repository 150 may be configured to store ML models 151, training datasets 152 for the ML models, test datasets 153 for the ML models, and performance metrics 154 for the ML models.

Models 151 may include machine-learning (ML) or other artificial intelligence (AI) algorithms that undergo a training or learning phase before being released into production. During such a training or learning phase, the algorithms may be tuned to focus on specific variables, reduce error margins, or otherwise optimize their performance. Models 151 with ML or AI algorithms may be input with a wide variety of data, such as an initial dataset of uploaded images and/or generated synthetic datasets.

Training datasets 152 may include synthetic datasets generated by data generation module 110 and stored in synthetic dataset repository 160. In some embodiments, training datasets 152 may include additional datasets generated based on automatic requests received from ML model manager 120. Training datasets 152 may be updated at regular intervals or upon receiving a new synthetic dataset.

In some embodiments, ML model manager 120 may request training datasets 152 to be updated upon receiving updates to an ML model 151. Synthetic training datasets 152 may include an index of the generated data (e.g., images). The index may be a separate electronic file included along with the image data of synthetic datasets. In some embodiments, the index may include an identification of target objects and non-target object included in each image of the generated synthetic dataset.

In some embodiments, system 100 may use the output of models 151 to generate a new dataset or supplement a synthetic dataset of training datasets 152. For example, system 100 may identify certain objects, characteristics, or conditions that an ML model 151 failed to identify and use that information to generate additional training images featuring a variety of the types of objects, characteristics, or conditions that the model 151 failed to identify.

Test datasets 153 may include datasets with pre-determined labels (e.g., labels 146) obtained from user entries. Test datasets 153 may be validated by users of system 100 and may have been used to train models 151 previously. Test dataset 153 may be used as input to generate variations of objects and environments to generate a synthetic dataset and include that generated synthetic dataset in training datasets 152. In some embodiments, a test dataset 153 may be synthetically generated by varying object variables (e.g., object variables 143) of objects in training images forming a synthetic dataset. System 100 may vary object variables such as size, shape, orientation, degree of overlap with other objects, occlusion level among objects, clutter level around objects, environment, background surrounding objects, lighting characteristics, or camera characteristics. In some embodiments, test datasets 153 may include a mix of real and synthetic datasets.

Performance metrics 154 may include results of one or more test datasets 153 applied to models 151. ML model manager 120 may review performance metrics 154 associated with an ML model 151 to determine if one or more training datasets 152 need to be updated. In some embodiments, performance metrics 154 may be presented to a user of system 100 to decide whether to generate additional training datasets and what kind of training datasets to generate. ML model manager 120 may review performance metrics 154 associated with an ML model 151 to present needs to a user for generating a new synthetic dataset to train and improve the performance of the ML model.

In some embodiments, system 100 may test the performance of models 151 trained with training datasets 152. Training datasets 152 may be rated and adjusted based on the change in performance of models 151 post-training with training datasets 152. For example, synthetic datasets of training datasets 152 may be characterized automatically based on the types of objects, conditions, etc., represented in training images, and no manual annotations are needed. By populating the generated images of a synthetic dataset, system 100 has information about what is included in the images. Accordingly, with that information, trained ML models 151 may be benchmarked and store the benchmark results as performance metrics 154. In some embodiments, the generated images may be supplied to a trained ML model 151, for example, to determine whether the trained ML model 151 can accurately identify objects, conditions, etc., for which it was trained to identify and/or to verify that the trained model 151 is unbiased.

Synthetic dataset repository 160 may be configured to store various data relating to the generated synthetic datasets. For example, synthetic dataset repository 160 may include selected objects 161, selected object types 162, selected objects variables 163, variability levels 164, dataset sizes 165, environment characteristics 166, camera characteristics 167, and lighting characteristics 168.

Figure 3:
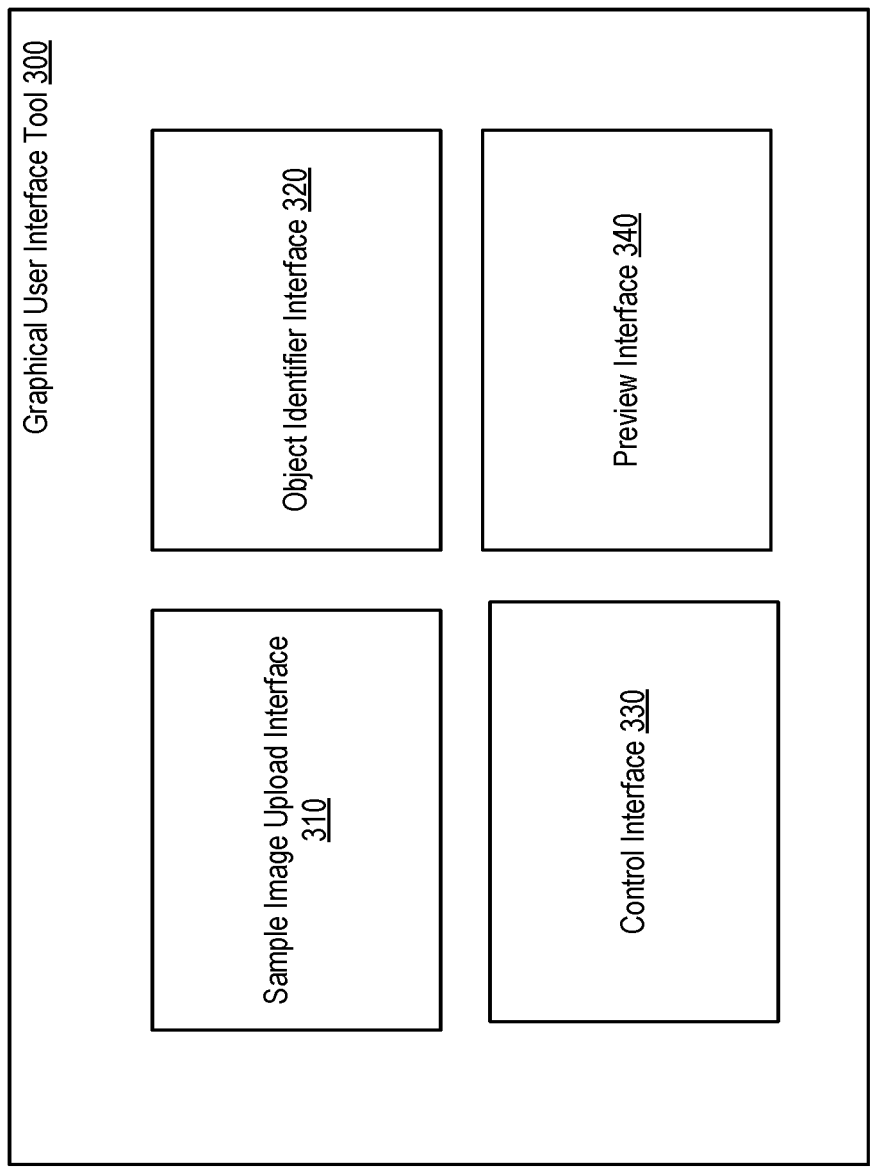
FIG. 3 illustrates an exemplary embodiment of graphical user interface, according to some embodiments of the present disclosure.

Selected objects 161 may include a set of objects selected by a user of system 100. A user may select objects using GUI tool 300 (as shown in FIG. 3). Selected object types 162 may include a list of types of objects to be included in training datasets 152 generated by system 100. In some embodiments, selected object types 162 may include categories of groups of selected objects 161.

Selected objects variables 163 may define various characteristics of selected objects 161. Selected objects variables 163 and their values may depend on the objects selected by a user of system 100 for generating synthetic datasets. In some embodiments, system 100 may set default values for selected objects variables 163 based on selected objects 161 and selected object types 162. Data structures used to store selected objects variables 163 may include a single value or multiple values based on the type of parameters associated with a variable of selected objects variables 163.

Variability levels 164 may define minimum and/or maximum values of selected objects variables 163. Variability levels 164 may also include values set for selected objects variables 163 of selected objects 161 and selected object types 162. Variability levels 164 may be stored as numerical values or as a formula, which may be used to determine a range of values based on other input values. In some embodiments, some of the variability levels 164 may act as inputs to other variability levels 164 and may help calculate the range of values associated with selected objects variables 163 of selected objects 161.

Dataset sizes 165 may define a number of images of a synthetic dataset to be generated by data generator 114. Dataset sizes 165 may be set based on selected objects 161, selected object types 162, selected objects variables 163, and variability levels 164. In some embodiments, images 141 uploaded using data uploader 111 may help set a minimum and/or maximum value for dataset sizes 165.

Environment characteristics 166 may include environment information and may define environment constraints when generating a synthetic dataset. For example, environment characteristics 166 may include indoor, outdoor, and mixed spaces. In some embodiments, environment characteristics 166 may also define whether the selected scene is an urban or rural environment.

Camera characteristics 167 may define various camera sources that can capture selected objects 161 and environments. Camera characteristics 167 may also define types of cameras (e.g., point and shoot, DSLR, mirrorless, video camera, etc.), camera settings (e.g., ISO, shutter speed), lens type (telephoto lens, macro lens, prime lens, zoom lens), and lens settings (focal length, aperture, etc.). In some embodiments, camera characteristics 167 may also include the position and orientation of camera sources.

Synthetic dataset generation requests that include motion images, such as 3D simulations and videos, may require timing of camera sources. For example, camera characteristics 167 may include a point in time and a length of time when a camera source needs to be turned on and any variations to camera settings, lens settings, position, and orientation during the specified length of time. Camera characteristics 167 may be associated with variability levels 164 to define timing and variations in camera and lens settings, camera position, and camera orientation with time.

System 100 may set camera characteristics 167 using values of automatically extracted camera parameters of sample images (e.g., images 141) uploaded via data uploader 111. System 100 may access camera parameters from Exchangeable Image File format (EXIF) information associated with files of uploaded sample images. In some embodiments, system 100 may employ ML models to extract camera parameters and their values from images 141. System 100 may use camera characteristics 167 using extracted camera parameter values to generate data (e.g., images) that match the extracted camera parameter values to include in a synthetic dataset. In some embodiments, system 100 may use the extracted camera parameter values to generate images with camera characteristics whose values may fall within a variability range around extracted camera characteristics values. In some embodiments, camera characteristics may vary across images 141. System 100 may determine an average of certain camera characteristics in uploaded sample images (e.g., images 141). The averages may be used in determining and/or applying a variability range to extracted camera parameters from uploaded sample images. In some embodiments, system 100 may randomize the variability of a parameter within a particular variability range.

Lighting characteristics 168 may define various light sources that can be used to illuminate selected objects 161 and environments. Lighting characteristics 168 may include types of light, for example, incandescent or LED. In some embodiments, lighting characteristics 168 may include color temperature, light source position, and light source orientation. In some embodiments, datasets including motion images, such as 3D simulations and videos, may require timing of light sources. For example, lighting characteristics 168 may include a point in time and a length of time when a light source needs to be turned on and any variations in color temperature, light source position, and light source orientation with time. Lighting characteristics 168 may be associated with variability levels 164 to define timing and variations in color temperature, light source position, and light source orientation with time.

Figure 2:
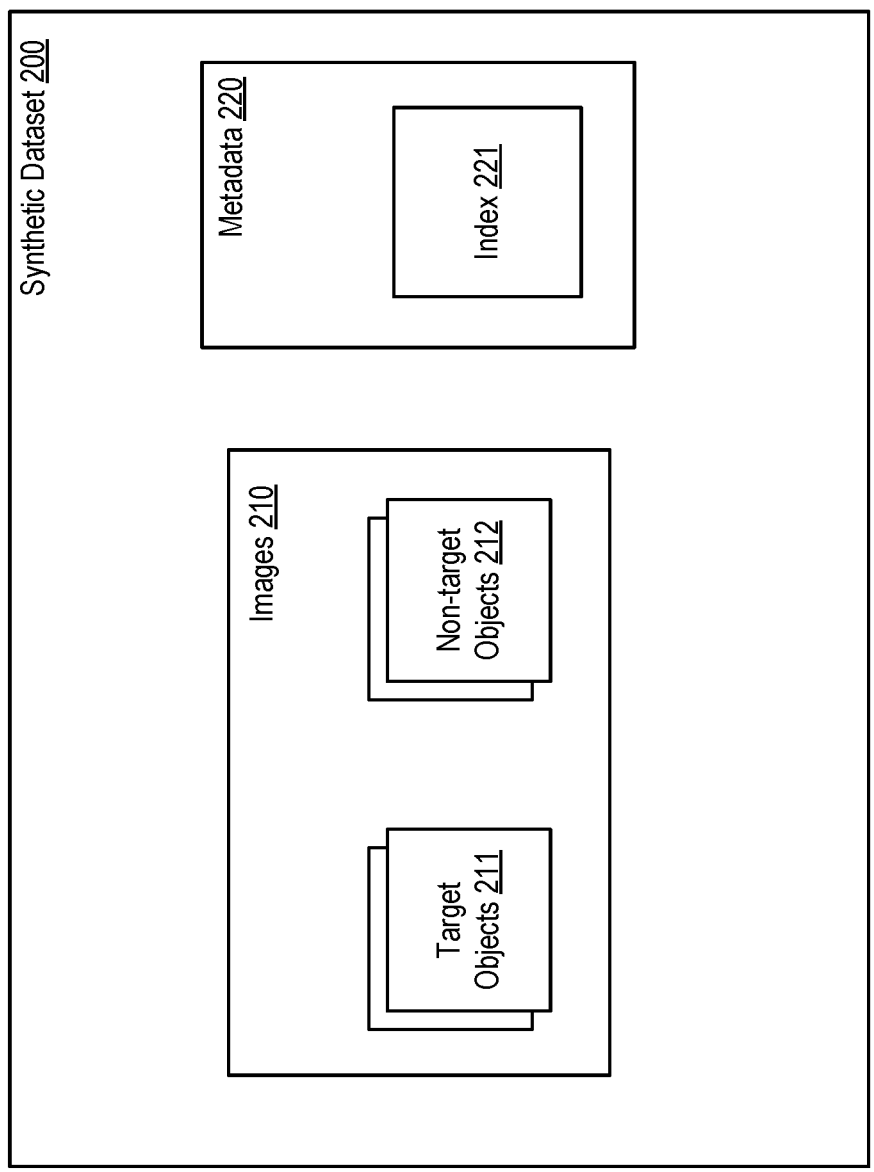
FIG. 2 illustrates an exemplary embodiment of synthetic dataset, according to some embodiments of the present disclosure.

FIG. 2 illustrates an exemplary embodiment of a synthetic dataset 200, according to some embodiments of the present disclosure. Synthetic dataset 200 may include data and other metadata describing or connecting multiple entities present in data. Synthetic dataset 200 may be generated by system 100 using data generation module 110. Synthetic dataset 200 may be stored in training datasets 152 or in synthetic data repository 160.

Synthetic dataset 200 may include images 210 and metadata 220. Images 210 may include target objects 211 and non-target objects 212. Metadata 220 may include an index 221 of images 210 for quick lookup of images 210 to train ML models 151. Index 221 may include an index of selected objects 161, such as target objects 211 and non-target objects 212 in images 210. In some embodiments, index 221 may include an index of selected object types 162 of target object types and non-target object types. In some embodiments, metadata 220 may include image capture data, such as camera characteristics 167 and lighting characteristics 168.

FIG. 3 illustrates an exemplary embodiment of a Graphical User Interface (GUI) tool 300, according to some embodiments of the present disclosure. GUI tool 300 may be configured to connect with components of data generation module 110 to receive input data and to generate synthetic datasets (e.g., synthetic dataset 200). In some embodiments, GUI tool 300 may be a Web-based application accessed using a browser application available on a computing device (e.g., computing device 400 described in connection with FIG. 4). In some embodiments, GUI tool 300 may be an application installed locally on a computing device (e.g., computing device 400).

GUI tool 300 components may include a sample image upload interface 310 configured to upload images into GUI tool 300, an object identifier interface 320 configured to select a subset of input data, a control interface 330 configured to receive user input on various controls to adjust data, and a preview interface 340 configured to preview output data.

Sample image upload interface 310 may be configured to help select input data (for example, static images and motion images) to upload using data uploader 111 and store as images 141. Sample image upload interface 310 may be presented as a screen within GUI tool 300, a window overlaying GUI tool 300, or an independent window. Sample image upload interface 310 may include a drag-and-drop window or other user interface element to select sample images from a file listing from a directory stored on a local computing device (e.g., computing device 400) displaying GUI tool 300. In some embodiments, file listing may display a directory present on a cloud, such as Google Drive, Microsoft OneDrive, Amazon S3, Dropbox, etc.

In some embodiments, sample images may be portions of image files listed in file directories shown by sample image upload interface 310. Sample image upload interface 310 may include a window to display contents of image files and allow selection of portions of images as sample images. Portions of displayed image files may be selected using a snapshot tool by drawing a rectangular region using a mouse pointer or other pointing device. In some embodiments, a user of GUI tool 300 may select portions of displayed image files using a lasso tool to draw a freehand outline of the portion using a mouse pointer or other pointing device. Sample image upload interface 310 may include a text field to enter coordinates to select portions of displayed image files. In some embodiments, image files may be motion images, and sample images may be a clipped portion of the motion images defined by a start time and an end time or a start frame and an end frame in the motion images. In some embodiments, sample image upload interface 310 may be configured to work with object identifier interface 320 to select portions of uploaded sample images.

In some embodiments, system 100 may be configured to analyze sample images (e.g., images 141) uploaded using sample image upload interface 310 and automatically determine selected objects 161 and selected object types 162. System 100 may also be configured to automatically determine selected object types 162 based on objects present in sample images uploaded using sample image upload interface 310.

Object identifier interface 320 may be configured to help identify objects in sample images uploaded using sample image upload interface 310. System 100 may be configured to automatically identify objects in uploaded sample images and confirm identified objects by presenting them to a user of GUI tool 300 using object identifier interface 320. In some embodiments, object identifier interface 320 may show uploaded sample images for a user to select objects in uploaded sample images. Object identifier interface 320 may include a snapshot tool to choose a portion of the sample image, including an object of interest. Object identifier interface 320 may include a lasso tool to draw an outline around an object of interest in uploaded sample images. In some embodiments, object identifier interface 320 may include a text field to supply coordinates of a portion of a sample image containing an object of interest. Object identifier interface 320 may store selected objects in selected objects 161.

Object identifier interface 320 may be used to identify target objects (e.g., target objects 211) among various objects present in uploaded sample images. System 100 may be configured to tag all objects in uploaded sample images other than identified target objects as non-target objects (e.g., non-target objects 212). In some embodiments, object identifier interface 320 may be used to tag identified objects as target objects 211 and non-target objects 212. Object identifier interface 320 may send identified objects to dataset repository 140 to store as objects 142 for use in the future. In some embodiments, object identifier interface 320 may provide a text field to type a class of objects or a dropdown list (or similar user interface element) to select a class of objects from objects 142 to include in images (e.g., images 210) of a synthetic dataset (e.g., synthetic dataset 200). Object identifier interface 320 may store the selected object class as selected object types 162 in synthetic dataset repository 160.

Control interface 330 may be configured to aid in generating variations of objects and environments presented in sample images or selected by a user of GUI tool 300. Control interface 330 may be configured to store variations as selected objects variables 163. Control interface 330 may be configured to store a range of variations of selected objects variables 163 in variability levels 164. Control interface 330 may be configured to store variations to the environment and capture circumstances as environment characteristics 166, camera characteristics 167, and/or lighting characteristics 168. Control interface 330 may be configured to present user interface widgets to set values for the above-mentioned various characteristics.

Preview interface 340 may be configured to aid in previewing synthetic datasets (e.g., training datasets 152) generated by system 100. Preview interface 340 may randomly select an image in images 210 of synthetic dataset 200 for a user of GUI tool 300 to preview. Preview interface 340 may be configured to provide preview images 210 of synthetic dataset 200 based on selected objects variables 163 and values set for object variables 143 in variability levels 164 using control interface 330. Preview interface 340 may provide live feedback of an impact to target objects 211 and non-target objects 212 in images 210 based on values set for selected objects variables 163 using control interface 330.

In some embodiments, preview interface 340 may be configured to select multiple images of synthetic dataset 200 based on different values of object variables 143 in a range of values set by a user of GUI tool 300. Preview interface 340 may include a navigation tool to navigate between various preview images of a synthetic dataset. For example, preview interface 340 may include a slider element or a carousel element to quickly seek a different image of a synthetic dataset to preview.

Figure 4:
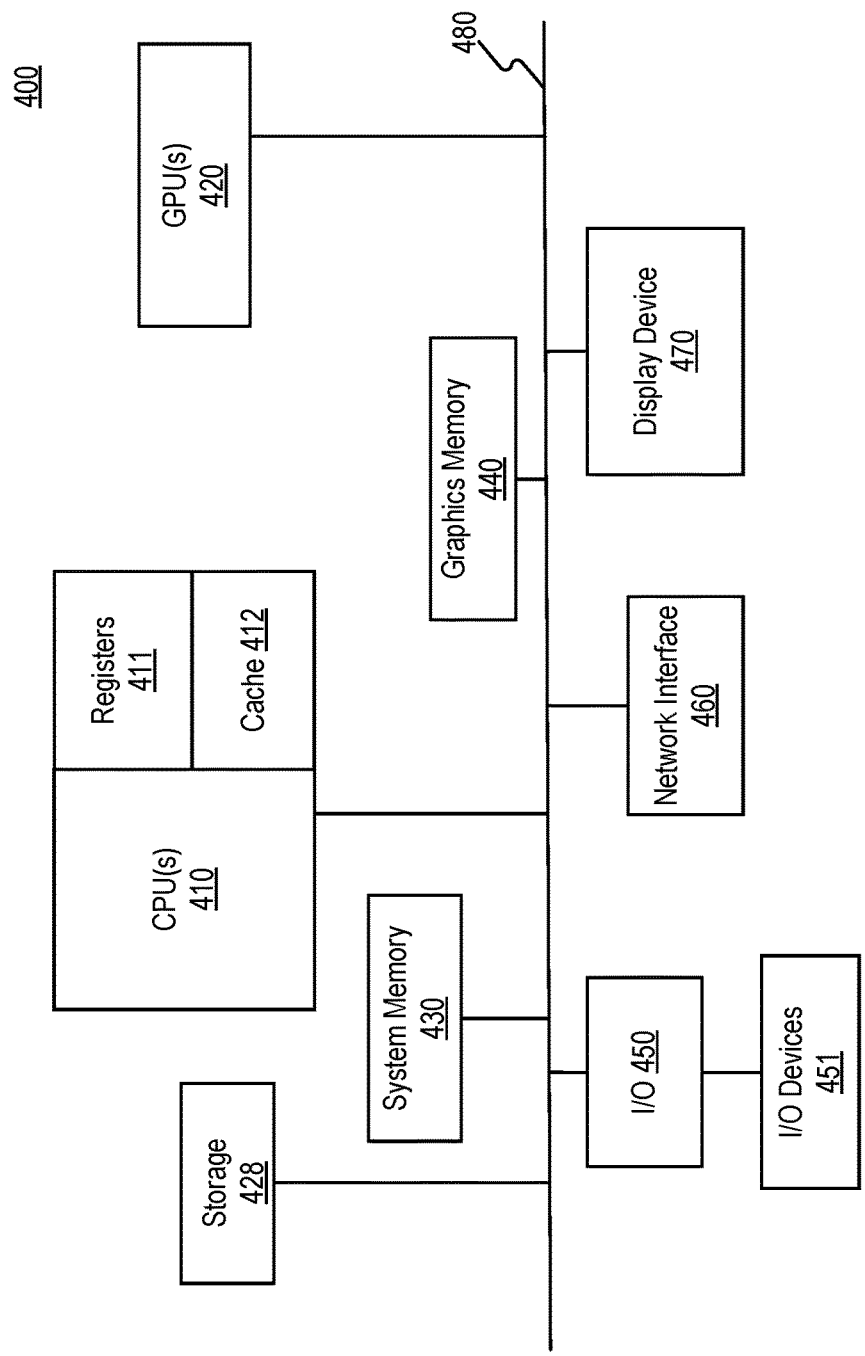
FIG. 4 is a block diagram of an exemplary computing device used to implement a system such as the system of FIG. 1, according to some embodiments of the present disclosure.

FIG. 4 is a block diagram of an exemplary computing device 400, consistent with embodiments of the present disclosure. In some embodiments, computing device 400 may be a specialized server or other computing resource providing the functionality described herein. In some embodiments, components of system 100, such as dataset management engine 101, dataset repository 140, model repository 150, and synthetic dataset repository 160 of FIG. 1, may be implemented using computing device 400 or multiple computing devices 400 operating in parallel. Further, computing device 400 may be a second device providing the functionality described herein or receiving information from a server to provide at least some of the described functionality. Moreover, computing device 400 may be an additional device or devices that store or provide data consistent with embodiments of the present disclosure and, in some embodiments, computing device 400 may be a virtualized computing device such as a virtual machine, multiple virtual machines, or a hypervisor.

Computing device 400 may include one or more central processing units (CPUs) 410 and a system memory 430. Computing device 400 may also include one or more graphics processing units (GPUs) 420 and a graphics memory 440. In some embodiments, computing device 400 may include a headless computing device that does not include GPU(s) 420 or graphics memory 440.

CPUs 410 may be single or multiple microprocessors, field-programmable gate arrays (FPGAs), or digital signal processors (DSPs) capable of executing sets of instructions stored in a register (e.g., one of registers 411), a cache (e.g., cache 412), or a memory (e.g., system memory 430). CPUs 410 may contain one or more registers (e.g., registers 411) for storing various types of data including, inter alia, data, instructions, floating-point values, conditional values, memory addresses for locations in memory (e.g., system memory 430 or graphics memory 440), pointers and counters. CPU registers 411 may include special-purpose registers used to store data associated with executing instructions such as an instruction pointer, an instruction counter, or a memory stack pointer. System memory 430 may include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 430 may be one or more memory chips capable of storing data and allowing direct access by CPUs 410. System memory 430 may be any type of random-access memory (RAM), or other available memory chip capable of operating as described herein.

CPUs 410 may communicate with system memory 430 via a system interface 480, sometimes referred to as a bus. In embodiments that include GPUs 420, GPUs 420 may include any type of specialized circuitry that may manipulate and alter memory (e.g., graphics memory 440) to provide or accelerate the creation of images. GPUs 420 may have a highly parallel structure optimized for processing large, parallel blocks of graphical data more efficiently than general-purpose CPUs 410. Furthermore, the functionality of GPUs 420 may be included in a chipset of a special purpose processing unit or a co-processor.

CPUs 410 may execute programming instructions stored in system memory 430 or other memory, operate on data stored in memory (e.g., system memory 430), and communicate with GPUs 420 through system interface 480, which bridges communication between the various components of computing device 400. In some embodiments, CPUs 410, GPUs 420, system interface 480, or any combination thereof, may be integrated into a single chipset or processing unit. GPUs 420 may execute sets of instructions stored in memory (e.g., system memory 430), to manipulate graphical data stored in system memory 430 or graphics memory 440. For example, CPUs 410 may provide instructions to GPUs 420, and GPUs 420 may process the instructions to render graphics data stored in the graphics memory 440. Graphics memory 440 may be any memory space accessible by GPUs 420, including local memory, system memory, on-chip memories, and hard disk. GPUs 420 may enable displaying of graphical data stored in graphics memory 440 on a display device 470 or may process graphical information and provide that information to connected devices through input/output (I/O) interface 450 or network interface 460.

Computing device 400 may include I/O devices 451 (e.g., a keyboard, a mouse, or a pointing device) connected to I/O interface 450 and display device 470. I/O interface 450 may communicate with the other components of computing device 400 via system interface 480. It should now be appreciated that CPUs 410 may also communicate with system memory 430 and other devices in manners other than through system interface 480, such as through serial communication or direct point-to-point communication. Similarly, GPUs 420 may communicate with graphics memory 440 and other devices in ways other than system interface 480. In addition to receiving input, CPUs 410 may provide output via I/O devices 451 (e.g., through a printer, speakers, or other output devices).

Computing device 400 may include a network interface 460 to interface to a local area network (LAN), wide area network (WAN), metropolitan area network (MAN), or the Internet through a variety of connections including, but not limited to, standard telephone lines, LAN or WAN links (e.g., 802.21, T1, T3, X.25), broadband connections (e.g., ISDN, Frame Relay, ATM), wireless connections (e.g., those conforming to WiFi (i.e., 802.11a, 802.11b, 802.11b/g/n, 802.11ac, etc.) Bluetooth, Bluetooth LTE, 3GPP, or WiMax standards), or some combination of any or all of the above. Network interface 460 may include a built-in network adapter, a network interface card, a PCMCIA network card, a card bus network adapter, a wireless network adapter, a USB network adapter, a modem, or any other device suitable for interfacing computing device 400 to any type of network capable of communication and performing the operations described herein.

Graphical User Interface (GUI) Tool for Generating Customized Synthetic Data

FIGS. 5-12 illustrate various exemplary implementations of GUI tool 300 (e.g., as a Web-based application, a desktop application, or an application deployed on any suitable computing platform), to configure and generate synthetic datasets (e.g., synthetic dataset 200), according to exemplary disclosed embodiments.

Figure 5:
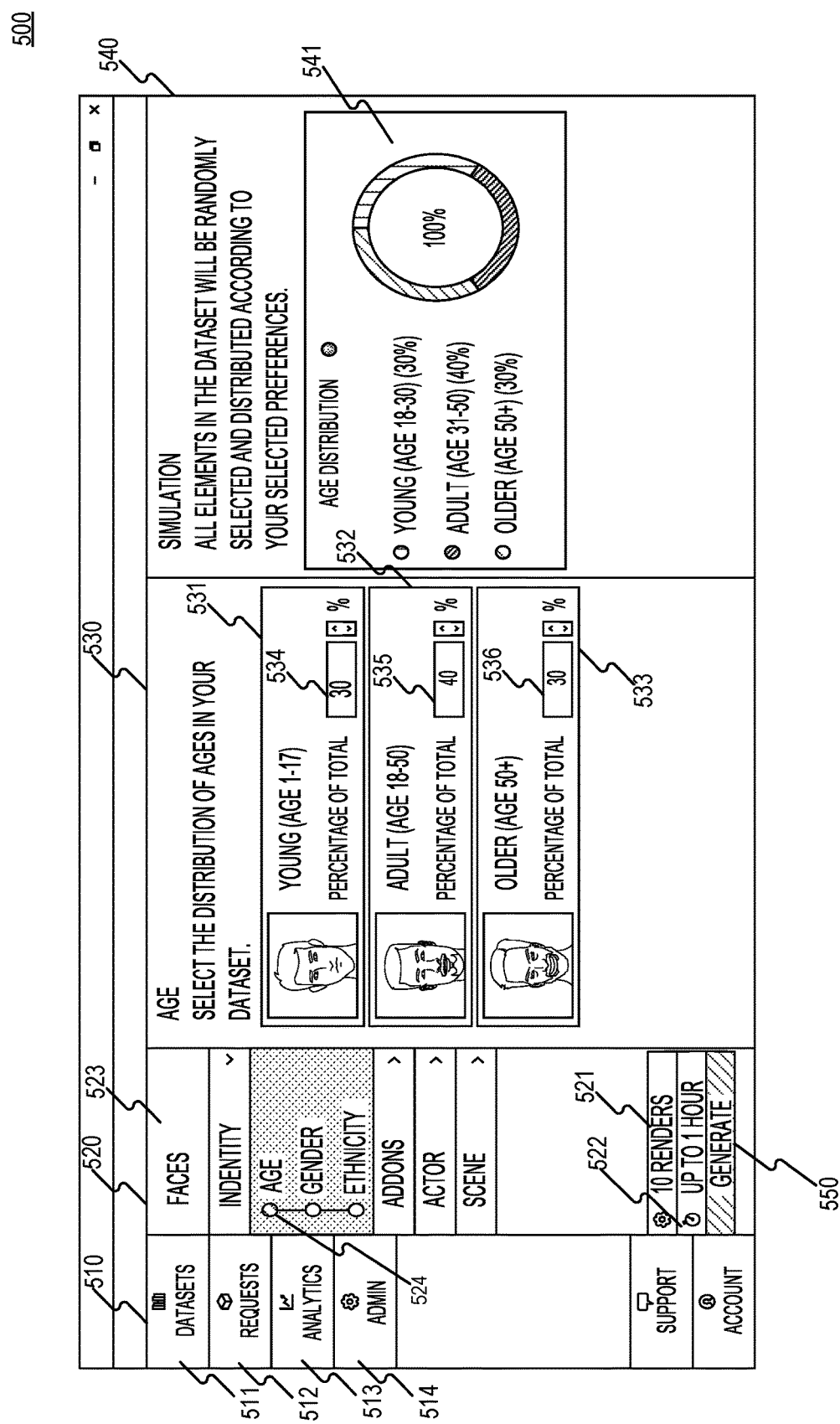
FIG. 5 illustrates an exemplary user interface including input controls for use in generating synthetic datasets, according to some embodiments of the present disclosure.

FIG. 5 illustrates an exemplary GUI tool 500 including input controls for use in generating synthetic datasets (e.g., synthetic image datasets), according to some embodiments of the present disclosure. GUI tool 500 may present different panes in a single display window with multiple GUI widgets to help generate synthetic datasets (e.g., synthetic dataset 200). In some embodiments, panes of GUI tool 500 each may be an independent display window. It is noted that the specific configuration of the panes (either as a single display window or multiple display windows) does not alter the operation of GUI tool 500. Each pane of GUI tool 500 may present a group of GUI widgets with related functionality. Panes of GUI tool 500 may include an action pane 510 configured to permit a user to select an action, a selector pane 520 configured to permit the user to select dataset characteristics, a control pane 530 configured to permit the user to adjust characteristics of the generated synthetic dataset, a preview pane 540 configured to permit the user to preview an exemplary image to be included in the generated synthetic dataset based on the user's input in selector pane 520 and control pane 530, and a dataset generation control 550 configured to initiate the generation of a synthetic dataset.

Action pane 510 may be configured to include general actions a user may perform while using system 100. The general actions may include datasets actions 511, requests actions 512, analytics actions 513, and administrative actions 514.

Datasets actions 511 may allow a user of GUI tool 500 to request the generation of a synthetic dataset (e.g., synthetic dataset 200). Upon selecting datasets actions 511, selector pane 520 presents a dataset size selector 521, a render time selector 522, an objects selector 523, and a characteristics selector 524.

Dataset size selector 521 may be configured to receive a numerical value of a number of images to generate as part of a request to generate a synthetic dataset (e.g., synthetic dataset 200). Dataset size selector 521 may be a text entry field used to set dataset sizes 165. In some embodiments, dataset size selector 521 may include a virtual slider bar to set dataset sizes 165. Other GUI elements may be implemented for dataset size selector 521.

Render time selector 522 may include a limit on a number of hours (or other unit of time) to render each image of images (e.g., images 210) of a synthetic dataset (e.g., synthetic dataset 200) or a total time to generate a synthetic dataset. In some embodiments, render time selector 522 may include the number of hours to generate an object selected using objects selector 523 to include in images (e.g., images 210) of a synthetic dataset (e.g., synthetic dataset 200). Longer rendering times may be associated with higher resolution images, for example.

Objects selector 523 may include one or more widgets for selecting objects (e.g., selected objects 161, selected object types 162) and characteristics of the object (e.g., selected objects variables 163) as characteristics selector 524. Object characteristics may be grouped and presented in selector pane 520. For example, if the user of GUI tool 500 selects a "faces" object type, selector pane 520 presents object characteristics in groups of "identity," "addons," "actor," and "scene." Each grouping of object characteristics may present a list of characteristics for selection. For example, if the user of GUI tool 500 selects the "identity" group of characteristics, the selector pane 520 presents three characteristics 524, "age," "gender," and "ethnicity." For example, if the user selects the "age" characteristic 524 of "faces" type object 523, options for the age characteristic may be displayed in control pane 530.

Selector pane 520 may constitute an example of object identifier interface 320 to identify objects in sample images (e.g., images 141) or select from existing objects 142 in dataset repository 140. Selector pane 520 may include an image uploader (e.g., sample image upload interface 310) to help upload image files and to select and extract objects, object surroundings, and other metadata from uploaded sample images. Selector pane 520 may request system 100 to automatically select and extract objects and objects' surroundings and other metadata, for example, by including a button or other user interface element to initiate the process. Selector pane 520 may use object identifier interface 320 to select objects and object surroundings.

Objects selector 523 may allow the selection of an object from existing objects (e.g., objects 142). Objects selector 523 may allow the selection of multiple objects to include in synthetic dataset 200. In some embodiments, objects selector 523 may select objects from uploaded images (e.g., images 141). GUI tool 300 may request system 100 to store objects selected by objects selector 523 as selected objects 161. In some embodiments, objects selector 523 may select a part of an object in an image of a synthetic dataset.

In some embodiments, objects selector 523 may allow the selection of object types from a list of object types presented as a dropdown menu or other user interface element. GUI tool 300 may request system 100 to store object types selected by objects selector 523 as selected object types 162. In some embodiments, objects selector 523 may be configured to receive a custom object type specified by a user of GUI tool 500. In some embodiments, the selected object type may be a custom object type not previously present in selected object types 162. A user of GUI tool 500 may define a custom object type based on objects in existing images 141 uploaded using sample image upload interface 310. Objects selector 523 may be configured to determine selected object types 162 based on an example object selected from uploaded sample images. In some embodiments, selected object types 162 may be determined based on objects selected from a list of objects (e.g., objects 142).

In some embodiments, selector pane 520 may be configured to allow selection of multiple objects and multiple object types. For example, objects selector 523 may list objects and object types with checkboxes to select multiple object and object types. System 100 may be configured to consider objects and object types selected using objects selector 523 as target objects (e.g., target objects 211) and target object types to include in images 210 of synthetic dataset 200. System 100 may be configured to automatically select objects from existing objects (e.g., objects 142) as non-target objects 212 and non-target object types to include in synthetic dataset 200. In some embodiments, system 100 may be configured to determine non-target objects 212 and non-target object types based on objects present in sample images 141. Target objects and non-target objects may be identified in sample images using any suitable image segmentation technique. Objects selector 523 may be configured to allow a user of GUI tool 500 to select non-target object types to include in images 210 of synthetic dataset 200.

Objects selector 523 may be configured to allow the designation of selected objects 161 as target objects 211 and non-target objects 212 to include in images 210 of synthetic dataset 200. In some embodiments, objects selector 523 may be configured to define requirements to designate objects as target objects and non-target objects. For example, a user of GUI tool 500 may configure objects selector 523 to designate objects that are not the primary focus of training an ML model trained to identify particular target object(s) as non-target objects. For example, if the ML model is being trained to recognize humans, objects selector 523 may be configured to designate any object that is not a human (e.g., an automobile or a tree) as a non-target object. In some embodiments, objects selector 523 may be configured to set a purpose of non-target object types to include in generated images 210 of synthetic dataset 200 having selected target objects and target object types. For example, a user of GUI tool 500 may select non-target objects and non-target object types for the purpose of background in generated images of synthetic datasets.

Selector pane 520 may be configured to include a separate non-target object type selector (not shown in FIG. 5) to select non-target objects and non-target object types to include in images 210 of synthetic dataset 200.

In some embodiments, GUI tool 500 may include an independent object type selector (not shown in the figures) configured to receive object type input from the user of GUI tool 500. In some embodiments, system 100 may allow the selection of multiple object types to generate objects to include in a synthetic dataset.

Control pane 530 may include different controls to control the generation of a synthetic dataset. For example, if the user selects the "age" characteristic 524, control pane 530 may display controls 531, 532, 533 to enable the user to select different percentages of an age distribution to be included in the generated synthetic dataset. As shown in FIG. 5, the controls may relate to different predefined groups, such as a young age (age 1-17) control 531, an adult age (age 18-50) control 532, and an older age (age 50+) control 533. Within each control 531-533, the user may be able to adjust values 534, 535, 536 using GUI elements, such as a text field, a text field with a discrete control, or a slider bar. In some embodiments where the values of the controls are percentages, the values may be automatically added such that the total of percentages does not exceed 100%. For example, upon setting two of the three values 534-536, the third value may be automatically determined such that the total does not exceed 100%.

Control pane 530 may include parameter variability controls, such as controls 531-533 and associated values 534-536, configured to receive input for parameters from the user to include variations of the target object representations to be generated in the synthetic dataset. In some embodiments, control pane 530 may also provide various controls for controlling the variability of selected non-target objects or non-target object types within the generated synthetic dataset.

Controls and parameters included in control pane 530 may depend on the selected object type using objects selector 523. For example, if human type object is selected using objects selector 523, then control pane 530 may present parameter variability controls for anatomical variations of eye color, eye shape, hair color, hair length, hair texture, face shape, weight, gender, height, skin tone, facial hair, or clothing to include in the generated synthetic dataset.

Figure 6:
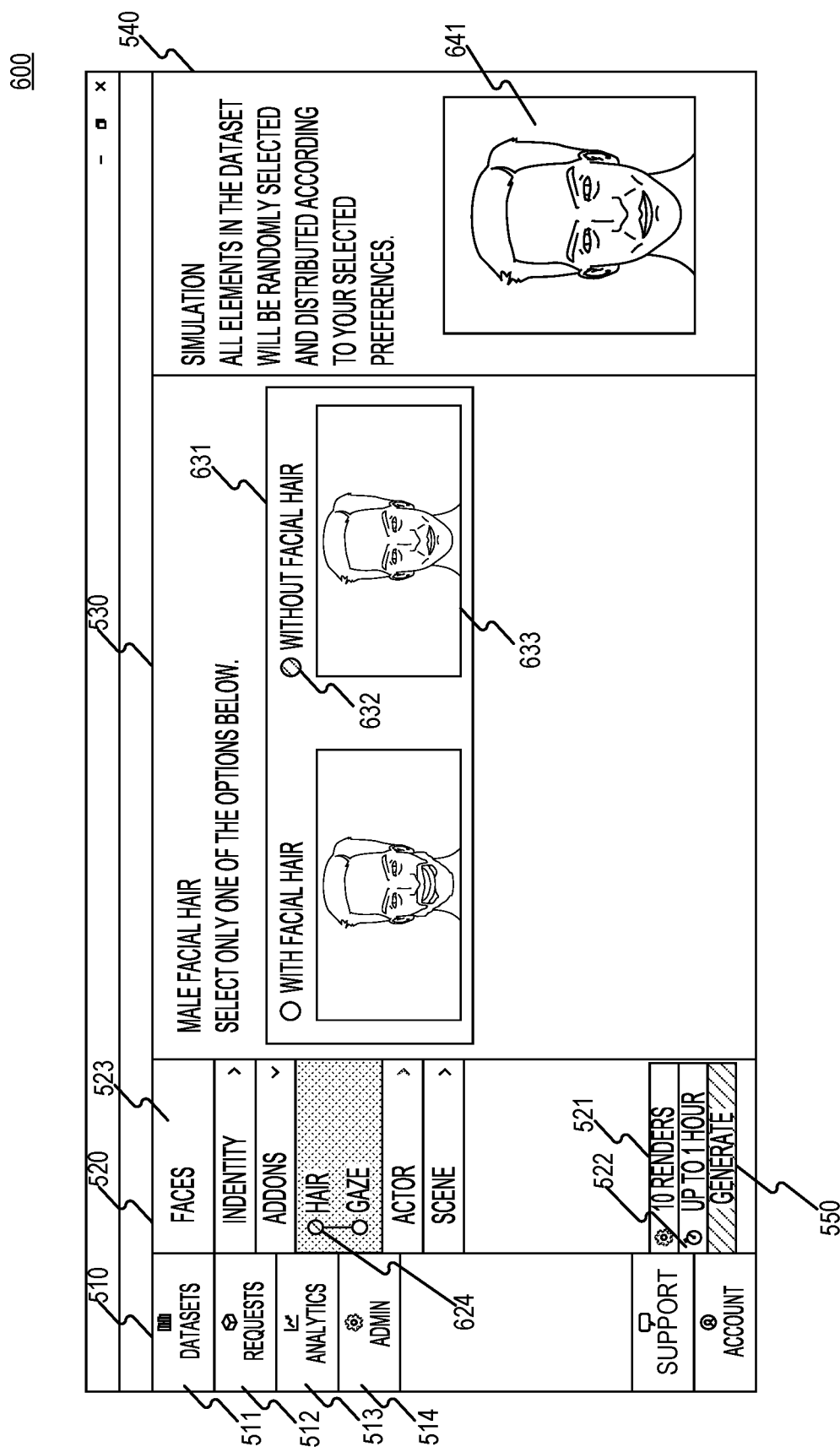
FIG. 6 illustrates an exemplary user interface including a preview capability, according to some embodiments of the present disclosure.

System 100 may be configured to automatically generate one or more controls in control pane 530 based on user input. For example, system 100 may automatically generate controls relevant to selected object types, including target object types using objects selector 523. For example, as shown in FIG. 5, GUI tool 500 may generate controls related to varying different parameters of facial features, such as age, facial hair, gaze, and mood. Such automatic generation and population may help avoid showing the user variability controls not applicable to a target object of interest. For example, values of one of three age parameters 534-536 may be adjusted based on updates to two of them so that the sum of percentages remains 100%. In some embodiments, a subset of available controls may be shown to the user, where the subset of controls may be generated based on input provided by the user in other controls. For example, as shown in FIG. 5, if the age parameter 531 (representing ages 1-18) is set to 100%, system 100 may automatically set facial hair parameter 632 (as shown in FIG. 6 and further described below) of control 631 to "without facial hair" or completely avoid showing the facial hair control 631.

While the user is adjusting the controls 531-533 in control pane 530, preview pane 540 may be updated in real-time or in near real-time to enable the user to see the results of adjusting the controls 531-533. For example, FIG. 5 shows an object summary 541 to show the age distribution of the "faces" type object based on the values 534-536 of controls 531-533. In some embodiments, object summary 541 may present the parameter values 534-536 in a readable format using graphics, such as a pie chart, a bar chart, or other data visualization format.

In some embodiments, preview pane 540 may include controls to provide inputs and show how the inputs may affect the generation of synthetic datasets. A user of GUI tool 500 may be able to preview the updated dataset that may be generated based on user selections of characteristics and adjustments to characteristics through the controls. Preview pane 540 may include samples of a synthetic dataset that may be generated by system 100. Preview pane 540 may include preview details of a requested synthetic dataset based on selected objects and adjusted characteristics. Preview details may summarize potential objects in images 210 of synthetic dataset 200.

Requests actions 512 may allow a user of GUI tool 500 to review the status of various requests to system 100. For example, requests actions 512 may preview the status of synthetic dataset 200 generation, including a current state (i.e., progressing, paused, canceled), percentage completed, and time remaining to complete generating synthetic dataset 200. In some embodiments, requests actions 512 may show the status of requests to train ML models, including a number of training datasets 152 to use to train machine learning models (e.g., models 151). In some embodiments, requests actions 512 may show the status of testing trained models for effectiveness using test datasets (e.g., test datasets 153).

Analytics actions 513 may present viewing analytics of generated synthetic datasets such as types of objects, resources consumed (e.g., time taken, money spent), etc. In some embodiments, analytics actions 513 may present analytics of testing ML models (e.g., models 151) such as level of effectiveness of ML models and gaps in training datasets (e.g., training datasets 152) to improve the level of effectiveness of ML models.

Administrative actions 514 may allow a user of GUI tool 500 to adjust administrative settings for generating synthetic datasets (e.g., synthetic dataset 200). Administrative settings may include types of synthetic datasets, subscription settings for using GUI tool 500 including user credentials, and subscription level and credits to generate synthetic dataset 200.

Dataset generation control 550 may be configured to initiate the generation of a synthetic dataset. As shown in FIG. 5, dataset generation control 550 may be implemented as a button. In some embodiments, dataset generation control 550 may be implemented as another user interface element type. While dataset generation control 550 is shown in FIG. 5 as part of selector pane 520, dataset generation control 550 may be placed at any location in GUI tool 500 without altering the operation of dataset generation control 550.

Upon activating dataset generation control 550, system 100 generates a synthetic dataset according to input values to object types, dataset size, and variability input received from a user of GUI tool 500 through objects selector 523, dataset size selector 521, parameters (e.g., parameters or values 534-536) of controls (e.g., controls 531-533) presented in control pane 530.

FIGS. 6-12 show other examples of GUI tool 500. To simplify the explanations of FIGS. 6-12, similar elements as those shown in FIG. 5 have the same reference numerals and the descriptions of those elements will not be repeated.

FIG. 6 illustrates an exemplary GUI tool 600 including a preview capability, according to some embodiments of the present disclosure. GUI tool 600 shows a different example of object characteristics that may be selected by the user and a preview of what images in the generated synthetic dataset 200 may look like. In object selector 523, the user has selected the "addons" object and the "hair" characteristic 624. Based on selecting the "hair" characteristic 624, control pane 530 displays a control 631 with control parameters 632 to permit the user to select between two different facial hair types, with facial hair or without facial hair. As shown in FIG. 6, control parameters 632 may be selected using radio buttons or other user interface elements (for example, checkboxes) to permit the user to make an exclusive selection between two or more options. As shown in FIG. 6, control 631 may be configured to display a sample image 633 to illustrate to the user what the different options may look like for the selected control parameter 632. In some embodiments, sample image 633 may be limited to display only what the different control parameters 632 may look like in the generated image. For example, if an outdoor environment background was selected by the user in a different selector, the outdoor environment background may not be displayed in sample image 633. The preview window feature may enhance the user experience and efficiency with which the synthetic datasets are generated. For example, allowing the user to see a preview of sample synthetic images to be generated based on a current set of user selections allows the user to determine (before the entire synthetic dataset is generated) whether the synthetic dataset will exhibit the user's desired characteristics.

In some embodiments, control parameters 632 may be based on previously selected control parameters for other controls. For example, as described above in connection with FIG. 5, if the user previously set age parameter 531 (representing ages 1-18) to 100%, system 100 may automatically set facial hair parameter 632 of control 631 to "without facial hair" or may avoid showing the facial hair control 631.

Preview pane 540 may be configured to show a preview image 641 to illustrate a sample image to be included in generated synthetic dataset 200 based on one or more other control parameters selected by the user, in addition to the selected control parameter 632. For example, if an outdoor environment background was selected by the user in a different selector, the outdoor environment background may be displayed in preview image 641. In some embodiments, preview image 641 may be based on randomly selected values for other parameters of other controls (i.e., for parameters of controls other than control 631). For example, if the user selected a combination of "adult" and "older" ages (controls 532 and 533 as shown in FIG. 5), preview image 641 may display an image showing a man with variable levels of gray hair and/or variable levels of hair loss.

Figure 7:
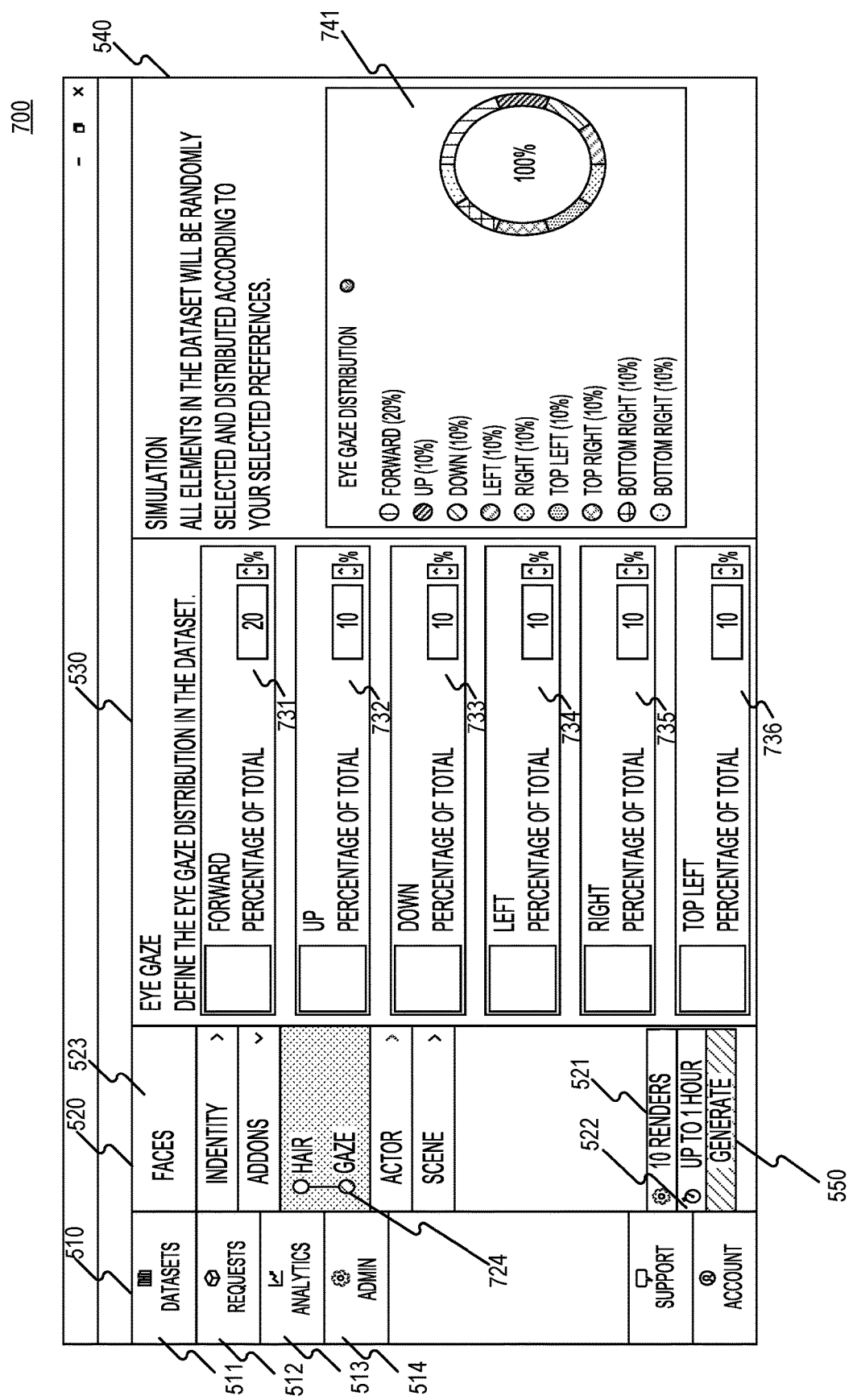
FIG. 7 illustrates an exemplary user interface with controls for indicating ranges of characteristic variations to include in generated synthetic datasets, according to some embodiments of the present disclosure.

FIG. 7 illustrates an exemplary GUI tool 700 with controls for indicating ranges of characteristic variations to include in generated synthetic datasets, according to some embodiments of the present disclosure. In object selector 523, the user has selected the "addons" object and the "gaze" characteristic 724. Based on selecting the "gaze" characteristic 724, control pane 530 displays several controls 731-736 for selecting possible directions that the eyes of the person in the sample image may be looking (e.g., forward, up, down, left, right, or top left) and a parameter value for a percentage of the images to include each characteristic. In some embodiments, a greater number of options may be provided. For example, if more than the six options shown for the gaze characteristic are possible, control pane 530 may include a user interface element such as a scroll bar to permit the user to view and select from additional gaze characteristic options. In some embodiments, different combinations of user interface elements may be used to enable the user to select from more options. For example, the gaze type may be implemented by a drop-down menu or selector list user interface element and the user may enter or select a percentage parameter value for each gaze type after the gaze type is selected via the drop-down menu or selector list. In some embodiments, the parameter values entered via controls 731-736 may be linked such that the combined total of the parameter values of controls 731-736 does not exceed 100%. Preview pane 540 may include an object summary 741 showing a data visualization of the values entered via controls 731-736. For example, object summary 741 may include a ring type chart (aka, a doughnut chart) and a table showing the corresponding values. In some embodiments, object summary 741 may include other types of data visualizations and may not include the corresponding table.

Figure 8:
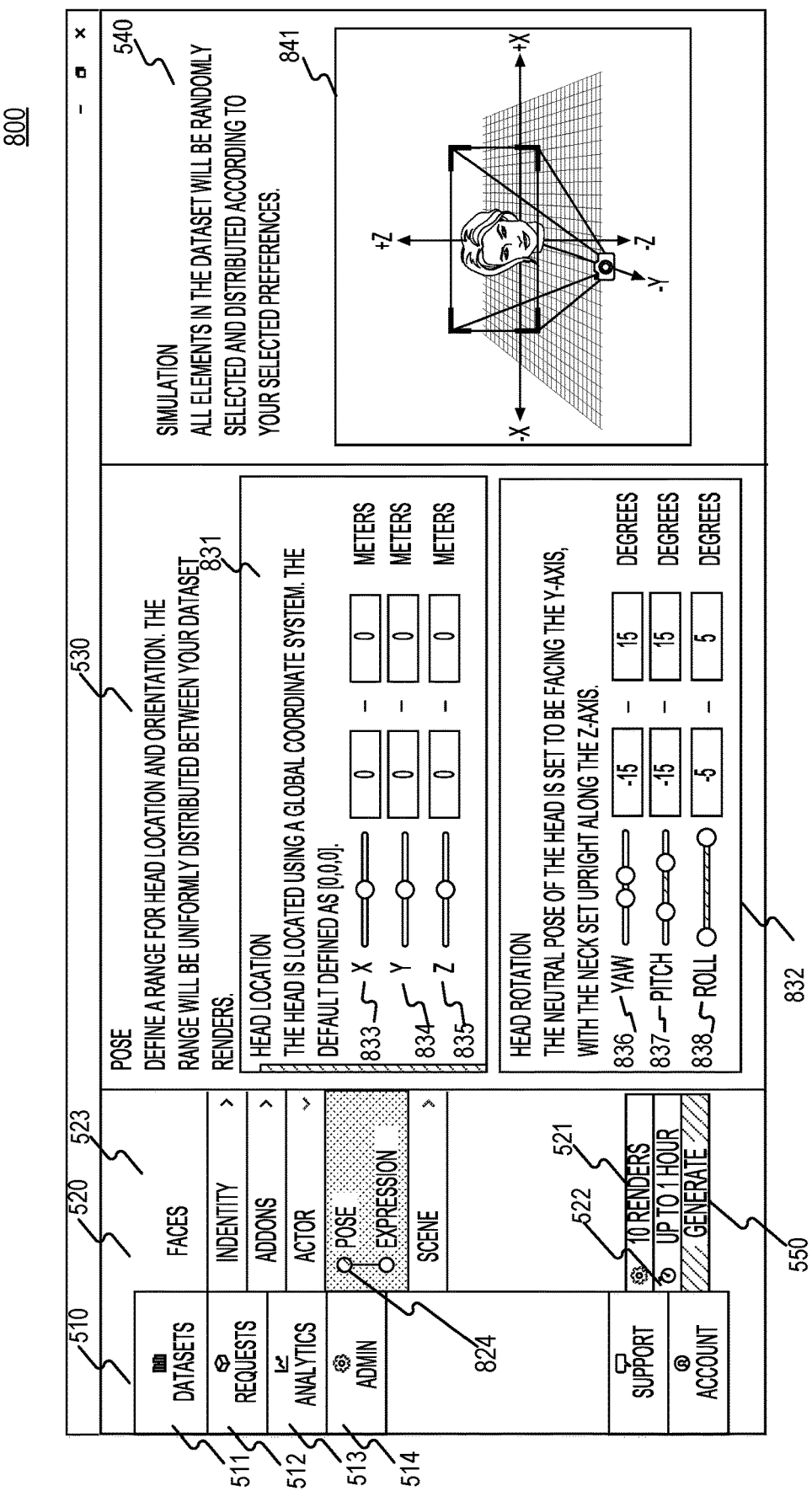
FIG. 8 illustrates an exemplary user interface with additional controls defining variations in target object orientation to include in generated synthetic datasets, according to some embodiments of the present disclosure.

FIG. 8 illustrates an exemplary GUI tool 800 with additional controls defining variations in target object orientation to include in generated synthetic datasets, according to some embodiments of the present disclosure. In object selector 523, the user has selected the "actor" object and the "pose" characteristic 824. Based on selecting the "pose" characteristic 824, control pane 530 displays a control 831 for selecting "head location" parameters and a control 832 for selecting "head rotation" parameters. Control 831 may be configured to include parameter value ranges 833-835 for the X, Y, and Z coordinates, respectively. Control 832 may be configured to include parameter value ranges 836-838 for yaw, pitch, and roll settings, respectively. Parameter value ranges 833-838 may be input via various user interface elements; for example, as shown in FIG. 8, slider bars with a single selector (parameter value ranges 833-835) or double selectors (parameter value ranges 836-838) may be used with adjacent text boxes.

To assist the user in visualizing the changes made to a sample image by adjusting parameter values 833-838, a preview image 841 shown in preview pane 540 may be updated in real-time such that the user may see the effect of changing one or more parameter values 833-838. In some embodiments, preview image 841 may be limited in that it may only show a portion of the image such that the user is better able to preview the changes made by adjusting parameter values 833-838 without being distracted by other elements included in the complete image in generated synthetic dataset 200.

In some embodiments, parameter value ranges 833-838 may initially be set with random values, to enable the user to get a better sense of how adjusting parameter value ranges 833-838 will affect the preview image 841. In some embodiments, parameter value ranges 833-838 may initially be set to zero, such that preview image 841 is displayed with "neutral" settings. In some embodiments, parameter value ranges 833-838 may initially be set based on prior selections made by the user for other parameter values for other controls.

Figure 9:
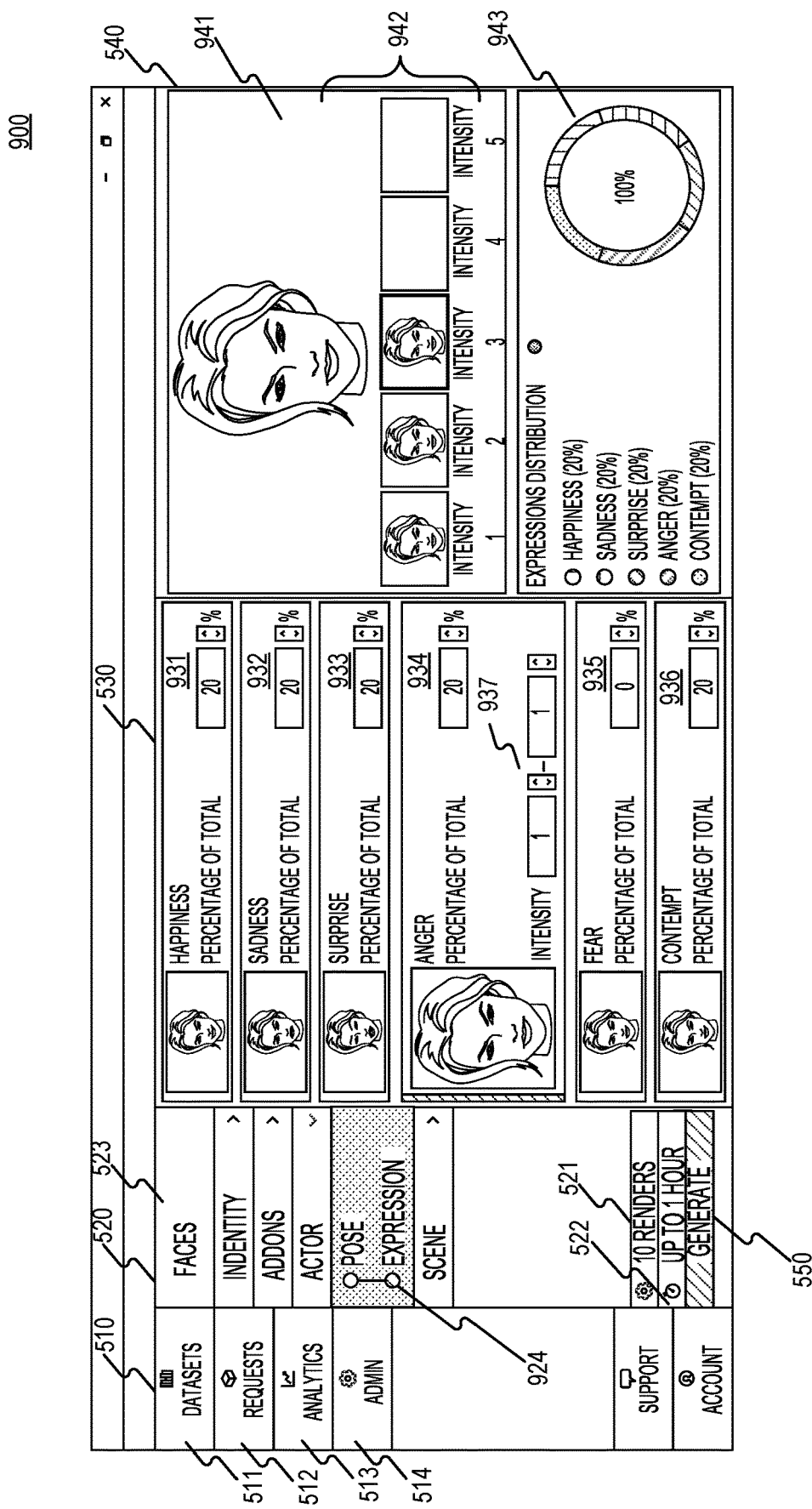
FIG. 9 illustrates an exemplary user interface with additional controls defining variations in expression of target object to include in generated synthetic datasets, according to some embodiments of the present disclosure.

FIG. 9 illustrates an exemplary GUI tool 900 with additional controls defining variations in expression of target object to include in generated synthetic datasets, according to some embodiments of the present disclosure. In object selector 523, the user has selected the "actor" object and the "expression" characteristic 924. Based on selecting the "expression" characteristic 924, control pane 530 displays controls 931-936 relating to different expressions that may appear on the face of the "actor" included in images in generated synthetic dataset 200. As shown in FIG. 9, the expression characteristics include "happiness" (control 931), "sadness" (control 932), "surprise" (control 933), "anger" (control 934), "fear" (control 935), and "contempt" (control 936). As shown, a numerical value (e.g., 20%, or any other value between 0 and 100 in this particular example) may be selected to designate the percentage of the total synthetic dataset to exhibit the selected emotion state (or other characteristic in other examples). It is noted that the expression characteristics shown in FIG. 9 are exemplary and that fewer, more, or different expression characteristics may be included in control pane 530.

Upon selecting certain controls, a sub-control may be displayed as part of the selected control. As shown in FIG. 9, the user has selected the "anger" expression characteristic (control 934) which displays an "intensity" parameter 937. The "intensity" parameter 937 may include a selectable range of the intensity of the facial expression characteristic. The "intensity" parameter 937 may be selected via a user interface element such as a text box, a text box with a corresponding selector, or other user interface element that permits the user to select a range of values. Such parameter values may also be selected using other interface elements, such as slider bars, up/down arrows, etc.

Preview pane 540 includes a preview image 941, an intensity preview 942, and an object summary 943 showing a data visualization of the values entered via controls 931-936. To assist the user in visualizing the changes made to a sample image by adjusting parameter values 931-936, the preview image 941 may be updated in real-time. In some embodiments, preview image 941 may be limited in that it may only show a portion of the image such that the user is better able to preview the changes made by adjusting parameter values 931-936 without being distracted by other elements included in the complete image in generated synthetic dataset 200.

With the "intensity" parameter 937 activated, the intensity preview 942 may include images with examples of what the image 941 would look like based on the different intensity values for the parameter. As shown in FIG. 9, the "anger" characteristic has three possible intensity values. In some embodiments, the intensity preview 942 may include a user interface element such that the user is able to select an intensity value via the intensity preview 942 to display a larger version of the image as preview image 941. As shown in FIG. 9, an intensity value of "3" is selected via intensity preview 942 (shown by the thicker outline). In some embodiments, only possible values for the intensity parameter as displayed; for example, if there are only three possible values for the intensity parameter, then intensity preview 942 may only include three example images.

In some embodiments, if the number of options for intensity preview 942 is larger than preview pane 540, additional user interface elements may be added to intensity preview 942 to enable the user to navigate the options. For example, the additional user interface elements may include a slider bar, a carousel control, left and right arrows or buttons, etc.

Object summary 943 may include a ring type chart (aka, a doughnut chart) and a table showing the corresponding values relating to the selected parameter values for controls 931-936. For example, object summary 943 does not include a visualization or corresponding value for the "fear" expression because the corresponding control 935 is set to zero. In some embodiments, object summary 943 may include other types of data visualizations and may not include the corresponding table.

Figure 10:
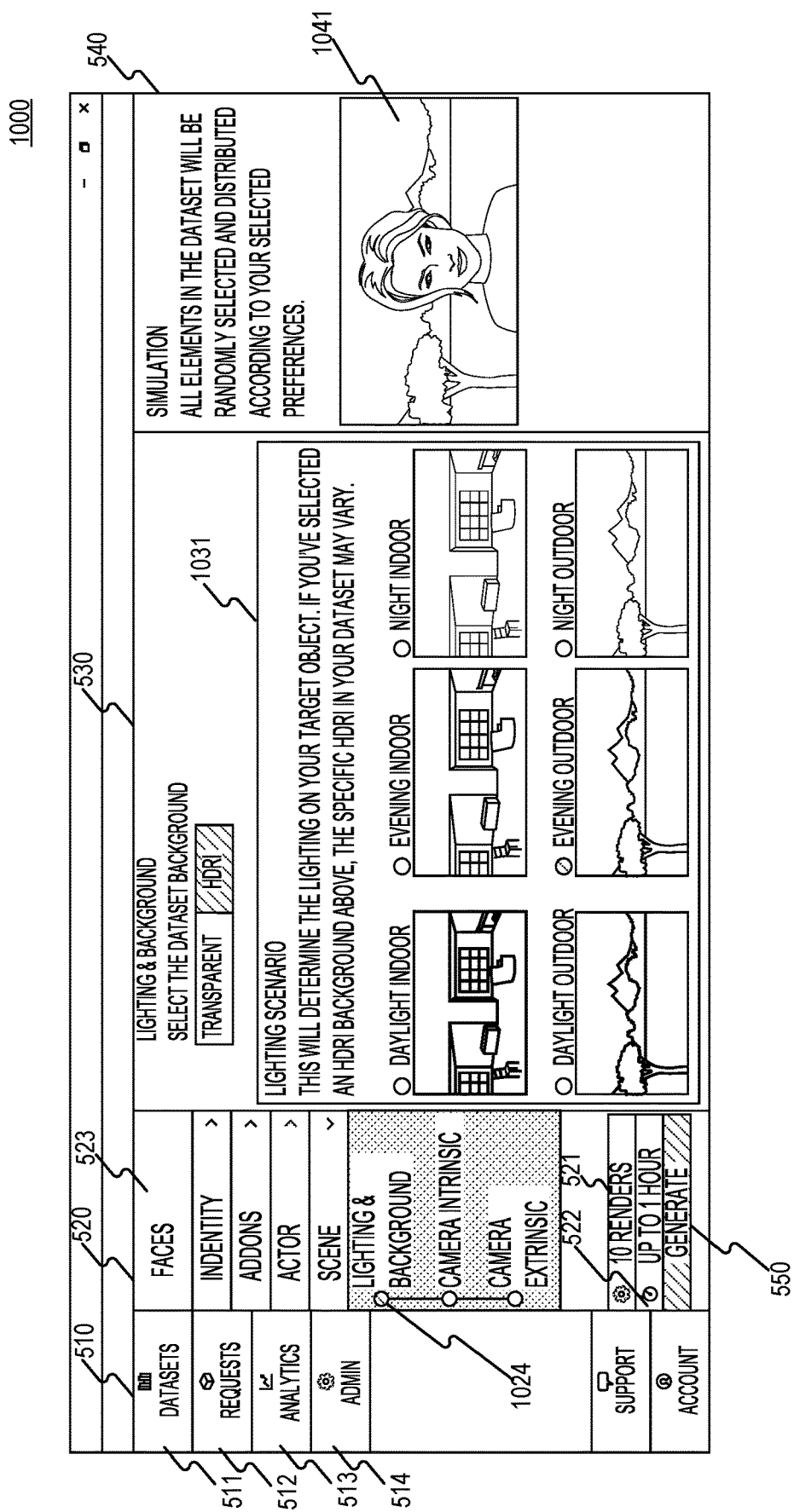
FIG. 10 illustrates an exemplary user interface with controls defining variations in lighting conditions and background characteristics for use in generation of synthetic datasets, according to some embodiments of the present disclosure.

FIG. 10 illustrates an exemplary GUI tool 1000 with controls defining variations in lighting conditions and background characteristics for use in generation of synthetic datasets, according to some embodiments of the present disclosure. In object selector 523, the user has selected the "scene" object and the "lighting & background" characteristic 1024. Based on selecting the "lighting & background" characteristic 1024, control pane 530 displays control 1031 relating to lighting scenario parameters. In some embodiments, control 1031 may include example images of what the different lighting scenarios may look like in the generated synthetic dataset 200. As shown in FIG. 10, the user has selected the "evening outdoor" lighting scenario by selecting a corresponding radio button. In some embodiments, other user interface elements may be used such that the user may select one of several different options. In some embodiments, control 1031 may include other properties related to details of the environment, such as degree of clutter or time of day.

Preview pane 540 includes a preview image 1041 showing an example image based on the selection of the lighting scenario from control 1031. In some embodiments, preview image 1041 may include any other parameters previously selected by the user, such that preview image 1041 is a "current" version of a preview image based on all of the previously selected parameters. In some embodiments, if some of the parameters have been defined by a range of possible values, preview image 1041 may include one or more randomly selected parameter values within the parameter value range selected by the user. In some embodiments, preview image 1041 may include simulated instances including simulated objects and background. For example, in FIG. 10, simulated instance 1041 may include a "faces" type object, a simulated body part (e.g., a "torso" type object), and a background.

The "scene" group object (in object selector 523) may be configured to allow a user to provide input for environment-related information to include with selected objects 161 and selected object types 162. The environment information may be stored as environment characteristics 166 that define environment constraints when generating synthetic dataset 200. Selected environment characteristics 166 may represent indoor, outdoor, and mixed spaces. In some embodiments, environment characteristics 166 may also define whether the selected scene is an urban or rural environment.

Figure 11:
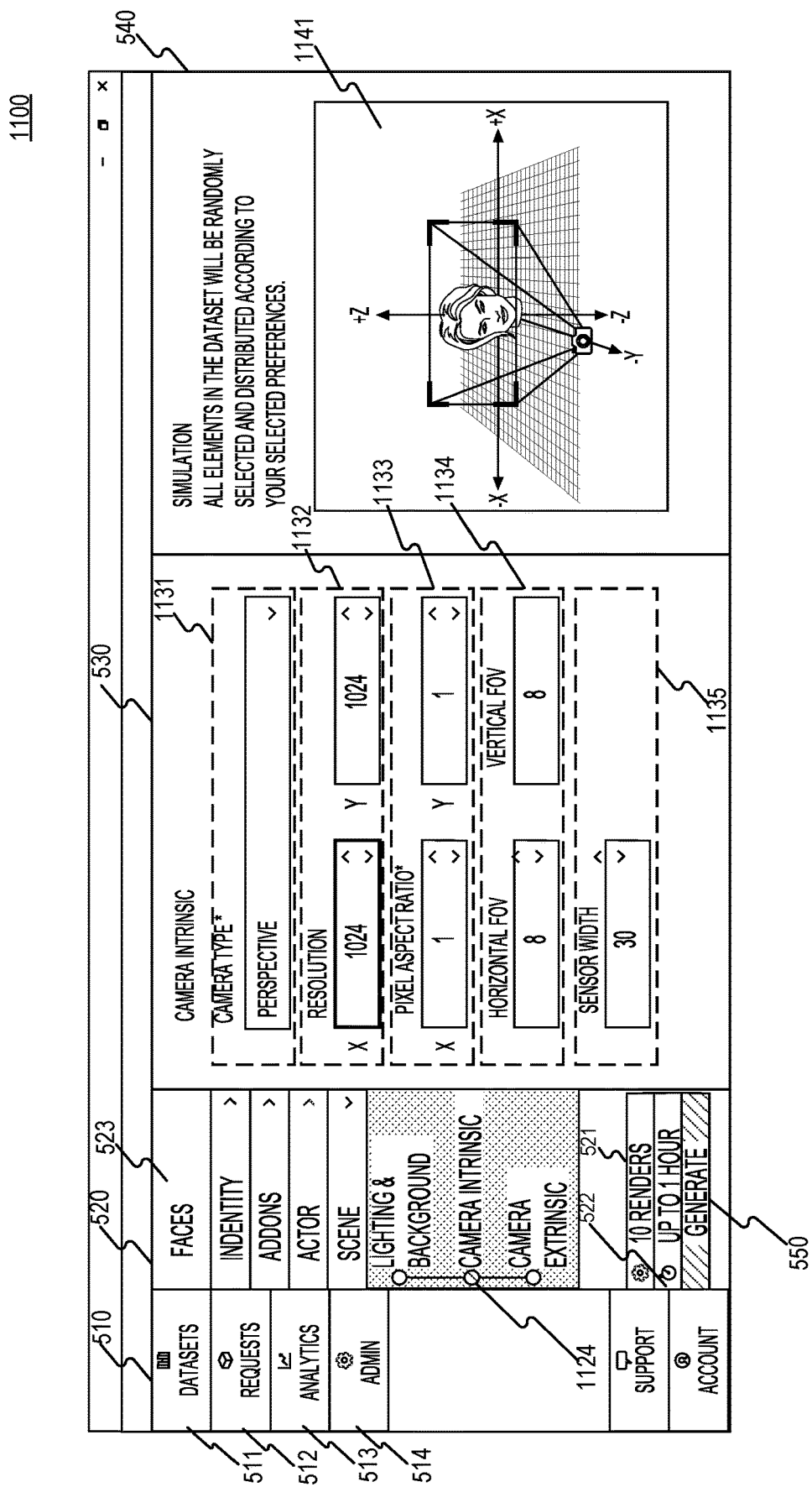
FIG. 11 illustrates an exemplary user interface with additional controls defining variations in camera characteristics for use in generation of synthetic datasets, according to some embodiments of the present disclosure.

FIG. 11 illustrates an exemplary GUI tool 1100 with additional controls defining variations in camera characteristics for use in generation of synthetic datasets, according to some embodiments of the present disclosure. In object selector 523, the user has selected the "scene" object and the "camera intrinsic" characteristic 1124. Based on selecting the "camera intrinsic" characteristic 1124, control pane 530 displays controls 1131-1135 relating to various camera parameters that will be simulated in generated synthetic dataset 200. In some embodiments, the camera parameters relate to physical characteristics of a real camera that may be simulated by system 100. For example, the camera intrinsic parameters may include a camera type (control 1131), a camera resolution (control 1132), a pixel aspect ratio (control 1133), horizontal and vertical fields of view (control 1134), and camera sensor width (control 1135). The values of the camera intrinsic parameters may be input via a user interface element such as a drop-down list, a text box, a text box with a corresponding selector, or other user interface element that permits the user to select a discrete value.

In some embodiments, the camera intrinsic parameters may also include camera focal length, camera sensor type, and/or camera wavelength sensitivity.

Preview pane 540 may include a preview image 1141 to assist the user in visualizing the changes made to a sample image by adjusting parameter values in controls 1131-1135.

In some embodiments, preview image 1141 may be updated in real-time such that the user may see the effect of changing one or more parameter values in controls 1131-1135. In some embodiments, preview image 1141 may be limited in that it may only show a portion of the image such that the user is better able to preview the changes made by adjusting parameter values in controls 1131-1135 without being distracted by other elements included in the complete image in generated synthetic dataset 200.

Figure 12:
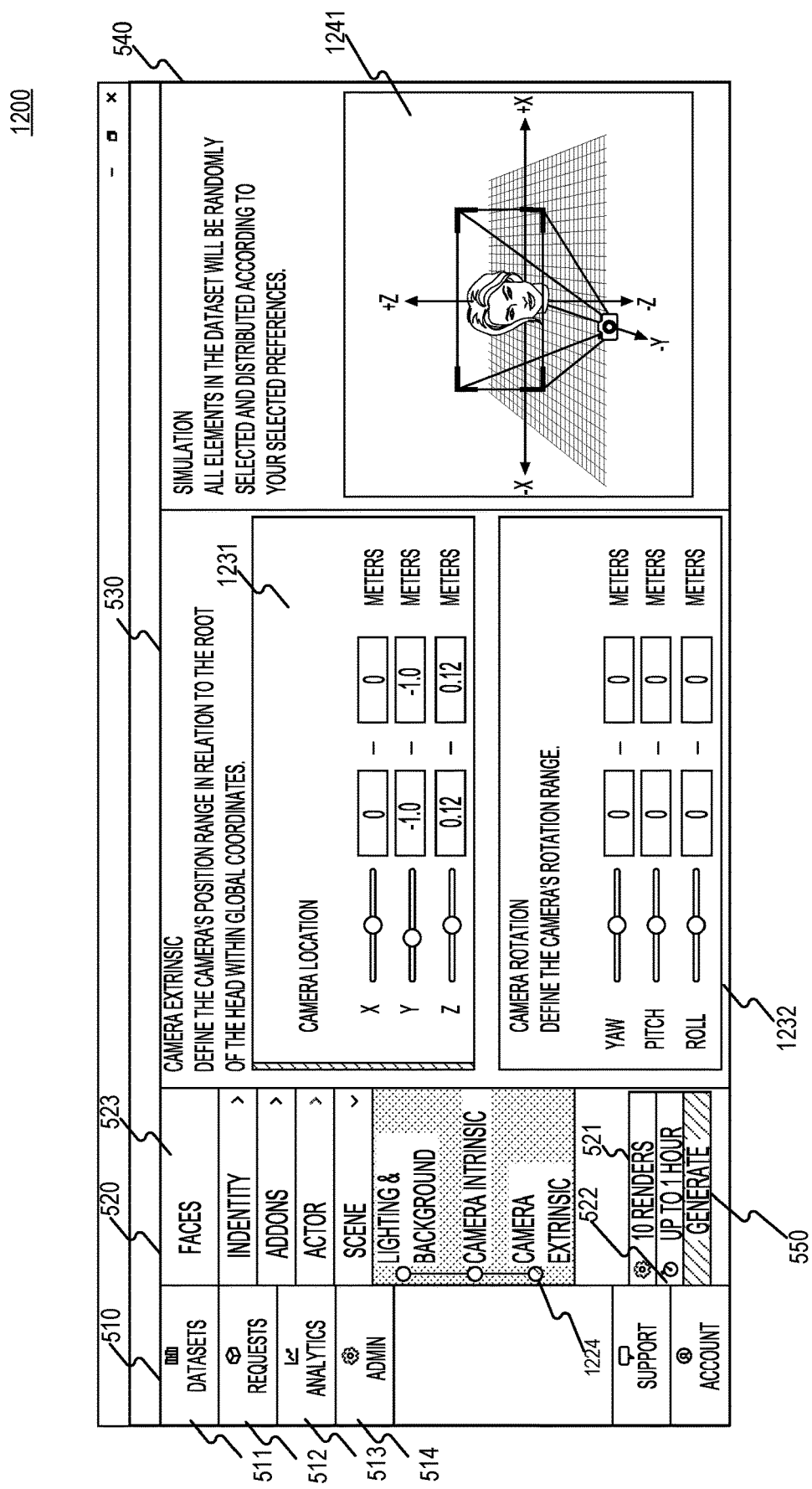
FIG. 12 illustrates an exemplary user interface with controls defining variations in camera (or image origin) location relative to images in a generated synthetic dataset, according to some embodiments of the present disclosure.

FIG. 12 illustrates an exemplary GUI tool 1200 with controls defining variations in camera (or image origin) location relative to images in a generated synthetic dataset, according to some embodiments of the present disclosure. In object selector 523, the user has selected the "scene" object and the "camera extrinsic" characteristic 1224. Based on selecting the "camera extrinsic" characteristic 1224, control pane 530 displays controls 1231 and 1232 relating to various camera parameters that will be simulated in generated synthetic dataset 200. In some embodiments, the camera extrinsic parameters relate to the physical positioning of a real camera that may be simulated by system 100. For example, the camera extrinsic parameters may include a camera location in the X, Y, and Z directions (control 1231) and a camera rotation in terms of yaw, pitch, and roll (control 1232). Camera location parameter 1231 may provide static details of the camera that do not change between target objects 211 in images 210 of synthetic dataset 200. Meta properties may include dynamic details, such as camera rotation parameter 1232 which defines the range of camera movement that may be varied in synthetic dataset 200.

In some embodiments, the camera extrinsic parameters may also include camera height. For example, the camera height may include the physical height of the camera relative to a fixed location (e.g., the ground).

Parameter value ranges in controls 1231 and 1232 may be input via various user interface elements; for example, as shown in FIG. 12, slider bars with a single selector and/or may be used with adjacent text boxes.

Preview pane 540 may include a preview image 1241 to assist the user in visualizing the changes made to a sample image by adjusting parameter values in controls 1231 and 1232. In some embodiments, preview image 1241 may be updated in real-time such that the user may see the effect of changing one or more parameter values in controls 1231 and 1232. In some embodiments, preview image 1241 may be limited in that it may only show a portion of the image such that the user is better able to preview the changes made by adjusting parameter values in controls 1231 and 1232 without being distracted by other elements included in the complete image in generated synthetic dataset 200.

In some embodiments, parameter value ranges in controls 1231 and 1232 may initially be set with random values, to enable the user to get a better sense of how adjusting the parameter value ranges will affect preview image 1241. In some embodiments, parameter value ranges in controls 1231 and 1232 may initially be set to zero, such that preview image 1241 is displayed with "neutral" settings. In some embodiments, parameter value ranges in controls 1231 and 1232 may initially be set based on prior selections made by the user for other parameter values for other controls.

Preview pane 540 may also present simulations of objects in various capturing environments. For example, preview images 1141 and 1241 present a simulated instance of "faces" type objects based on camera characteristics selected using controls 1131-1135 and 1231-1232, respectively.

Values of camera parameters of controls 1131-1135 and 1231-1232 may be stored as camera characteristics 167. System 100 may automatically generate simulated camera parameters and their default values from sample images 141 uploaded using sample image upload interface 310. In some embodiments, meta properties may include lighting parameters, such as type of light source, brightness level, lighting color, lighting direction, and a number of light sources.

In some embodiments, system 100 may be configured to populate one or more parameters based on sample images 141. In some embodiments, system 100 may be configured to extract camera characteristics 167 from sample images 141 and use the extracted values of camera characteristics 167 to generate synthetic dataset 200. In some embodiments, system 100 may be configured to store generated synthetic datasets 200 to training datasets 152.

In some embodiments, a non-transitory, computer-readable medium may include instructions that when executed by at least one processing device, cause the at least one processing device to provide on a display at least one graphical user interface (GUI) configured to facilitate generation of a synthetic dataset including a plurality of images. As referred to herein, the GUI may include the GUI tool 500-1200 described in connection with FIGS. 5-12.

In some embodiments, the GUI may include a dataset size selector configured to receive a size input from a user indicative of a number of images to generate and include in the plurality of images of the synthetic dataset. In some embodiments, the dataset size selector may include a text entry field. In some embodiments, the dataset size selector may include a virtual slider bar. In some embodiments, the dataset size selector may another user interface element to permit the user to enter a discrete value for the size input.

In some embodiments, the GUI may include a target object type selector configured to receive a target object type input from the user indicative of at least one selected target object type to feature in the synthetic dataset. For example, the target object type selector may include a menu, a drop-drop list, a set of options with corresponding selector elements such as checkboxes or radio buttons, or other user interface elements to permit the user to select one or more options.

In some embodiments, the GUI may include one or more image parameter variability controls configured to receive one or more variability inputs from the user indicative of at least one variation to include in the synthetic dataset relative to target object representations generated based on the at least one selected target object type. For example, if the user selects a "face" target object type, the parameter variability controls may permit the user to enter parameters for different facial characteristics, such as age, gender, ethnicity, hair, or gaze. In some embodiments, the parameter variability controls may be configured to permit the user to enter a discrete value or a range of values relating to a percentage of each characteristic to be included in the synthetic dataset. For example, if the user selects the "face" target object type and the "age" characteristic, the parameter variability controls may permit the user to select a percentage of different age ranges (e.g., "young," "adult," or "older") for faces to include in the synthetic data set.

In some embodiments, each variable characteristic may be associated with an independent variability control. Providing an independent variability control for each variable characteristic permits the user of the GUI to have a high level of control of the content of each image in the synthetic dataset. In some embodiments, while the variability controls are independently set, a default value or a default value range for a particular variable characteristic may be based on other variable characteristics set by the user. For example, if the user selects an "evening outdoor" environment to be used as a background for an image, then a "sunlight intensity" variable characteristic may be limited to a predetermined maximum value (e.g., 40%).

In some embodiments, the one or more image parameter variability controls provided on the at least one graphical user interface may be selectively provided based on the target object type input received from the user. For example, if the user selects a "car" as the target object type then a "number of wheels" parameter would not be displayed. But if the user selected a "pick-up truck" as the target object type, then a "number of wheels" parameter may be displayed.

In some embodiments, the one or more image parameter variability controls may include at least one of a drop-down menu, a virtual slider bar, one or more radio buttons, one or more virtual buttons, or a text entry field. In some embodiments, other user interface elements may be used for the image parameter variability controls to receive user input. In some embodiments, the user interface elements used for one or more variability controls may depend on a size of the display. For example, on a small display size, using a slider bar for a variability control may be difficult for the user to finely manipulate to be able to enter a particular value. In such circumstances, a text box may be used instead of the slider bar, but on a larger display size, the slider bar may be used.

In some embodiments, each of the one or more variability inputs may relate to at least one variable characteristic associated with target object representations generated based on the at least one selected target object type. In some embodiments, the at least one variable characteristic may include at least one of target object size, shape, aspect ratio, texture, orientation, material, number, or color. In some embodiments, the variable characteristic may include any characteristic that may be used to describe an object.

In some embodiments, the one or more image parameter variability controls may enable the user to select variation ranges associated with the at least one variation to include in the synthetic dataset relative to target object representations generated based on the at least one selected target object type. In some embodiments, the variation range for one variability control may be based on input values received from other variability controls. In some embodiments, if there are multiple related variability controls, a total of all the related variability controls may be limited to 100%. For example, if the user selects a "face" target object type and an "age" variability characteristic, the user may be permitted to select a percentage range for each age category to be included in the synthetic data set. To ensure that the values for each variability control is valid, the combined total of the age ranges may not exceed 100%. For example, the user may select a "young" age characteristic to range from 0% to 30% and an "adult" age characteristic to range from 10% to 40%. An "older" age characteristic may then be limited to a maximum of 30% so that the combined values of all the "age" characteristics does not exceed 100% (i.e., the user would not be able to enter a value for the "older" age characteristic to be 40%).

In some embodiments, the at least one variable characteristic may include at least one of a degree of overlap among target object representations, a degree of overlap between target objects and non-target objects, or a degree of occlusion relative to target object representations. In some embodiments, the GUI tool may include a preview image that is generated based on user input to the variable characteristics. For example, if the target object is a human and the non-target object is a vehicle, the preview image may include showing the human partially occluded by the vehicle (i.e., the human is standing on the opposite side of the vehicle relative to a camera position). As another example, if the target object is a vehicle and the non-target object is a human, the preview image may include showing the human partially overlapping the vehicle (i.e., the human is standing in front of the vehicle relative to the camera position).

In some embodiments, the at least one variable characteristic may include a number of species objects corresponding to a genus associated with the at least one selected target object type. In some embodiments, the target object types may be arranged in a hierarchy. For example, a target object type may be "vehicle" (i.e., a genus) and may include sub-types such as "car," "sport utility vehicle," "pick-up truck," and "tractor trailer" (i.e., species).

In some embodiments, the at least one graphical user interface may further include a non-target object type selector configured to receive a non-target object type input from the user indicative of at least one selected non-target object type to feature in the synthetic dataset. To provide better synthetic datasets, the GUI tool may also permit the user to select non-target object types to include in the generated images. For example, if the user wanted to generate a dataset including humans and vehicles, the user may select humans as the target objects. But the synthetic dataset would not be a "good" dataset if the vehicles in all the generated images were identical.

In some embodiments, the one or more image parameter variability controls may be further configured to receive one or more variability inputs from the user indicative of at least one variation to include in the synthetic dataset relative to non-target object representations generated based on the at least one selected non-target object type. Continuing the above example of generating a dataset including humans and vehicles and the user selects humans as the target objects, a "better" synthetic dataset may be generated if the user could also provide variability inputs for parameters relating to the non-target objects, e.g., vehicles. For example, the variability controls could permit the user to select a type of vehicle, a size of the vehicle, a color of the vehicle, and a condition of the vehicle (e.g., new, old, etc.).

In some embodiments, the at least one graphical user interface may further include an environment selector configured to receive an environment type input from the user indicative of an environment constraint to apply in generating the synthetic dataset. For example, the environment may include a background of a generated image. In some embodiments, the environment type input may be one of indoor, outdoor, or mixed indoor/outdoor. In some embodiments, the environment type input may be one of urban or rural. In some embodiments, selecting the environment type may limit the target object types and/or non-target object types available. For example, if the user selected an indoor urban environment, a target object type of "vehicle" may not include "farm equipment."

In some embodiments, the one or more image parameter variability controls may be further configured to receive one or more variability inputs from the user indicative of at least one variation to include in the synthetic dataset relative to one or more general image properties. In some embodiments, the one or more general image properties may include a degree of clutter. For example, a degree of clutter may indicate how many additional objects (i.e., neither target objects nor non-target objects) are to be included in the synthetic dataset. Including a degree of clutter in the synthetic dataset may make the images more "realistic" in that the images should not only include specifically identified target objects and non-target objects.

In some embodiments, the one or more general image properties may include a time of day. In some embodiments, selecting the time of day may have an impact on other image properties, such as environment or lighting levels. For example, selecting a 10:00 pm time of day would indicate a night-time environment or if an outdoor environment, low lighting levels.

In some embodiments, the one or more general image properties may include a simulated camera parameter. In some embodiments, by simulating camera parameters for a camera to be used (e.g., a security camera), the synthetic dataset may provide higher quality training images if the camera's parameters are considered while generating the synthetic dataset.

In some embodiments, the simulated camera parameter may include a camera orientation, a camera resolution, a camera field of view, a camera focal length, a camera aspect ratio, a camera sensor size, a camera sensor type, a camera wavelength sensitivity, or a camera height. In some embodiments, the simulated camera parameters may include intrinsic camera parameters (e.g., physical properties of a camera), such as resolution, field of view, focal length, aspect ratio, sensor size, sensor type, or wavelength sensitivity. In some embodiments, the simulated camera parameters may include extrinsic camera parameters (e.g., a physical location of the camera), such as orientation or height. For example, if the camera to be simulated is a security camera to be mounted on a pole overlooking a parking lot, the extrinsic parameters may include the height of the security camera above the ground and the camera angle relative to the horizon (e.g., a 45 degree angle below the horizon).

In some embodiments, the simulated camera parameter may be automatically derived from at least one actual image uploaded via the at least one graphical user interface. Continuing the above example of the security camera, the user may upload an actual image taken by the security camera in its mounted position. From the uploaded image, the intrinsic camera parameters may be automatically derived. In some embodiments, the extrinsic camera parameters may also be automatically derived from the uploaded image. In some embodiments, for greater accuracy of the synthetic dataset, the user may be prompted to confirm the automatically derived simulated camera parameters.

In some embodiments, the one or more general image properties may include a lighting property. In some embodiments, the lighting property may include a type of light source, a brightness level, a lighting color, a lighting direction, or a number of light sources. For example, varying the lighting properties may generate images in the synthetic dataset to represent different times of day, in both an indoor environment and an outdoor environment.

In some embodiments, the GUI tool may include a dataset generation control configured to receive an initiate-generation input from the user and, in response, initiate generation of an output including the synthetic dataset, wherein the synthetic dataset is generated according to the size input, target object type input, and variability input received from the user. In some embodiments, the dataset generation control may be displayed as an action button in the GUI tool.

In some embodiments, the output may further include an index of the images included in the generated synthetic dataset. In some embodiments, the index may be included in at least one electronic file. In some embodiments, the index may include an identification of target objects included in each of the plurality of images of the generated synthetic dataset. In some embodiments, the index may include an identification of non-target objects included in each of the plurality of images of the generated synthetic dataset. In some embodiments, the index may include both target objects and non-target object included in each of the plurality of images of the generated synthetic dataset.

In some embodiments, the GUI may further include at least one preview window configured to show to the user one or more samples from the synthetic dataset to be generated based on the at least one selected target object type and the one or more variability inputs. In some embodiments, if one of the variability inputs is a range of values, the sample shown in the preview window may be based on a random value selected from within the range defined by the variability input. As used in the description of GUI tool 500-1200, the preview window may also be referred to as a "preview pane," wherein the pane may be a separate window or may be a portion of a larger window.

In some embodiments, the at least one preview window may be shown on the display together with at least the target object selector and the one or more image parameter variability controls. In some embodiments, the preview window, the target object selector, and the one or more image parameter variability controls may be in separate windows shown on the display or may be a portion of a larger window shown on the display.

In some embodiments, the one or more samples from the synthetic dataset to be generated may be updated after receiving at least one new input from the user. In some embodiments, the samples may be updated in real-time or in near real-time after receiving at least one new input from the user.

In some embodiments, the one or more samples may be shown on the display simultaneously. In some embodiments, the preview window may be automatically resized to display the one or more samples simultaneously. In some embodiments, the one or more samples may be navigable based on user input. In some embodiments, the preview window may include a user interface element to permit user navigation of the one or more samples. For example, the user interface element may include a slider bar, an image carousel, left and right navigation arrows or buttons, or other user interface elements configured to permit user navigation of the one or more samples.

In some embodiments, the synthetic dataset may be generated based on one or more semantic relationships among objects. For example, a semantic relationship may define that the legs of a chair should be on a floor, not on a wall. Based on the semantic relationship, a generated image in the synthetic data set that includes a chair "knows" to render the chair such that the legs of the chair are on the floor.

In some embodiments, the target object type selector may include an image upload interface. In some embodiments, the image upload interface may enable the user to identify one or more sample images for upload. For example, the image upload interface may include a file selector. In some embodiments, in response to the uploaded one or more sample images, the at least one processing device may be configured to analyze the one or more sample images and automatically identify in the one or more sample images the selected target object type to feature in the synthetic dataset. For example, if the user identifies the selected target object type, the at least one processing device may automatically identify the selected target object type in the one or more sample images.

In some embodiments, the at least one processing device may be configured to store the automatically identified selected target object type in a database. For example, the database may include the dataset repository 140 or the synthetic dataset repository 160.

In some embodiments, the target object type input may indicate a human, and the one or more image parameter variability controls may enable anatomical variation in the synthetic dataset of one or more of eye color, eye shape, hair color, hair length, hair texture, face shape, weight, gender, height, skin tone, facial hair, or clothing. For example, the one or more image parameter variability controls may include the controls shown in GUI tools 500-900 in FIGS. 5-9.

In some embodiments, the target object type selector may be configured to receive a custom object type specified by the user. For example, the user may specify an object type (either a target object type or a non-target object type) that has not been previously specified by the system. In some embodiments, the custom object type may be defined based on one or more sample images uploaded via the at least one graphical user interface. For example, the user may upload a sample image and may select the custom object type in the sample image via a user interface tool (e.g., a lasso tool or other drawing tool).

In some embodiments, the custom object type may be defined based on one or more data files uploaded via the at least one graphical user interface. For example, the user may upload a text file or other data file type that may be configured to contain information relating to the custom object type.

In some embodiments, the at least one graphical user interface may further include an output location control configured to receive from the user a location in an electronic file structure where the generated synthetic dataset is to be stored. In some embodiments, the output location control may be included in the action pane 510 of GUI tool 500-1200.

Synthetic Image Data Generation Using Auto-Detected Image Parameters

Figure 13:
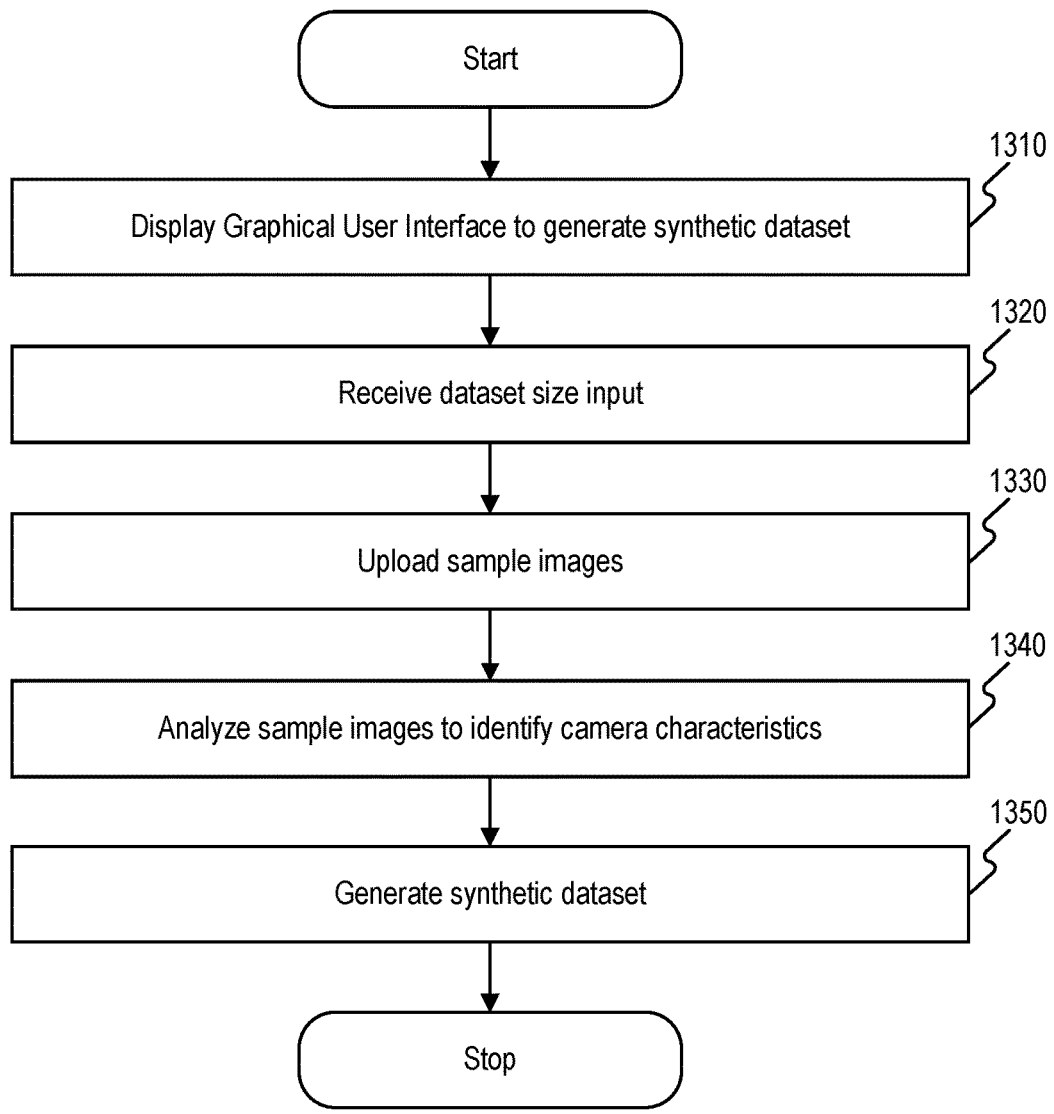
FIG. 13 is a flowchart depicting operations of an exemplary method for generation of synthetic dataset generation using automatically detected parameters of uploaded images, according to some embodiments of the present disclosure.

FIG. 13 is a flowchart depicting operations of an exemplary method 1300 for synthetic dataset generation using automatically detected parameters of uploaded images, according to some embodiments of the present disclosure. In some embodiments, the steps of method 1300 may be performed by computing device 400. It will be appreciated that the method 1300 may be altered to modify the order of steps and to include additional steps. It is noted that further description of features and/or functionality of GUI tool 300 also applies to GUI tool 500-1200.

In step 1310, system 100 displays GUI tool 300 to receive requests to generate synthetic datasets (e.g., training datasets 152 or synthetic datasets 200). Synthetic datasets may include various forms of data, including text data and image data. In some embodiments, the image data may include static images and/or motion images such as GIFs, videos, or animations. The images may include both two-dimensional images and three-dimensional images. In some embodiments, the image data may be in a vector file format, such as SVG. In some embodiments, GUI tool 300 may include a sample image upload interface (e.g., sample image upload interface 310) to select and upload sample images to generate images 210 of synthetic dataset 200. In some embodiments, system 100 may store the uploaded sample images as images 141 in dataset repository 140. In some embodiments, the sample image upload interface 310 may be used to select existing images in images 141.

In step 1320, system 100 receives a dataset size input using GUI tool 300. In some embodiments, the dataset size input may be received via dataset size selector 521 of GUI tool 500-1200. In some embodiments, system 100 may store the dataset size in dataset sizes 165 in synthetic dataset repository 160. In some embodiments, the dataset size may indicate a number of images to include in the synthetic dataset. In some embodiments, the dataset size may indicate a total size of the synthetic dataset, either as a number of images or a size of a file including the synthetic dataset (e.g., 5 GB). In some embodiments, the dataset size may indicate the size and dimensions of each image of the synthetic dataset. In some embodiments, the dataset size may indicate a length of motion images in the synthetic dataset, such as a number of frames, a video length, etc.

In step 1330, system 100 uploads sample images identified using GUI tool 300 and sample image upload interface 310. In some embodiments, sample image upload interface 310 may include a drag-and-drop window to select sample images from a file directory stored on a local computing device (e.g., computing device 400). In some embodiments, sample image upload interface 310 may display a file directory of files stored on a cloud-based service, such as Google™ drive, Microsoft™ OneDrive, Amazon™ S3, Dropbox™, etc. In some embodiments, the selected sample images may be stored in image files in file directories displayed using sample image upload interface 310.

In some embodiments, the sample images may include portions of image files listed in the file directory shown by sample image upload interface 310. In some embodiments, sample image upload interface 310 may include a window to display contents of image files and allow the selection of portions of image files as sample images. In some embodiments, sample image upload interface 310 may allow the selection of a portion of the displayed image files using a snapshot tool to draw a rectangular region on a displayed image file using a mouse pointer or other pointer control device. In some embodiments, sample image upload interface 310 may provide a lasso tool or other user interface element to outline a portion of the displayed image file using a mouse pointer or other pointer control device. In some embodiments, sample image upload interface 310 may allow entry of coordinates to select portions of the displayed image files. In some embodiments, the portions of the sample images may include a clipped portion of motion images defined by a start time and an end time or a start frame and an end frame in the motion images.

In some embodiments, selection of a portion of an image may include identifying objects in that portion as target objects. In some embodiments, system 100 may automatically detect target objects from the selected sample images from the displayed image files. In some embodiments, a user of GUI tool 300 may help with identifying target objects in selected sample images. In some embodiments, GUI tool 300 may include a target object identifier (e.g., object identifier interface 320) to receive user input to automatically detect target objects in the sample images. In some embodiments, the target object identifier may include a window that enables the user to highlight target objects in the sample images (e.g., using a pointer, a lasso tool, etc.).

In some embodiments, system 100 may store instances of identified target objects presented in the sample images as selected objects 161 in synthetic dataset repository 160. In some embodiments, system 100 may store the identified target objects to an overall object library (e.g., objects 142 in dataset repository 140). In some embodiments, system 100 may check if the identified target objects are already stored in objects 142 before storing multiple instances of the same object. In some embodiments, system 100 may store different instances of the same target object in objects 142. For example, system 100 may store the same target object in different dimensions to objects 142. In some embodiments, system 100 may retrieve varying instances of the identified target object from objects 142 that match each object in selected objects 161 to generate synthetic dataset 200. The selection of objects from objects 142 may depend on the values of other settings described in other steps of method 1300.

In some embodiments, system 100 may analyze the sample images to automatically detect target objects present in the sample images. System 100 may use the detected target objects to generate simulated representations of the target objects and include the simulated representations in generated images 210 of synthetic dataset 200. In some embodiments, system 100 may automatically detect non-target objects represented in the sample images and include simulated representations of the detected non-target objects in generated images 210 of synthetic dataset 200. In some embodiments, system 100 may add representations of the detected non-target objects to an object library (e.g., objects 142). In some embodiments, system 100 may check if the detected non-target objects are already stored in objects 142 before storing multiple instances of the same object. As previously noted, any suitable object recognition and/or image segmentation technique may be used to auto-identify objects (target or otherwise) in sample images.

In some embodiments, GUI tool 300 may include a target object and non-target object identifier that can be configured to receive input from a user to automatically detect target objects and non-target objects represented in the sample images. In some embodiments, the target object and non-target object identifiers may include a window (e.g., object identifier interface 320) associated with GUI tool 300 that enables the user to highlight target objects and non-target objects represented in the sample images.

In some embodiments, GUI tool 300 may include a target object type selector to receive a target object type input from the user of GUI tool 300, indicating types of objects to include in synthetic dataset 200. In some embodiments, system 100 may receive a selection of target object types as part of step 1330. In some embodiments, system 100 may store the target object types as selected object types 162 in synthetic dataset repository 160. System 100 may use the selected target object types to identify target objects from the selected sample images to generate synthetic dataset 200. In some embodiments, system 100 may pick the target objects from objects 142 based on the selected target object types to include in synthetic dataset 200.

In some embodiments, system 100 may receive variability inputs from the user of GUI tool 300, indicating variations of the target object representations (e.g., target objects 211) based on the selected target object type to generate and include in synthetic dataset 200. In some embodiments, GUI tool 300 may include image parameter variability controls to provide variability inputs presented in control interface 330 (for example, via selector pane 520 and control pane 530 of GUI tool 500-1200).

In some embodiments, GUI tool 300 may include a non-target object type selector to receive a non-target object type input from the user of GUI tool 300, indicating types of non-target objects to include in synthetic dataset 200. In some embodiments, system 100 may receive a selection of non-target object types as part of step 1330. In some embodiments, system 100 may store the non-target object types as selected object types 162 in synthetic dataset repository 160. System 100 may use the selected non-target object types to identify non-target objects from the selected sample images to generate synthetic dataset 200. In some embodiments, system 100 may pick the non-target objects from objects 142 based on the selected non-target object types to include in synthetic dataset 200.

In some embodiments, system 100 may receive additional variability inputs from the user of GUI tool 300, indicating variations of the non-target object representations (e.g., non-target objects 212) based on the selected non-target object type to generate and include in synthetic dataset 200. In some embodiments, GUI tool 300 may include image parameter variability controls to provide variability inputs presented in control interface 330 (for example, via selector pane 520 and control pane 530 of GUI tool 500-1200).

In some embodiments, system 100 may automatically select the non-target object types from an object library (e.g., objects 142) to include in selected object types 162. In some embodiments, system 100 may select the non-target object types based on the selected target object types. The selection of target objects and non-target objects may be based on relationships (e.g., relationships 144) between various objects 142. In some embodiments, system 100 may store the selected non-target object types as selected object types 162 in synthetic dataset repository 160. In some embodiments, system 100 may automatically populate images 210 in synthetic dataset 200 with instances of non-target objects (e.g., non-target objects 212) associated with selected object types 162.

In some embodiments, system 100 may automatically select the non-target object types to be part of selected object types 162 based on semantic relationships (e.g., relationships 144) between the identified types of target objects and non-target objects in the sample images. In some embodiments, system 100 may select the non-target object types based on semantic relationships between the identified target objects and target object types and other objects in the library of objects 142. In some embodiments, system 100 may only select the non-target object types to be part of the selected object types that conform with an established semantic relationship between the target objects and non-target objects.

In some cases, one or more characteristics associated with a sample image or a plurality of sample images may be automatically detected based on analysis of the sample image(s). These characteristics may, in turn, be used in the generation of the synthetic image dataset. For example, in step 1340, system 100 analyzes the sample images to automatically identify camera characteristics (e.g., camera characteristics 167) associated with the uploaded sample images. System 100 may identify camera characteristics 167 of a camera that captured the sample images uploaded in step 1310. In some embodiments, camera characteristics 167 may include camera settings such as aspect ratio, field of view, or focal length. In some embodiments, camera characteristics 167 may additionally include placement and position of the camera in relation to a captured subject matter, such as camera orientation and a height of the camera above a floor or ground level. In some embodiments, camera characteristics 167 may include camera hardware capabilities, such as sensor resolution, sensor size, sensor type, wavelength sensitivity range, color depth, or grayscale.

In some embodiments, the sample images may be analyzed to determine lighting characteristics (e.g., lighting characteristics 168). For example, lighting characteristics 168 may include color temperature, light source position, and light source orientation. In some embodiments, the sample images may be analyzed to determine environment characteristics (e.g., environment characteristics 166). For example, environment characteristics 166 may include indoor, outdoor, and mixed spaces. In some embodiments, the sample images may be analyzed to determine any one or more of: camera characteristics, lighting characteristics, or environment characteristics. Determining the various characteristics (e.g., camera, lighting, and/or environment characteristics) from the sample images may help to guide generating images 210 in synthetic dataset 200 to fine-tune the generated images to match characteristics of the analyzed sample images.

In some embodiments, system 100 may receive variability inputs for parameters for variability controls that control variations of the objects included in images 210 of synthetic dataset 200. In some embodiments, GUI tool 300 may present parameters of variability controls for the user to provide variability inputs. In some embodiments, system 100 may store the variability inputs as variability levels 164 in synthetic dataset repository 160. In some embodiments, system 100 may analyze the sample images to present the variability controls with parameters. For example, possible values of the parameters may be automatically determined and displayed as part of the variability controls.

In some embodiments, system 100 may present the variability controls and the associated parameters based on identified target objects and non-target objects (e.g., selected objects 161) in the uploaded sample images. The variability controls may be associated with characteristics of identified objects in the uploaded sample images. In some embodiments, system 100 may lookup identified objects in the uploaded sample images in dataset repository 140 to retrieve relevant object variables (e.g., object variables 143) that represent different characteristics of the identified objects. In some embodiments, system 100 may present the retrieved object variables as controls with parameters in GUI tool 300 to receive the variability inputs.

In some embodiments, system 100 may use the variability inputs to generate variations of the detected target objects and non-target objects to include in generated images 210 of synthetic dataset 200. In some embodiments, system 100 may use the variability inputs to generate variations of target object and non-target object representations of selected target object and non-target object types (e.g., selected object types 162).

In some embodiments, the variability inputs to parameters may update characteristics associated with instances of target objects 211 in images 210 of synthetic dataset 200. For example, the variable characteristics of a target object may include physical features such as size, shape, aspect ratio, texture, orientation, material, number, or color.

In some embodiments, system 100 may analyze the sample images to identify characteristics of a target object in relation to its surroundings. For example, the variable characteristics may include a degree of overlap among instances of target objects, a degree of overlap between target objects and non-target objects, or a degree of occlusion relative to instances of target objects.

In some embodiments, system 100 may receive the variability inputs from the user of GUI tool 300 for a subset of variability control parameters. In some embodiments, system 100 may populate the parameters with default values based on the sample images. For example, system 100 may analyze the sample images to detect the matching type of objects and set the variability controls with parameters representing characteristics of the matching type of objects to average values of the characteristics in the sample images. The variability control parameters presented in GUI tool 300 under control interface 330 may only be relevant to a subset of generated images 210 of synthetic dataset 200.

In some embodiments, the variability inputs may relate to variable characteristics associated with non-target objects 212 in images 210 of synthetic dataset 200. For example, the variable characteristics related to a non-target object may include physical properties such as size, shape, aspect ratio, texture, orientation, material, number, or color. In some embodiments, the variable characteristics related to non-target objects may include a degree of overlap among target object representations, a degree of overlap between target objects and non-target objects, or a degree of occlusion relative to non-target object representations.

In some embodiments, system 100 may automatically detect lighting characteristics associated with the sample images as part of the analysis of the sample images in step 1340. In some embodiments, system 100 may simulate representations of the detected lighting characteristics in generated images 210 of synthetic dataset 200. In some embodiments, system 100 may store the detected lighting characteristics in lighting characteristics 168. For example, the lighting characteristics may include a number of light sources, light source intensity, light source wavelength, light source location, light source orientation, light source position, or light source color.

In some embodiments, system 100 may receive variability inputs for the lighting parameters of variability controls shown in control interface 330 of GUI tool 300. System 100 may use the variability inputs for the lighting parameters to generate variations of simulated lighting sources to include in generated images 210 of synthetic dataset 200.

In some embodiments, system 100 may automatically detect characteristics of environments associated with the sample images as part of the analysis of the sample images in step 1340. In some embodiments, system 100 may simulate representations of the detected environment characteristics in generated images 210 of synthetic dataset 200.

In step 1350, system 100 generates synthetic dataset 200 with images 210 using the dataset sizes obtained in step 1310 and the camera characteristics obtained from the sample images in step 1340. System 100 may include simulated representations of detected target objects and non-target objects in subsets of the images of synthetic dataset 200.

In some embodiments, system 100 may generate synthetic datasets 200 based on average values of the identified camera characteristics identified in the sample images. In some embodiments, system 100 may apply the average values of the camera characteristics to subsets of the images included in synthetic dataset 200.

In some embodiments, system 100 may determine a range of values of each identified camera characteristic from their values in the sample images. In some embodiments, system 100 may apply the range of values of each identified camera characteristic to synthetic dataset 200 by varying, within the range of values, each value associated with the identified camera characteristic. For example, a value of an identified camera characteristic may be randomly selected from the range of values. As another example, if the dataset size is large enough, the values of the identified camera characteristic may include each value from the range of values.

In some embodiments, a non-transitory, computer-readable medium includes instructions that when executed by at least one processing device, may cause the at least one processing device to perform a method. In some embodiments, the method may be performed by computing device 400. In some embodiments, the at least one processing device may include a central processing unit (CPU), a graphics processing unit (GPU), a field programmable gate array (FPGA), an application specific integrated circuit (ASIC), a digital signal processor (DSP), or other circuitry configured to perform instructions.

In some embodiments, the method may include providing on a display at least one graphical user interface (GUI) configured to facilitate generation of a synthetic image dataset including a plurality of images, the at least one GUI may include a sample image upload interface configured to enable a user to identify one or more sample images to be uploaded. In some embodiments, the sample image upload interface may include a drag-and-drop window. In some embodiments, the sample image upload interface may include at least one window configured to display a list of files in directory. In some embodiments, the sample image upload interface may include sample image upload interface 310 of GUI tool 300 as described above. In some embodiments, the one or more sample images are stored in one or more corresponding electronic image files.

In some embodiments, the method may include receiving, via a dataset size selector associated with the GUI, a size input from a user indicative of a number of images to generate and include in the plurality of images of the synthetic image dataset. In some embodiments, the dataset size selector may include a text entry field. In some embodiments, the dataset size selector may include a virtual slider bar. In some embodiments, the dataset size selector may be another user interface element that permits the user to input a discrete value. In some embodiments, the dataset size input may be received via dataset size selector 521 of GUI tool 500-1200.

In some embodiments, the method may include uploading the identified one or more sample images. In some embodiments, the sample images may be uploaded as each sample image is selected. In some embodiments, the sample images may be uploaded when the user selects a button or other user interface element to begin uploading the sample images.

In some embodiments, the method may include analyzing the one or more sample images to automatically identify one or more camera characteristics associated with an image capture device used to acquire the one or more sample images. In some embodiments, the sample images may be analyzed after each sample image is uploaded. In some embodiments, the sample images may be analyzed when the user selects a button or other user interface element to begin analyzing the sample images.

In some embodiments, the one or more camera characteristics associated with the image capture device may include any one or more of: an orientation, an aspect ratio, a field of view, a focal length, or a height above a floor or ground level. In some embodiments, the one or more camera characteristics associated with the image capture device may include any one or more of: a sensor resolution, a sensor size, a sensor type, a wavelength sensitivity range, a color depth, or a gray scale. In some embodiments, the camera characteristics may include any physical parameter of the camera including characteristics of any component of the camera, such as sensor characteristics, lens characteristics, etc.

In some embodiments, the method may include generating the synthetic image dataset including the plurality of images based on the identified camera characteristics and the size input. In some embodiments, the generating may be triggered by user input. For example, the user may activate a user interface element, such as dataset generation control 550 of GUI tool 500-1200.

In some embodiments, the method may include automatically detecting one or more target objects represented in the one or more sample images. In some embodiments, the method may include including simulated representations of the detected one or more target objects in the plurality of images of the synthetic image dataset. In some embodiments, the user may identify what object in the sample images is considered to be the target object. For example, if the sample images include humans and cars, the user may identify humans as the target objects. As another example, if the sample images include humans and cars, the user may identify cars as the target objects.

In some embodiments, the method may include receiving from the user, via one or more image parameter variability controls associated with the GUI, at least one variability input from the user indicative of at least one variation to include in the plurality of images of the synthetic image dataset relative to target object representations generated based on the detected one or more target objects. In some embodiments, the variability controls may be provided via selector pane 520 and control pane 530 of GUI tool 500-1200. Examples of the image parameter variability controls are described above in connection with FIGS. 5-12.

In some embodiments, the at least one variability input may relate to a variable characteristic associated with the target object representations in the plurality of images of the synthetic image dataset. In some embodiments, the variable characteristic may include any one or more of: target object size, shape, aspect ratio, texture, orientation, material, number, or color. In some embodiments, the variable characteristic may include any one or more of: a degree of overlap among target object representations, a degree of overlap between target objects and non-target objects, or a degree of occlusion relative to target object representations.

In some embodiments, the method may include adding a representation of the one or more detected target objects to an object library if the one or more detected target objects are not already included in the object library. In some embodiments, the object library may include object 142 of dataset repository 140 or selected object 161 of synthetic dataset repository 160.

In some embodiments, the GUI may include a target object identifier associated with the GUI. In some embodiments, the target object identifier may be configured to receive input from the user to assist in automatically detecting the one or more target objects represented in the one or more sample images. In some embodiments, the target object identifier may include a window associated with the graphical user interface that enables the user to highlight one or more target objects represented in the one or more sample images. In some embodiments, the target object identifier may be implemented in GUI tool 300 via object identifier interface 320. In some embodiments, the target object identifier may include one or more user interface elements (e.g., a drawing tool or a selection tool) that may permit the user to select the target object in the sample image.

In some embodiments, the method may include automatically detecting one or more lighting characteristics associated with the one or more sample images. In some embodiments, the method may include including simulated representations of the lighting characteristics in the plurality of images of the synthetic image dataset. In some embodiments, the one or more lighting characteristics may include any one or more of: a number of light sources, a light source intensity, a light source wavelength, a light source location, a light source orientation, or a light source color.

In some embodiments, the method may include receiving from the user, via one or more lighting parameter variability controls associated with the GUI, at least one variability input from the user indicative of at least one variation to include in the plurality of images of the synthetic image dataset relative to at least one simulated lighting source. In some embodiments, the variability controls may be provided via selector pane 520 and control pane 530 of GUI tool 500-1200. In some embodiments, the at least one variability input may relate to a variable characteristic associated with the at least one simulated lighting source represented in the plurality of images of the synthetic image dataset. In some embodiments, the variable characteristic may include any one of more of: a lighting source location, intensity, color, wavelength, position, or orientation.

In some embodiments, the method may include automatically detecting one or more non-target objects represented in the one or more sample images. In some embodiments, the method may include including simulated representations of the detected one or more non-target objects in the plurality of images of the synthetic image dataset. In some embodiments, a non-target object may be an object of less interest in the sample images. For example, a non-target object may include a background object in a sample image.

In some embodiments, the method may include receiving from the user, via one or more image parameter variability controls associated with the GUI, at least one variability input from the user indicative of at least one variation to include in the plurality of images of the synthetic image dataset relative to non-target object representations generated based on the detected one or more non-target objects. In some embodiments, the variability controls may be provided via selector pane 520 and control pane 530 of GUI tool 500-1200. In some embodiments, the at least one variability input may relate to a variable characteristic associated with the non-target object representations in the plurality of images of the synthetic image dataset. In some embodiments, the variable characteristic may include any one or more of: non-target object size, shape, aspect ratio, texture, orientation, material, number, or color. In some embodiments, the variable characteristic may include any one or more of: a degree of overlap among target object representations, a degree of overlap between target objects and non-target objects, or a degree of occlusion relative to target object representations.

In some embodiments, the method may include adding a representation of the one or more detected non-target objects to an object library if the one or more detected non-target objects are not already included in the object library. In some embodiments, the object library may include objects 142 in dataset repository 140 or selected objects 161 in synthetic dataset repository 160.

In some embodiments, the GUI may include a non-target object identifier associated with the GUI. In some embodiments, the non-target object identifier may be configured to receive input from the user to assist in automatically detecting the one or more target objects represented in the one or more sample images. In some embodiments, the non-target object identifier may be implemented in GUI tool 300 via object identifier interface 320. In some embodiments, the non-target object identifier may include one or more user interface elements (e.g., a drawing tool or a selection tool) that may permit the user to select the non-target object in the sample image.

In some embodiments, the target object identifier may include a window associated with the GUI that enables the user to highlight one or more target objects represented in the one or more sample images.

In some embodiments, the at least one GUI may include a target object type selector and one or more image parameter variability controls. In some embodiments, the method may include receiving a target object type input from the user indicative of at least one selected target object type to feature in the synthetic image dataset. For example, the user may select the target object type from selected object types 162 in synthetic dataset repository 160. In some embodiments, the method may include receiving one or more variability inputs from the user indicative of at least one variation to include in the synthetic image dataset relative to target object representations generated based on the at least one selected target object type.

In some embodiments, the at least one GUI may include a non-target object type selector and one or more image parameter variability controls. In some embodiments, the method may include receiving a non-target object type input from the user indicative of at least one selected non-target object type to feature in the synthetic image dataset. For example, the user may select the non-target object type from selected object types 162 in synthetic dataset repository 160. In some embodiments, the method may include receiving one or more variability inputs from the user indicative of at least one variation to include in the synthetic image dataset relative to non-target object representations generated based on the at least one selected non-target object type.

In some embodiments, the method may include automatically selecting one or more non-target object types from an object library (e.g., selected object types 162 in synthetic dataset repository 160). In some embodiments, the method may include automatically populating the plurality of images in the synthetic image dataset with representations of non-target objects associated with the one or more non-target object types. In some embodiments, the automatic selection of at least one of the one or more non-target object types may conform with an established semantic relationship between a target object and the at least one of the one or more non-target object types. For example, the semantic relationship may conform with one or more relationships 144 in dataset repository 140. In some embodiments, a non-target object may be selected based on a likelihood that the non-target object appears together with a selected target object.

In some embodiments, the one or more sample images may include portions of one or more corresponding electronic image files. In some embodiments, the sample image upload interface may include a window configured to display images associated with the one or more corresponding electronic image files. In some embodiments, the window in the sample image upload interface may include a preview window or a preview pane. In some embodiments, the window in the sample image upload interface may be configured to receive a selection from the user regarding what portions of the displayed images to include in the one or more sample images. In some embodiments, the selection from the user regarding what portions of the displayed images to include in the one or more sample images may be received via a snapshot tool. In some embodiments, the selection from the user regarding what portions of the displayed images to include in the one or more sample images may be received via a lasso tool. In some embodiments, the selection from the user may be received via another user interface element such that the user can select a portion of the displayed image.

In some embodiments, the generation of the synthetic image dataset based on the identified camera characteristics may include determining an average value associated with at least one identified camera characteristic represented in a plurality of sample images. In some embodiments, the generation of the synthetic image dataset based on the identified camera characteristics may include applying the average value to the plurality of images included in the synthetic image dataset. In some embodiments, the average value of the camera characteristic may be based on all the sample images. In some embodiments, the average value of the camera characteristic may be based on a predetermined number of the sample images. In some embodiments, the predetermined number of sample images may be determined by system 100, may be based on the total number of sample images, or may be selected by the user. In some embodiments, the predetermined number of sample images may be a discrete number of images (e.g., 100 images), may be a percentage of the total number of sample images (e.g., 25% of the total number of sample images), or may be a capped percentage of the total number of sample images (e.g., 25% of the total number of sample images if the total number of sample images is less than 1000, or 250 images if the total number of sample images is greater than 1000).

In some embodiments, the generation of the synthetic image dataset based on the identified camera characteristics may include determining a range of values associated with at least one identified camera characteristic represented in a plurality of sample images. In some embodiments, the generation of the synthetic image dataset based on the identified camera characteristics may include varying, within the range of values, a value associated with the at least one identified camera characteristic used to generate the plurality of images included in the synthetic image dataset.

In some embodiments, the method may include analyzing the one or more sample images to automatically identify an environment associated with the one or more sample images. In some embodiments, the method may include generating the synthetic image dataset including the plurality of images based on the identified environment type.

Synthetic Image Data Generation Incorporating User-Provided Objects and Relationships In some embodiments, the disclosed systems can generate synthetic image datasets that feature objects or object types of particular interest to a user. For example, a manufacturer of navigation systems for autonomous vehicles may be interested in datasets (e.g., training datasets) that feature combinations of vehicles, pedestrians, traffic signs, traffic lights, road surface markings, road edges, lane marks, etc. The objects of interest to a particular user may be automatically identified using image analysis techniques (e.g., object identification algorithms, image segmentation techniques, etc.) applied to one or more sample images provided by the user. Additionally, or alternatively, the objects of interest may also be identified by the user. For example, various data representations, such as vector representations, solid models, frame representations, etc. may be provided to the disclosed systems by the user. Using the automatically identified or user-identified objects, the disclosed systems can generate synthetic image datasets that feature such objects with user-selected amounts and types of applied variations.

In addition to auto-identification of objects of interest or user-identification of those objects, the disclosed systems may also preserve semantic relationships associated with those objects and generate the synthetic image datasets according to those semantic relationships. The semantic relationships may include any type of expected, standard, or plausible relationship between one or more objects (e.g., books resting on horizontal surfaces, traffic signs in a right-side-up orientation, road surfaces that follow land contours, etc.). The semantic relationships may be auto-detected and learned by the disclosed systems through image analysis of sample images provided by the user. The semantic relationships may also be determined based on user input specifying or otherwise describing such semantic relationships.

The disclosed systems can then generate synthetic image datasets featuring objects, object types, sets of objects, etc. of particular interest to a particular user. In this way, with little input beyond one or more sample images, a user can receive or generate a synthetic image dataset including representations of actual objects the user's machine learning system is expected to encounter, depicted in a manner that preserves the expected semantic relationships between the objects and their surroundings.

Figure 14:
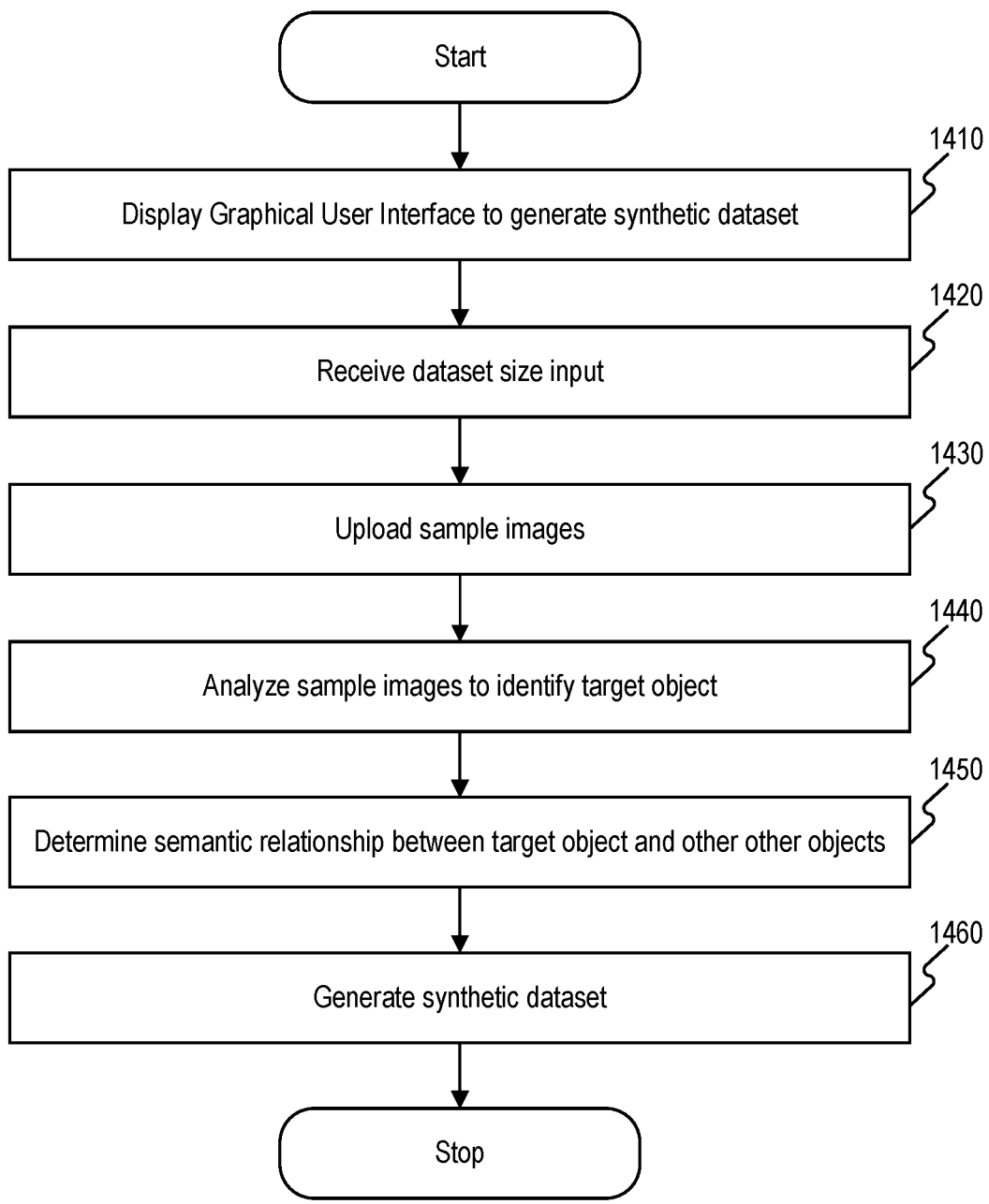
FIG. 14 is a flowchart depicting operations of an exemplary method for generation of customized synthetic dataset using user-provided objects and relationships, according to some embodiments of the present disclosure.

FIG. 14 is a flowchart depicting operations of an exemplary method 1400 for generation of customized synthetic datasets using user-provided objects and relationships, according to some embodiments of the present disclosure. The steps of method 1400 may be performed by computing device 400 for purposes of illustration. It will be appreciated that the illustrated method 1400 may be altered to modify the order of steps and to include additional steps.

In step 1410, system 100 may present on a display (e.g., display device 470) a graphical user interface (GUI) 300 tool configured to facilitate the generation of a synthetic dataset (e.g., synthetic dataset 200) of images (e.g., images 210). As previously described, GUI tool 300 may include a sample image upload interface 310 that may be configured to enable a user to identify one or more sample images to be uploaded. Sample image upload interface 310 may operate according to any suitable image or file selection technique. In some embodiments, sample image upload interface 310 may include a drag-and-drop interface wherein a user can "drag" one or more files from a file directory to interface 310. In other cases, sample image upload interface 310 may provide access to a file directory enabling a user to select an image file (e.g., by clicking on or otherwise highlighting a filename) for upload, etc.

In step 1420, system 100 receives a dataset size input using GUI tool 300. In some embodiments, system 100 may store the set dataset size to dataset sizes 165 in synthetic dataset repository 160. In some embodiments, dataset size may include a specified number of images to include in the synthetic dataset. In some embodiments, dataset size may include the total size of the synthetic dataset. In some embodiments, dataset size may include a size and/or dimensions associated with each image of the synthetic dataset. In some embodiments, dataset size may include the length of motion images in the synthetic dataset, such as the number of frames, video length, etc.

GUI tool 300 may include a dataset size selector to set the size of the synthetic dataset generated by system 100. In some embodiments, the dataset size selector may include dataset size selector 521 of GUI tool 500-1200. In some embodiments, the dataset size selector may include a text entry field to enter the number of images to generate and include in the synthetic dataset. In some embodiments, GUI tool 300 may allow the selection of a value for the dataset size using a dropdown menu of discrete values or a slider bar with a continuous range to select the number of generated images. In some embodiments, GUI tool may include a different type of user interface element to permit the user to enter a discrete value for the dataset size.

In step 1430, system 100 may upload sample images to generate images 210 of synthetic dataset 200. In some embodiments, system 100 may present a sample image upload interface (e.g., sample image upload interface 310) as part of GUI tool 300 to upload sample images. In some embodiments, sample image upload interface 310 may be used to select existing images in images 141.

Sample image upload interface 310 may be a drag-and-drop window to directly select and drop sample images to be analyzed by system 100 to detect and identify various objects (both target and non-target) and environment. In some embodiments, the sample image upload interface may include a window configured to display a list of files in a file directory present on a user's computer (e.g., computing device 400). In some embodiments, the file directory may point to a directory on a cloud-based storage service, such as Google™ drive, Microsoft™ OneDrive, Dropbox™, or Amazon™ S3, etc. Selected sample images may be in image files in file directories displayed using sample image upload interface 310.

In some embodiments, sample images may be portions of image files listed in the file directory shown by sample image upload interface 310. Sample image upload interface 310 may include a window to display contents of image files and allow the selection of portions of image files as sample images. Sample image upload interface may allow the selection of a portion of displayed image files using a snapshot tool to draw a rectangular region on a displayed image file using a mouse pointer or other pointer control device. In some embodiments, sample image upload interface 310 may provide a lasso tool to outline a portion of the displayed image file using a mouse pointer or other pointer control device. In some embodiments, sample image upload interface 310 may allow entry of coordinates to select portions of displayed image files. In some embodiments, portions of sample images may be a clipped portion of motion images defined by a start time and an end time or a start frame and an end frame in the motion images.

Selection of a portion of an image may include identifying objects in that portion as target objects. System 100 may automatically detect target objects from selected sample images from displayed image files. In some embodiments, the user of GUI tool 300 may help with identifying target objects in selected sample images. GUI tool 300 may include a target object identifier (e.g., object identifier interface 320) to receive input to automatically detect target objects in the sample images. In some embodiments, a target object identifier may include a window that enables the user to highlight target objects in the sample images.

In step 1440, system 100 may analyze sample images to automatically identify target objects in the uploaded sample images. In some embodiments, the user may aid in identifying target objects to include in the generated synthetic dataset to help train models 151.

System 100 may identify target objects based on input received from a user of system 100. The user may provide input by interacting with an object identification window (e.g., object identifier interface 320) included in GUI tool 300. The object identification window may allow the selection of an object from a listing of objects presented in a dropdown menu or other user interface element. System 100 may allow the selection of objects among an automatically generated list of candidate target objects shown in GUI tool 300. The automatically generated list of candidate target objects may be based on sample images uploaded and stored as images 141.

In some embodiments, system 100 may allow user interaction to identify target objects by pointing to positions in an image of sample images or outlining target objects in sample images. System 100 may accept user input for the selection of a single point or multiple points based on the size or position of target objects in sample images. System 100 may define the number of identification points based on the object selected as the target object. In some embodiments, the number of identification points may be defined based on the position and orientation of the target object and relation to other objects and the environment. For example, system 100 may identify a target object in a sample image with just the target object by clicking anywhere the object appears in the sample image. In another scenario where multiple objects appear overlapped or are irregularly shaped objects in a sample image, multiple points of selection or the entire outline of the target object may be necessary to identify the target object for training and later identification in datasets.

User interaction may include positioning a pointer (e.g., mouse pointer or other pointer control device) relative to a representation of a target object in sample images selected or uploaded by the user. In some embodiments, the user may interact by identifying one or more points associated with a target object in sample images. The user may identify one or more points by positioning the cursor relative to one or more points in a sample image and clicking a button on a user input device, such as depressing a key on a keyboard, making a location selection via a touch sensitive screen, etc. In some embodiments, the user may interact with the object identification window of GUI tool 300 using a lasso tool selector or a snapshot tool selector to select the outline of a target object.

System 100 may automatically identify target objects in sample images using an ML model including trained neural networks. System 100 may identify a target object in uploaded sample images based on the number of times an object is repeated across sample images. In some embodiments, the target object is repeated in all sample images.

System 100 may store identified target objects in groups defined as object types. System 100 may store an identified object as a new object that falls within an already defined object type. For example, a sample image with a Volkswagen® Beetle™ may be modeled and stored under a vehicle object type or a passenger car object type in dataset repository 140 under objects 142. In some embodiments, the user of GUI tool 300 may name an object type to store the identified target objects. In some embodiments, the user may specify whether a target object detected by system 100 falls within a preexisting object type or create a new object type in objects 142. System 100 may then add the new object type to the selected object types to generate synthetic dataset 200.

In some embodiments, system 100, upon interaction by the user of GUI tool 300 with object identification window (e.g., object identifier interface 320), may store information related to semantic relationships between non-target objects and target objects in dataset repository 140 as relationships 144 and objects 142, respectively.

In some embodiments, system 100 may automatically detect a non-target object from the additional objects present in sample images. Non-target objects may be identified using an object identification window (e.g., object identifier interface 320) of GUI tool 300. System 100 may automatically identify non-target objects based on the placement of objects in the sample images. Object placement in the sample images may be defined by the position of a non-target object in non-obscure locations or in the background overlapped by other objects, or have less presence among sample images, lack of focus, distortions, or lesser resolution. In some embodiments, system 100 may identify non-target objects based on the selection of target objects.

System 100 may add an instance of detected non-target objects in the sample images to an object library, e.g., objects 142. System 100 may check if the identified non-target objects are already in objects 142 before storing multiple instances of the same object. In some embodiments, system 100 may store different instances of the same non-target object in objects 142. For example, system 100 may store the same non-target object in different dimensions to objects 142. System 100 may retrieve varying instances of the identified non-target object in objects 142 that match each object in selected objects 161 to generate synthetic dataset 200.

In some embodiments, GUI tool 300 may include a target object identifier and a non-target object identifier that can be configured to receive input from the user to automatically detect target object and non-target objects represented in the sample images. The target object identifier or the non-target object identifier may indicate a type of object in the sample images. For example, GUI tool 300 may provide the non-target object identifier "chair" to system 100 to help system 100 detect all chairs present in the sample images and tag them as non-target objects. System 100 may consider any objects not selected using non-target object identifiers as target objects. For example, a restaurant sample image with chairs and tables and a non-target object identifier of "chair" may cause system 100 to consider all tables as target objects.

The target object identifiers and the non-target object identifiers may include a window (e.g., object identifier interface 320) associated with GUI tool 300 that enables a user to highlight target objects and non-target objects represented in the sample images. In some embodiments, the target object identifiers and the non-target object identifiers may be included in a single window in GUI tool 300. In some embodiments, the target object identifiers and the non-target object identifiers may be included in separate windows in GUI tool 300. The user of GUI tool 300 may highlight non-target objects represented in sample images by pointing or selecting by outlining using a lasso tool or a snapshot tool similar to how the user identified target objects described above.

System 100 may analyze sample images to automatically identify an environment associated with sample images. System 100 may store details of an analyzed environment in environments 145 in dataset repository 140. Environments 145 may define environment characteristics such as a type of environment, for example, an indoor environment or an outdoor environment. In some embodiments, environment characteristics may include the purpose of the environment, such as factory, school, retail store, etc. In some embodiments, environment characteristics may also include a clutter level associated with sample images.

In some cases, one or more characteristics associated with a sample image or a plurality of sample images may be automatically detected based on analysis of the sample image(s). These characteristics may, in turn, be used in the generation of the synthetic image dataset. For example, in step 1450, system 100 may determine semantic relationships between a target object and other objects represented in the sample images. In some embodiments, system 100 may determine and store semantic relationships between various objects in relationships 144. Such semantic relationships may relate to appropriate and/or accepted positions or orientations of objects relative to one another and relative to the surrounding environment. For example, stored relationships 144 between tables and chairs determined from sample images of restaurants may indicate that chairs are grouped around tables with the legs of the chairs in contact with a floor or ground surface. The stored relationships 144 may also indicate that chairs can be placed upside-down with the seat in contact with a table surface. Other relationships (e.g., a chair positioned with four legs contacting the top of a table, or a table resting on a single chair, etc.) may be recognized as non-standard semantic relationships and may also be included in stored relationships 144.

System 100 may automatically extract semantic relationships from the sample images. System 100 may maintain the semantic relationships between objects when generating images 210 of synthetic dataset 200. In some embodiments, system 100 may apply variations relative to the semantic relationships used in generating synthetic dataset 200. System 100 may avoid generating images 210 that show objects not represented according to expected semantic relationships. For example, system 100 may avoid generating images 210 with chairs sitting upright on a table (i.e., the legs of the chair on the table surface), a vase resting on a floor, a book resting on a vertical surface, etc.

A semantic relationship included in stored relationships 144 may include relative orientation (e.g., chairs grouped near tables in various orientations), relative position (e.g., four legs of a chair on the floor or the ground, an upside-down chair's seat on a table's surface, etc.), or relative size between a target object and one or more additional objects identified in the sample images. In some embodiments, the user of GUI tool 300 may input semantic relationships by selecting a set of sample images depicting aspects of a semantic relationship to be entered.

In step 1460, system 100 may generate synthetic dataset 200 of images 210 based on identified target objects from step 1440, the semantic relationship from step 1450, and the dataset size input from step 1420. System 100 may include simulated representations of target objects identified in step 1440 in a synthetic dataset and stored in training datasets 152.

System 100 may generate images of synthetic dataset 200 by adjusting characteristics associated with objects and surroundings identified in step 1440. Characteristics of identified objects and surroundings are represented, for example, by selected objects variables 163 and environment characteristics 166. In some embodiments, system 100 may receive a selection of characteristics to vary and a level of variations of characteristics from GUI tool 300 to generate images of synthetic dataset 200. System 100 may store the selection of characteristics and variations as selected objects variables 163 and variability levels 164 in synthetic dataset repository 160. System 100 may lookup identified objects in uploaded sample images from step 1440 in dataset repository 140 to retrieve relevant object variables 143 that represent different characteristics of identified objects. System 100 may present retrieved object variables as controls with parameters in GUI tool 300 to receive variability inputs.

Variability inputs to parameters may update characteristics associated with instances of target objects 211 in images 210 of synthetic dataset 200. Variable characteristics of a target object may include physical features such as size, shape, aspect ratio, texture, orientation, material, number, or color.

In some embodiments, the variations may be specific to certain selected target object instances (e.g., selected objects 161) detected by system 100 from the sample images. In some embodiments, system 100 stores the variability input to parameters of controls in selected objects variables 163 used to adjust characteristics of objects.

In some embodiments, the variability inputs may be associated with the surroundings of target objects, such as presentation, including placement of other objects (e.g., selected objects variables 163), environment characteristics 166, and lighting characteristics 168. Placement of other objects relative to target objects in images may define characteristics including a degree of overlap among instances of target objects, a degree of overlap between instances of target objects and non-target objects, or a degree of occlusion relative to instances of a target object. In some embodiments, variability inputs associated with surroundings may include data capture settings of target objects, such as camera characteristics 167.

Variability inputs to parameters may update characteristics associated with instances of non-target objects 212 in images 210 of synthetic dataset 200. Variable characteristics of a non-target object may include physical features such as size, shape, aspect ratio, texture, orientation, material, number, or color.

In some embodiments, the variability inputs may be associated with the surroundings of non-target objects, such as presentation, including placement of other objects (e.g., selected objects variables 163), environment characteristics 166, and lighting characteristics 168. Placement of other objects relative to non-target objects in images may define characteristics including a degree of overlap among instances of non-target objects, a degree of overlap between instances of target objects and non-target objects, or a degree of occlusion relative to instances of a non-target object. In some embodiments, variability inputs associated with surroundings may include data capture settings of non-target objects, such as camera characteristics 167.

In some embodiments, system 100 may generate images of a synthetic dataset based on the type of environment defined using environment characteristics. In some embodiments, system 100 may generate images of a synthetic dataset based on identified clutter level of objects in images.

In some embodiments, a non-transitory, computer readable medium may include instructions that when executed by at least one processing device, cause the at least one processing device to perform a method. In some embodiments, the method may be performed by computing device 400. In some embodiments, the at least one processing device may include a central processing unit (CPU), a graphics processing unit (GPU), a field programmable gate array (FPGA), an application specific integrated circuit (ASIC), a digital signal processor (DSP), or other circuitry configured to perform instructions.

In some embodiments, the method may include providing on a display at least one graphical user interface (GUI) configured to facilitate generation of a synthetic image dataset including a plurality of images, the at least one GUI including a sample image upload interface configured to enable a user to identify one or more sample images to be uploaded. In some embodiments, the sample image upload interface may include sample image upload interface 310 of GUI tool 300 as described above. In some embodiments, the sample image upload interface may include a drag-and-drop window. In some embodiments, the sample image upload interface may include at least one window configured to display a list of files in directory.

In some embodiments, the one or more sample images may be stored in one or more corresponding electronic image files. In some embodiments, the one or more sample images may include portions of one or more corresponding electronic image files.

In some embodiments, the sample image upload interface may include a window configured to display images associated with the one or more corresponding electronic image files. In some embodiments, the window may be configured to receive a selection from the user regarding what portions of the displayed images to include in the one or more sample images. The selection from the user may permit the user to select a target object or a non-target object in the displayed sample image. In some embodiments, the selection from the user regarding what portions of the displayed images to include in the one or more sample images may be received via a snapshot tool. In some embodiments, the selection from the user regarding what portions of the displayed images to include in the one or more sample images is received via a lasso tool. In some embodiments, the selection from the user may be received by another user interface element that permits the user to select a portion of the displayed images.

In some embodiments, the method may include receiving, via a dataset size selector associated with the graphical user interface, a size input from a user indicative of a number of images to generate and include in the plurality of images of the synthetic image dataset. In some embodiments, the dataset size selector may include a text entry field. In some embodiments, the dataset size selector may include a virtual slider bar. In some embodiments, the dataset size selector may be another user interface element that permits the user to input a discrete value. In some embodiments, the dataset size input may be received via dataset size selector 521 of GUI tool 500-1200.

In some embodiments, the method may include uploading the identified one or more sample images. In some embodiments, the sample images may be uploaded as each sample image is selected. In some embodiments, the sample images may be uploaded when the user selects a button or other user interface element to begin uploading the sample images.

In some embodiments, the method may include analyzing the one or more sample images to automatically identify at least one target object represented in the one or more sample images. In some embodiments, the at least one target object may be identified based on an output of one or more trained neural networks. In some embodiments, the one or more sample images may include a plurality of sample images, and the at least one target object is identified based on a detected number of repeated representations of the at least one target object across the plurality of sample images. For example, if cars appear in a predetermined number of the sample images (e.g., a set discrete value or a percentage value), then cars may be identified as the target object.

In some embodiments, the sample images may be analyzed after each sample image is uploaded. In some embodiments, the sample images may be analyzed when the user selects a button or other user interface element to begin analyzing the sample images.

In some embodiments, the at least one target object may be identified based on input received from the user. In some embodiments, the input from the user may be received based on user interaction with a target object identification window included in the GUI. In some embodiments, the target object identification window may include object identifier interface 320 of GUI tool 300 described above. In some embodiments, the user interaction with the target object identification window may include positioning of a cursor relative to a representation of a target object in the one or more sample images. In some embodiments, the user may identify one or more points associated with the target object in the one or more sample images by positioning the cursor relative to the one or more points and clicking a button on a user input device, depressing a key on a keyboard, or making a location selection via a touch sensitive screen. In some embodiments, other hardware devices may be used to enable the user to identify the one or more points associated with the target object. For example, a stylus or similar writing-style device may be used and configured to enable the user to interact with the GUI tool 300.

In some embodiments, the user interaction with the target object identification window may include positioning of a lasso tool selector or a snapshot tool selector relative to a representation of a target object in the one or more sample images. In some embodiments, other user interface elements may be provided to permit the user to select the target object.

In some embodiments, the input from the user may include a user selection from among an automatically generated list of candidate target objects shown on the display as part of the graphical user interface. For example, the list of candidate target objects may be displayed as a drop-down list, a list box, or similar user interface element to permit the user to select from one or more options. In some embodiments, the user interface element may include a search field to enable the user to more quickly find the desired candidate target object.

In some embodiments, the method may include determining at least one semantic relationship between the at least one target object and one or more additional objects. In some embodiments, the at least one semantic relationship may include at least one of: a relative orientation, a relative position, or a relative size between the at least one target object and one or more additional objects. In some embodiments, the at least one semantic relationship may be inferred based on analysis of the one or more sample images. In some embodiments, the semantic relationship may be inferred by a trained neural network. In some embodiments, the at least one semantic relationship may be determined based on information retrieved from at least one database. In some embodiments, the at least one database may include relationships 144 in dataset repository 140.

In some embodiments, the at least one semantic relationship may be determined based on a semantic relationship input received from the user. In some embodiments, the semantic relationship input received from the user may include entered text. In some embodiments, a text field may be displayed on the GUI and configured for the user to enter text to describe the semantic relationship. In some embodiments, a list of predetermined semantic relationships may be displayed on the GUI and the user may select a predetermined semantic relationship from the list. In some embodiments, the semantic relationship input received from the user may include a selection of the one or more sample images depicting at least one aspect of the at least one semantic relationship. In some embodiments, the user may select the sample images depicting the semantic relationship via sample image upload interface 310 of GUI tool 300. In some embodiments, the user may select a portion of a sample image depicting the semantic relationship. For example, the user may use a lasso tool selector, a snapshot tool selector, or other user interface element to select the portion of the sample image.

In some embodiments, the method may include generating the synthetic image dataset including the plurality of images based on the identified at least one target object, the at least one semantic relationship, and the size input. Synthetic dataset 200 may include a plurality of images 210 containing a target object 211 depicted in a semantic relationship relative to other target objects 211 or non-target objects 212.

In some embodiments, the method may include generating a model representation for the at least one target object and storing the model representation in a database. In some embodiments, the database may include objects 142 in dataset repository 140. In some embodiments, the database may include selected objects 161 in synthetic dataset repository 160. In some embodiments, the model representation may include a vector space representation. In some embodiments, the model representation may be stored in a different format. In some embodiments, the model representation may correspond to a new object type not already included in the database. For example, the object type may be stored in selected object types 162 in synthetic dataset repository 160. In some embodiments, the model representation may correspond to a new object species associated with an object type already included in the database. In some embodiments, the object species may be stored in a hierarchical relationship with the corresponding object type. For example, the object species may be stored with the object type in selected object types 162 in synthetic dataset repository 160.

In some embodiments, the method may include receiving from the user one or more identifiers associated with the at least one target object. In some embodiments, the one or more identifiers may be entered via object identifier interface 320 of GUI tool 300 as described above. In some embodiments, the method may include storing the generated model in the database according to the one or more identifiers received from the user. In some embodiments, the one or more identifiers may be stored as labels 146 in dataset repository 140.

In some embodiments, the method may include storing in a database information relating to the at least one semantic relationship together with a model representation of the at least one target object. For example, the at least one semantic relationship may be stored as relationships 144 in dataset repository 140.

In some embodiments, the method may include including simulated representations of the detected one or more target objects in the plurality of images of the synthetic image dataset. In some embodiments, the method may include receiving from the user, via one or more image parameter variability controls associated with the graphical user interface, at least one variability input from the user indicative of at least one variation to include in the plurality of images of the synthetic image dataset relative to target object representations generated based on the detected one or more target objects. In some embodiments, the variability controls may be provided via selector pane 520 and control pane 530 of GUI tool 500-1200. Examples of the image parameter variability controls are described above in connection with FIGS. 5-12. The images in synthetic dataset 200 may include variations of parameters of the target objects. Providing such variations in the synthetic dataset provides a more robust training dataset (e.g., one of test datasets 153 in model repository 150) for the ML models (e.g., models 151 in model repository 150).

In some embodiments, the at least one variability input may relate to a variable characteristic associated with the target object representations in the plurality of images of the synthetic image dataset. In some embodiments, the variable characteristic may include any one or more of: target object size, shape, aspect ratio, texture, orientation, material, number, or color. In some embodiments, the variable characteristic may include any one or more of: a degree of overlap among target object representations, a degree of overlap between target objects and non-target objects, or a degree of occlusion relative to target object representations. The variable characteristics may include any characteristics of a target object and how that target object may be depicted in an image. It is noted that the possible variable characteristics may include more characteristics than those listed above; the method will operate in a similar manner (i.e., by providing a variability input relating to the variable characteristic) regardless of the number of characteristics or the type or nature of the characteristic.

In some embodiments, the method may include automatically detecting at least one non-target object among the one or more additional objects represented in the one or more sample images and including simulated representations of the detected one or more non-target objects, in accordance with the at least one semantic relationship, in the plurality of images of the synthetic image dataset. A non-target object may include any object in an image that is of less interest than the target object. For example, a non-target object may include a background object in the image. In synthetic dataset 200, non-target objects 212 may be varied across images 210 while target object 211 stays the same. If the non-target object varies across the images in the synthetic dataset, the semantic relationship between the non-target object and the target object will be maintained in the image. For example, if the target object is a chair and the non-target object is a restaurant, the semantic relationship may be defined such that a seat of the chair may be positioned on a table surface. As another example, if the target object is a chair and the non-target object is an empty room (e.g., a room without a table), the semantic relationship may be defined such that the legs of the chair are positioned on the floor of the room. In this example, because there is no surface to place the seat of the chair, the semantic relationship between the chair and the floor will be maintained.

In some embodiments, the method may include receiving from the user, via one or more image parameter variability controls associated with the graphical user interface, at least one variability input from the user indicative of at least one variation to include in the plurality of images of the synthetic image dataset relative to non-target object representations generated based on the detected one or more non-target objects. In some embodiments, the variability controls may be provided via selector pane 520 and control pane 530 of GUI tool 500-1200. Examples of the image parameter variability controls are described above in connection with FIGS. 5-12. The images in synthetic dataset 200 may include variations of parameters of the non-target objects. Providing such variations in the synthetic dataset provides a more robust training dataset (e.g., one of test datasets 153 in model repository 150) for the ML models (e.g., models 151 in model repository 150).

In some embodiments, the at least one variability input may relate to a variable characteristic associated with the non-target object representations in the plurality of images of the synthetic image dataset. In some embodiments, the variable characteristic may include any one or more of: non-target object size, shape, aspect ratio, texture, orientation, material, number, or color. In some embodiments, the variable characteristic may include any one or more of: a degree of overlap among non-target object representations, a degree of overlap between target objects and non-target objects, or a degree of occlusion relative to non-target object representations. The variable characteristics may include any characteristics of a non-target object and how that non-target object may be depicted in an image. It is noted that the possible variable characteristics may include more characteristics than those listed above; the method will operate in a similar manner (i.e., by providing a variability input relating to the variable characteristic) regardless of the number of characteristics or the type or nature of the characteristic.

In some embodiments, the method may include adding a representation of the one or more detected non-target objects to an object library if the one or more detected non-target objects are not already included in the object library. For example, the object library may include objects 142 of dataset repository 140.

In some embodiments, the GUI may include a non-target object identifier associated with the GUI. For example, the non-target object identifier may be implemented as object identifier interface 320 of GUI tool 300 as described above. In some embodiments, the non-target object identifier may be configured to receive input from the user to assist in automatically detecting the one or more target objects represented in the one or more sample images. In some embodiments, the target object identifier may include a window associated with the GUI that enables the user to highlight one or more target objects represented in the one or more sample images. For example, the window may be associated with object identifier interface 320 or sample image upload interface 310 of GUI tool 300.

In some embodiments, the method may include analyzing the one or more sample images to automatically identify an environment associated with the one or more sample images. In some embodiments, the identified environment may be stored as environments 145 in dataset repository 140. In some embodiments, the method may include generating the synthetic image dataset including the plurality of images based on the identified environment type. In some embodiments, one or more image parameter variability controls associated with the GUI may be provided to receive user input on at least one variation of the environment and/or the environment type to include in the plurality of images. For example, the variability controls may be provided via selector pane 520 and control pane 530 of GUI tool 500-1200. Examples of the image parameter variability controls are described above in connection with FIGS. 5-12.

In some embodiments, the method may include analyzing the one or more sample images to automatically identify a clutter level associated with the one or more sample images. In some embodiments, the clutter level may relate to an environment, a number of background objects, and/or a number of non-target objects in an image. In some embodiments, the method may include generating the synthetic image dataset including the plurality of images based on the identified clutter level. In some embodiments, the identified clutter level may be maintained across images 210 of synthetic dataset 200. In some embodiments, one or more image parameter variability controls associated with the GUI may be provided to receive user input on at least one variation of the clutter level to include in the plurality of images. For example, the variability controls may be provided via selector pane 520 and control pane 530 of GUI tool 500-1200. Examples of the image parameter variability controls are described above in connection with FIGS. 5-12.

By using the method, the system 100 may automatically extract target objects and/or non-target objects from the uploaded sample images. The method may then use those extracted objects and semantic relationships between objects when generating the images in the synthetic dataset. The semantic relationships between objects may be automatically determined by the method (e.g., by inferring the semantic relationships from the uploaded sample images), may be retrieved from stored semantic relationships (e.g., relationships 144 in dataset repository 140), or may be based on user input.

Closed Loop Bias and Vulnerability Testing of Machine Learning Models

Inadequate or biased training data can lead to the development of biased or vulnerable artificial intelligence systems. To prevent such problems, testing using synthetic image data may be integrated into the AI design, development, and validation process. High-variance synthetic training data may be used to "unit test" AI systems to ensure that they satisfy design requirements. If deficiencies are identified, the testing system may provide synthetic training examples adapted to the identified deficiencies. Design validation can be built into the process of training the AI system, forming a closed loop process in which the synthetic training examples are used to address biases or vulnerabilities as they are detected.

Figure 15:
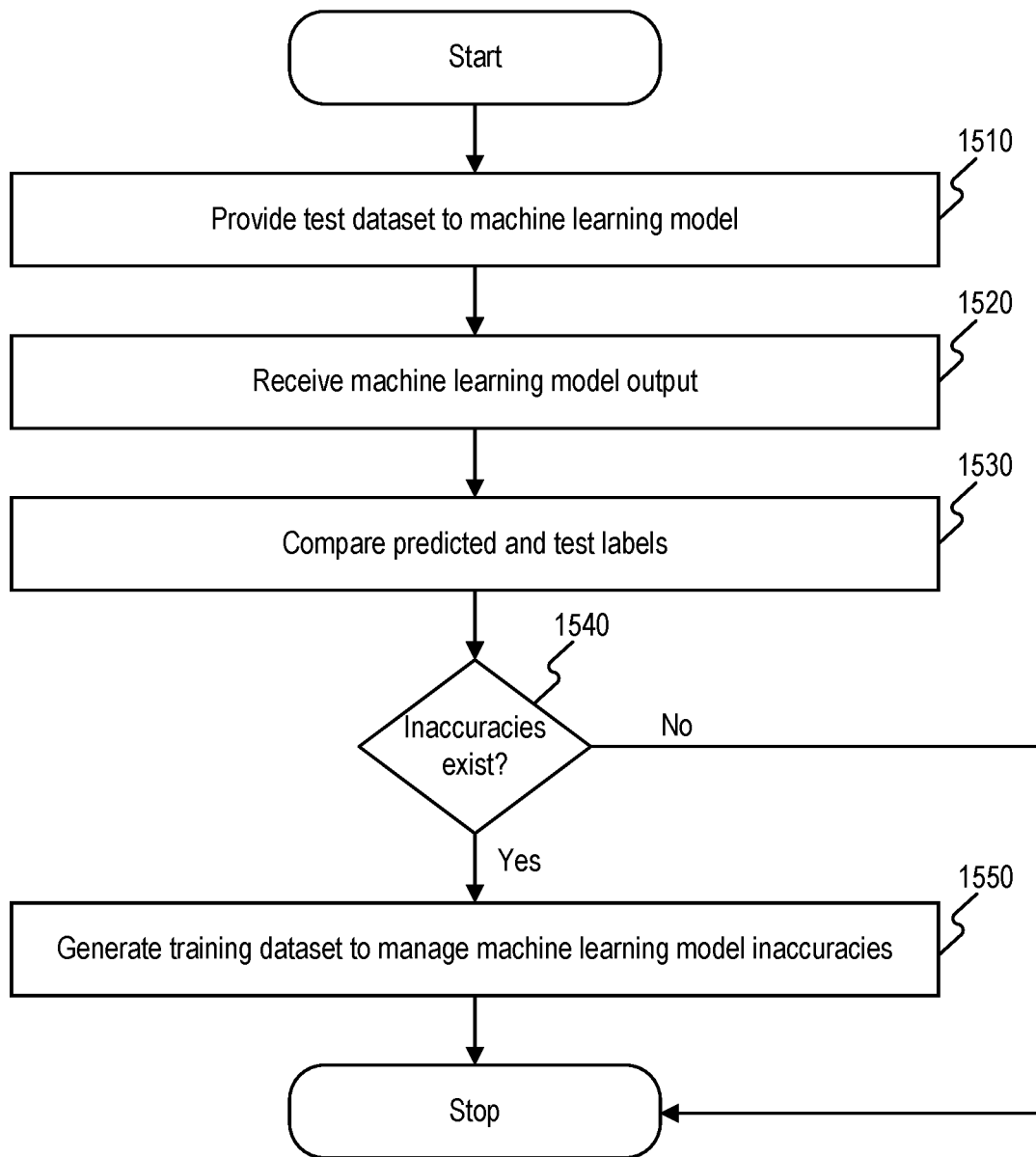
FIG. 15 is a flowchart depicting operations of an exemplary method for closed loop evaluation and resolution of bias of trained machine learning models, according to some embodiments of the present disclosure.

FIG. 15 is a flowchart depicting operations of an exemplary method 1500 for closed loop evaluation and resolution of bias of trained machine learning (ML) models, according to some embodiments. The steps of method 1500 may be performed by computing device 400 for purposes of illustration. It will be appreciated that the illustrated method 1500 may be altered to modify the order of steps and to include additional steps.

In step 1510, system 100 may provide test dataset 153 as input to a machine learning (ML) model included in models 151. Test dataset 153 may include training images uploaded by a user of GUI tool 300, such as images 141. Test dataset 153 may also include images 210 generated by data generator 114 as part of synthetic dataset 200 and stored in training datasets 152. In some embodiments, test dataset 153 may include a mix of real image datasets and synthetic image datasets. System 100 may use the mix of images of different datasets (i.e., real datasets and synthetic datasets) to help ensure that the ML model being tested is not skewed in its behavior by determining performance metrics 154 of the ML model. In some embodiments, the performance metrics of an ML model may include any one or more of: classification accuracy, logarithmic loss, a confusion matrix, precision, recall, area under curve, or F1 score. System 100 may delegate the testing of models 151 to ML model manager 120. ML model manager 120 may provide test dataset 153 as input to an ML model and execute the model.

Test dataset 153 may include images consisting of objects with predetermined labels identifying various objects, including target objects and non-target objects. In some embodiments, the predetermined labels may identify conditions represented in training images. Conditions may include any type of pattern represented within training images, such as visual patterns, object placement, similarity among objects, lighting, metadata labels, time of day, descriptors of a person, etc.

Test dataset 153 may include predetermined labels with metadata information of the training images in test dataset 153. In some embodiments, the predetermined labels may be manually associated with the training images of test dataset 153. In some embodiments, system 100 may request ML model manager 120 to train an ML model of models 151 based on the training images and the set of predetermined labels. In some embodiments, the predetermined labels may be labels predicted by the ML model in previous iterations of testing the ML model using test dataset 153.

In some embodiments, system 100 may re-test an ML model using test dataset 153 that system 100 has tested in previous iterations of testing the ML model. System 100 may conduct a re-test if the test results of previous iterations were outside target performance indicators. In some embodiments, a test result may be outside target performance indicators if one or more performance metrics associated with the test result have values below predetermined thresholds. For example, if the accuracy metric of a test result is below a predetermined threshold, then the test result may be determined to be outside target performance indicators.

System 100 may re-test an ML model using test dataset 153 as part of closed-loop testing and to help refine the ML model. In some embodiments, system 100 may re-test the ML model using a new test dataset. The new test dataset may be supplied by a user of GUI tool 300 to be included in test dataset 153 to train and calibrate the ML model.

In step 1520, system 100 may receive output from the ML model executed using test dataset 153. The ML model output may include predicted labels associated with the training images of test dataset 153. The predicted labels constitute the predictions made by the ML model on test dataset 153 input by identifying contents of the images in test dataset 153. For example, the predicted labels may include identifying objects and conditions in the training images of test dataset 153. Conditions of training images may include the surrounding environment, such as the background and foreground of objects, object placement, orientation overlap, and occlusion levels of objects in the training images of test dataset 153.

In step 1530, system 100 may compare the predicted labels associated with the training images of test dataset 153 to predetermined labels associated with the same images. System 100 may compare each label individually (e.g., compare the actual label value) or may compare indices (e.g., compare an assigned numerical value representing each label value) of predicted labels and predetermined labels.

In step 1540, system 100 may check for inaccuracies of an ML model performance in predicting labels associated with training images of test dataset 153. System 100 may detect inaccuracies based on differences between the predicted labels determined in step 1530 and the predetermined labels received in step 1510. Inaccuracies may include mislabeling objects and conditions associated with the training images of test dataset 153 by the ML model. Inaccuracies may also include unrecognized objects and conditions associated with the training images of test dataset 153. In some embodiments, an ML model may be identified as being inaccurate if it has over a predetermined threshold number of errors. For example, an ML model may be identified as being inaccurate if it has more than 5% errors in the predicted labels.

If there are no inaccuracies in the ML model's performance, then the method may terminate. In some embodiments, if the ML model's performance is within the predetermined accuracy threshold, then it may be considered to not have any inaccuracies for purposes of step 1540.

If there are inaccuracies in the ML model's performance (meaning that the number of errors exceeds the accuracy threshold for the ML model), then method 1500 may proceed to step 1550. In step 1550, system 100 may generate a new training dataset of images to include or may replace existing training images in training datasets 152. System 100 may generate new training images with characteristics of objects and conditions of new training images determined based on the detected inaccuracies in step 1540.

System 100 may generate new training images that include variations of characteristics of objects represented by object variables 143 and associated with the mislabeled or unrecognized object. Object variables 143 may include any one or more of: object size, shape, aspect ratio, texture, orientation, material, number, or color. In some embodiments, system 100 may generate new training images that include variations of one or more conditions (e.g., environment characteristics 166, camera characteristics 167, lighting characteristics 168). In some embodiments, the variations in the new training images may be associated with the degree of overlap among objects represented in the new training images.

In some embodiments, system 100 may generate a new training dataset of new training images by varying established semantic relationships between mislabeled or unrecognized objects and their surroundings. System 100 may adjust the surroundings by adjusting the relationships of mislabeled or unidentified objects with other correctly identified objects (both target objects and non-target objects). The varied relationships may include adjustment of distance and orientation between objects. In some embodiments, system 100 may vary the relationships with the surroundings by varying the environments (e.g., environments 145) in the new training images. System 100 may also vary a clutter level associated with the new training images. Clutter may be defined by a number of objects in the training images, an amount of visibility of each object (i.e., how much of an object is visible), an angle of visibility of each object in the training images, etc.

In some embodiments, system 100 may make visual variations in the new training images but may maintain the meaning of objects and relationships. For example, system 100 may transform an image of a cat into a blue color cat or add wings but still have the cat features of whiskers and pointed ears. System 100 may need such visually varied training images to recognize and identify objects in images with objects in unnatural conditions, such as a cat in a costume for Halloween.

System 100 may train models 151 based on the training images and a set of predetermined training labels. System 100 may also re-test models 151 using a new test dataset. System 100 may continuously generate training datasets by training models 151 based on the generated training datasets and re-testing models 151 until they perform with an accuracy level of at least a predetermined accuracy level.

The newly generated images may be used to continue refining training of models 151. Accordingly, system 100 may serve as an active feedback loop to automatically identify weaknesses in the capabilities of a trained model and quickly and automatically develop a refined dataset to update training datasets 152 to remedy performance weakness of the trained model.

As an example, if a model is trained to recognize open car doors and fails to identify an open car door represented in an image that includes a pedestrian obscuring a portion of the open car door, then system 100 may generate new training images that include variations of car doors with variations of pedestrian occlusions. The new images can be used to refine the training of the model to improve its performance (i.e., to improve the model's accuracy in recognizing open car doors).

System 100 may evaluate if the revised test dataset with new the training images improves the performance of the ML model. If the ML model continues to perform below the expected benchmark, then method 1500 may repeat step 1550 to generate new training images. System 100 may store the performance benchmark of the ML model as performance metrics 154 in model repository 150.

In some embodiments, a non-transitory, computer-readable medium includes instructions that when executed by at least one processing device, may cause the at least one processing device to perform a method. In some embodiments, the method may be performed by computing device 400. In some embodiments, the at least one processing device may include a central processing unit (CPU), a graphics processing unit (GPU), a field programmable gate array (FPGA), an application specific integrated circuit (ASIC), a digital signal processor (DSP), or other circuitry configured to perform instructions.

In some embodiments, the method may include providing to a machine learning model a test dataset including a plurality of images. In some embodiments, the machine learning model may be stored in models 151 of model repository 150. In some embodiments, the test dataset may be stored in test datasets 153 of model repository 150. In some embodiments, the test dataset may be provided to the machine learning model by ML model manager 120.

In some embodiments, the plurality of images of the test dataset may be synthetically generated. In some embodiments, the synthetically generated dataset may include one or more images 210 from synthetic dataset 200. In some embodiments, the test dataset may include all synthetic images or a mix of real images and synthetic images. In some embodiments, some test datasets may include all synthetic images and other test datasets may include all real images. To properly evaluate the ML model, the ML model should be tested on a combination of synthetic images and real images, to help ensure that there is not something in the synthetic images (e.g., a portion of a synthetic image that is rendered in a particular manner) that provides testing metrics that are different from "real world" testing metrics. In some embodiments, the plurality of images of the test dataset may be synthetically generated and include variations of one or more target objects. In some embodiments, the variations may be determined as described above in connection with FIGS. 3 and 5-12.

In some embodiments, the variations may be associated any one or more of: object size, object shape, object orientation, a degree of overlap with other objects, an occlusion level among objects, a clutter level around the one or more target objects, an environment in which the one or more target objects are represented, one or more lighting characteristics, or one or more virtual camera characteristics. In some embodiments, the variations may be determined as described above in connection with FIGS. 3 and 5-12.

In some embodiments, the method may include receiving from the machine learning model an output including one or more predicted labels associated with each of the plurality of images. In some embodiments, the predicted labels may be stored as performance metrics 154 associated with the machine learning model in model repository 150.

In some embodiments, the method may include comparing the one or more predicted labels associated with each of the plurality of images to a set of predetermined test labels associated with the plurality of images. In some embodiments, the predetermined test labels may be stored with the associated test datasets in test datasets 153 in model repository 150.

In some embodiments, the method may include detecting one or more inaccuracies associated with the machine learning model performance based on observed differences between the one or more predicted labels and the set of predetermined test labels. In some embodiments, the inaccuracies may be detected based on a performance metric of the machine learning model. For example, inaccuracies may be detected by an accuracy metric of the machine learning model being below a predetermined threshold.

In some embodiments, the method may include automatically generating a training dataset, including a plurality of training images, wherein one or more image characteristics associated with the plurality of training images are determined based on the detected one or more inaccuracies. In some embodiments, the generated training dataset may be stored in training datasets 152 of model repository 150.

In some embodiments, the detected one or more inaccuracies may include at least one of: a mislabeled object, an unrecognized object, mislabeled conditions, or an unrecognized condition associated with at least one of the plurality of images included in the test dataset. In some embodiments, the plurality of training images may be generated to include variations determined based on one or more characteristics associated with the mislabeled or unrecognized object or condition.

In some embodiments, the variations may be associated with any one or more of: object size, shape, aspect ratio, texture, orientation, material, number, or color. In some embodiments, the variations may include variations of objects that the ML model failed to properly identify during a prior test. In some embodiments, the variations may be associated with one or more of a degree of overlap or a degree of occlusion among objects represented in the plurality of training images. In some embodiments, the variations may be associated with environments in which objects are represented within the plurality of training images. In some embodiments, the variations may be associated with a clutter level associated with the plurality of training images.

In some embodiments, the plurality of training images may be associated with a set of predetermined training labels. In some embodiments, the training labels may be generated to accompany the generated training dataset. In some embodiments, the predetermined training labels may identify objects represented in the plurality of training images. In some embodiments, the objects represented in the plurality of training images may include target objects and/or non-target objects. In some embodiments, the predetermined training labels may identify conditions represented in the plurality of training images. In some embodiments, the conditions may include any type of pattern represented in one or more training images. For example, the pattern may include any one or more of: visual patterns, object placements, similarity among objects, lighting, metadata labels, time of day, or descriptors of a person.

In some embodiments, the method may include training the machine learning model based on the plurality of training images and the set of predetermined training labels. In some embodiments, the method may include re-testing the machine learning model relative to the test dataset. In some embodiments, the method may include re-testing the machine learning model relative to a new test dataset. In some embodiments, re-testing the machine learning model in this manner may constitute closed-loop testing and model refinement. In some embodiments, the new test dataset may be augmented with different image characteristics. For example, images in the new test dataset may include lower lighting characteristics or a different camera resolution.

In some embodiments, the method may include training the machine learning model based on the plurality of training images and the set of predetermined training labels. In some embodiments, the method may include re-testing the machine learning model relative to a new test dataset. In some embodiments, the method may include continuing to generate training datasets, training the machine learning model based on the generated training datasets, and re-testing the machine learning model until the machine learning model performs with an accuracy level of at least a predetermined accuracy level.

Embodiments described above may be implemented, in part, through the use of machine-learning or artificial intelligence algorithms. For example, some such algorithms may be learning models (supervised or unsupervised) that attempt to explain the significance of dependent variables based on explanatory variables. As examples, such algorithms may be prediction (e.g., linear regression) algorithms, classification (e.g., decision trees, k-nearest neighbors) algorithms, time-series forecasting (e.g., regression-based) algorithms, association algorithms, clustering algorithms (e.g., K-means clustering), or Bayesian methods (e.g., Naïve Bayes, Bayesian model averaging, Bayesian adaptive trials). Additionally, statistical algorithms may be implemented such as dimensionality reduction, hypothesis testing, one-way analysis of variance (ANOVA) testing, principal component analysis, conjoint analysis, neural networks, decision trees, ensemble methods, and other techniques. The system may further use generative models (such as generative adversarial networks) to generate datasets (including training and test datasets).

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a communication interface method to send data via the communication interface. A machine or computer readable storage medium may cause a machine to perform the functions or operations described and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces with any of a hardwired, wireless, optical, or similar medium to communicate with another device, such as a memory bus interface, a processor bus interface, an Internet connection, a disk controller, and the like. The communication interface may be configured by providing configuration parameters and/or sending signals to prepare the communication interface to provide a data signal describing the software content. The communication interface may be accessed via one or more commands or signals sent to the communication interface.

The present disclosure also relates to a system for performing the operations herein. This system may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions, or the specific components or modules illustrated in the figures and described herein. Other embodiments may include different computer-executable instructions or components having more or less functionality than illustrated and described herein.

Computer programs based on the written description and methods of this specification are within a software developer's skill. The various programs or program modules may be created using a variety of programming techniques. For example, program sections or program modules may be designed by means of JavaScript, Scala, Python, Java, C, C++, assembly language, or any such programming languages, as well as data encoding languages (such as XML, JSON, etc.), query languages (such as SQL), presentation-related languages (such as HTML, CSS, etc.) and data transformation language (such as XSL). One or more of such software sections or modules may be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A non-transitory, computer-readable medium including instructions that when executed by at least one processing device, cause the at least one processing device to provide on a display at least one graphical user interface configured to facilitate generation of a synthetic dataset including a plurality of images, the at least one graphical user interface comprising:
   a dataset size selector configured to receive a size input from a user indicative of a number of images to generate and include in the plurality of images of the synthetic dataset;

a target object type selector configured to receive a target object type input from the user indicative of at least one selected target object type to feature in the synthetic dataset;

one or more image parameter variability controls configured to receive one or more variability inputs from the user indicative of at least one variation to include in the synthetic dataset relative to target object representations generated based on the at least one selected target object type;

a dataset generation control configured to receive an initiate-generation input from the user and, in response, initiate generation of an output including the synthetic dataset, wherein the synthetic dataset is generated according to the size input, target object type input, and variability input received from the user; and at least one preview window configured to show to the user one or more samples from the synthetic dataset to be generated based on the at least one selected target object type and the one or more variability inputs, wherein the one or more samples from the synthetic dataset to be generated are updated after receiving at least one new input from the user.

2. The non-transitory computer readable medium of claim 1, wherein each of the one or more variability inputs relates to at least one variable characteristic associated with target object representations generated based on the at least one selected target object type.

3. The non-transitory computer readable medium of claim 2, wherein the at least one variable characteristic includes at least one of target object size, shape, aspect ratio, texture, orientation, material, number, or color.

4. The non-transitory computer readable medium of claim 2, wherein the at least one variable characteristic includes at least one of a degree of overlap among target object representations, a degree of overlap between target objects and non-target objects, or a degree of occlusion relative to target object representations.

5. The non-transitory computer readable medium of claim 2, wherein the at least one variable characteristic includes a number of species objects corresponding to a genus associated with the at least one selected target object type.

6. The non-transitory computer readable medium of claim 2, wherein each variable characteristic is associated with an independent variability control.

7. The non-transitory computer readable medium of claim 1, wherein the one or more image parameter variability controls include at least one of a drop-down menu, a virtual slider bar, one or more radio buttons, one or more virtual buttons, or a text entry field.

8. The non-transitory computer readable medium of claim 1, wherein the one or more image parameter variability controls provided on the at least one graphical user interface are selectively provided based on the target object type input received from the user.

9. The non-transitory computer readable medium of claim 1, wherein the one or more image parameter variability controls enable the user to select variation ranges associated with the at least one variation to include in the synthetic dataset relative to target object representations generated based on the at least one selected target object type.

10. The non-transitory computer readable medium of claim 1, wherein the dataset size selector includes a text entry field.

11. The non-transitory computer readable medium of claim 1, wherein the dataset size selector includes a virtual slider bar.

12. The non-transitory computer readable medium of claim 1, wherein the at least one graphical user interface further includes a non-target object type selector configured to receive a non-target object type input from the user indicative of at least one selected non-target object type to feature in the synthetic dataset, and wherein the one or more image parameter variability controls are further configured to receive one or more variability inputs from the user indicative of at least one variation to include in the synthetic dataset relative to non-target object representations generated based on the at least one selected non-target object type.

13. The non-transitory computer readable medium of claim 1, wherein the at least one graphical user interface further includes an environment selector configured to receive an environment type input from the user indicative of an environment constraint to apply in generating the synthetic dataset.

14. The non-transitory computer readable medium of claim 13, wherein the environment type input is one of indoor, outdoor, or mixed indoor/outdoor.

15. The non-transitory computer readable medium of claim 13, wherein the environment type input is one of urban or rural.

16. The non-transitory computer readable medium of claim 1, wherein the one or more image parameter variability controls are further configured to receive one or more variability inputs from the user indicative of at least one variation to include in the synthetic dataset relative to one or more general image properties.

17. The non-transitory computer readable medium of claim 16, wherein the one or more general image properties include a degree of clutter.

18. The non-transitory computer readable medium of claim 16, wherein the one or more general image properties include a time of day.

19. The non-transitory computer readable medium of claim 16, wherein the one or more general image properties include a simulated camera parameter.

20. The non-transitory computer readable medium of claim 19, wherein the simulated camera parameter includes a camera orientation, a camera resolution, a camera field of view, a camera focal length, a camera aspect ratio, a camera sensor size, a camera sensor type, a camera wavelength sensitivity, or a camera height.

21. The non-transitory computer readable medium of claim 19, wherein the simulated camera parameter is automatically derived from at least one actual image uploaded via the at least one graphical user interface.

22. The non-transitory computer readable medium of claim 16, wherein the one or more general image properties include a lighting property.

23. The non-transitory computer readable medium of claim 22, wherein the lighting property includes a type of light source, a brightness level, a lighting color, a lighting direction, or a number of light sources.

24. The non-transitory computer readable medium of claim 1, wherein the output further includes an index of the images included in the generated synthetic dataset.

25. The non-transitory computer readable medium of claim 24, wherein the index is included in at least one electronic file.

26. The non-transitory computer readable medium of claim 24, wherein the index includes an identification of target objects included in each of the plurality of images of the generated synthetic dataset.

27. The non-transitory computer readable medium of claim 24, wherein the index includes an identification of non-target objects included in each of the plurality of images of the generated synthetic dataset.

28. The non-transitory computer readable medium of claim 1, wherein the at least one preview window is shown on the display together with at least the target object selector and the one or more image parameter variability controls.

29. The non-transitory computer readable medium of claim 1, wherein the one or more samples are shown on the display simultaneously.

30. The non-transitory computer readable medium of claim 1, wherein the one or more samples are navigable based on user input.

31. The non-transitory computer readable medium of claim 1, wherein the synthetic dataset is generated based on one or more semantic relationships among objects.

32. The non-transitory computer readable medium of claim 1, wherein the target object type selector includes an image upload interface.

33. The non-transitory computer readable medium of claim 32, wherein the image upload interface enables the user to identify one or more sample images for upload, and in response, the at least one processing device analyzes the one or more sample images and automatically identifies in the one or more sample images the selected target object type to feature in the synthetic dataset.

34. The non-transitory computer readable medium of claim 33, wherein the at least one processing device stores the automatically identified selected target object type in a database.

35. The non-transitory computer readable medium of claim 1, wherein the target object type input indicates a human, and wherein the one or more image parameter variability controls enable anatomical variation in the synthetic dataset of one or more of eye color, eye shape, hair color, hair length, hair texture, face shape, weight, gender, height, skin tone, facial hair, or clothing.

36. The non-transitory computer readable medium of claim 1, wherein the target object type selector is configured to receive a custom object type specified by the user.

37. The non-transitory computer readable medium of claim 36, wherein the custom object type is defined based on one or more sample images uploaded via the at least one graphical user interface.

38. The non-transitory computer readable medium of claim 36, wherein the custom object type is defined based on one or more data files uploaded via the at least one graphical user interface.

39. The non-transitory computer readable medium of claim 1, wherein the at least one graphical user interface further includes an output location control configured to receive from the user a location in an electronic file structure where the generated synthetic dataset is to be stored.

40. A non-transitory, computer-readable medium including instructions that when executed by at least one processing device, cause the at least one processing device to provide on a display at least one graphical user interface configured to facilitate generation of a synthetic dataset including a plurality of images, the at least one graphical user interface comprising:
  a dataset size selector configured to receive a size input from a user indicative of a number of images to generate and include in the plurality of images of the synthetic dataset;
  a target object type selector including an image upload interface, wherein:
    the target object type selector is configured to receive a target object type input from the user indicative of at least one selected target object type to feature in the synthetic dataset; and
    the image upload interface enables the user to identify one or more sample images for upload, and in response, the at least one processing device analyzes the one or more sample images and automatically identifies in the one or more sample images the selected target object type to feature in the synthetic dataset;
  one or more image parameter variability controls configured to receive one or more variability inputs from the user indicative of at least one variation to include in the synthetic dataset relative to target object representations generated based on the at least one selected target object type; and
  a dataset generation control configured to receive an initiate-generation input from the user and, in response, initiate generation of an output including the synthetic dataset, wherein the synthetic dataset is generated according to the size input, target object type input, and variability input received from the user.

41. The non-transitory computer readable medium of claim 40, wherein each of the one or more variability inputs relates to at least one variable characteristic associated with target object representations generated based on the at least one selected target object type.

42. The non-transitory computer readable medium of claim 41, wherein the at least one variable characteristic includes at least one of target object size, shape, aspect ratio, texture, orientation, material, number, or color.

43. The non-transitory computer readable medium of claim 41, wherein the at least one variable characteristic includes at least one of a degree of overlap among target object representations, a degree of overlap between target objects and non-target objects, or a degree of occlusion relative to target object representations.

44. The non-transitory computer readable medium of claim 41, wherein the at least one variable characteristic includes a number of species objects corresponding to a genus associated with the at least one selected target object type.

45. The non-transitory computer readable medium of claim 41, wherein each variable characteristic is associated with an independent variability control.

46. The non-transitory computer readable medium of claim 40, wherein the one or more image parameter variability controls include at least one of a drop-down menu, a virtual slider bar, one or more radio buttons, one or more virtual buttons, or a text entry field.

47. The non-transitory computer readable medium of claim 40, wherein the one or more image parameter variability controls provided on the at least one graphical user interface are selectively provided based on the target object type input received from the user.

48. The non-transitory computer readable medium of claim 40, wherein the one or more image parameter variability controls enable the user to select variation ranges associated with the at least one variation to include in the synthetic dataset relative to target object representations generated based on the at least one selected target object type.

49. The non-transitory computer readable medium of claim 40, wherein the dataset size selector includes a text entry field.

50. The non-transitory computer readable medium of claim 40, wherein the dataset size selector includes a virtual slider bar.

51. The non-transitory computer readable medium of claim 40, wherein the at least one graphical user interface further includes a non-target object type selector configured to receive a non-target object type input from the user indicative of at least one selected non-target object type to feature in the synthetic dataset, and wherein the one or more image parameter variability controls are further configured to receive one or more variability inputs from the user indicative of at least one variation to include in the synthetic dataset relative to non-target object representations generated based on the at least one selected non-target object type.

52. The non-transitory computer readable medium of claim 40, wherein the at least one graphical user interface further includes an environment selector configured to receive an environment type input from the user indicative of an environment constraint to apply in generating the synthetic dataset.

53. The non-transitory computer readable medium of claim 52, wherein the environment type input is one of indoor, outdoor, or mixed indoor/outdoor.

54. The non-transitory computer readable medium of claim 52, wherein the environment type input is one of urban or rural.

55. The non-transitory computer readable medium of claim 40, wherein the one or more image parameter variability controls are further configured to receive one or more variability inputs from the user indicative of at least one variation to include in the synthetic dataset relative to one or more general image properties.

56. The non-transitory computer readable medium of claim 55, wherein the one or more general image properties include a degree of clutter.

57. The non-transitory computer readable medium of claim 55, wherein the one or more general image properties include a time of day.

58. The non-transitory computer readable medium of claim 55, wherein the one or more general image properties include a simulated camera parameter.

59. The non-transitory computer readable medium of claim 58, wherein the simulated camera parameter includes a camera orientation, a camera resolution, a camera field of view, a camera focal length, a camera aspect ratio, a camera sensor size, a camera sensor type, a camera wavelength sensitivity, or a camera height.

60. The non-transitory computer readable medium of claim 58, wherein the simulated camera parameter is automatically derived from at least one actual image uploaded via the at least one graphical user interface.

61. The non-transitory computer readable medium of claim 55, wherein the one or more general image properties include a lighting property.

62. The non-transitory computer readable medium of claim 61, wherein the lighting property includes a type of light source, a brightness level, a lighting color, a lighting direction, or a number of light sources.

63. The non-transitory computer readable medium of claim 40, wherein the output further includes an index of the images included in the generated synthetic dataset.

64. The non-transitory computer readable medium of claim 63, wherein the index is included in at least one electronic file.

65. The non-transitory computer readable medium of claim 63, wherein the index includes an identification of target objects included in each of the plurality of images of the generated synthetic dataset.

66. The non-transitory computer readable medium of claim 63, wherein the index includes an identification of non-target objects included in each of the plurality of images of the generated synthetic dataset.

67. The non-transitory computer readable medium of claim 40, wherein the at least one graphical user interface further includes at least one preview window configured to show to the user one or more samples from the synthetic dataset to be generated based on the at least one selected target object type and the one or more variability inputs.

68. The non-transitory computer readable medium of claim 67, wherein the at least one preview window is shown on the display together with at least the target object selector and the one or more image parameter variability controls.

69. The non-transitory computer readable medium of claim 67, wherein the one or more samples from the synthetic dataset to be generated are updated after receiving at least one new input from the user.

70. The non-transitory computer readable medium of claim 67, wherein the one or more samples are shown on the display simultaneously.

71. The non-transitory computer readable medium of claim 67, wherein the one or more samples are navigable based on user input.

72. The non-transitory computer readable medium of claim 40, wherein the synthetic dataset is generated based on one or more semantic relationships among objects.

73. The non-transitory computer readable medium of claim 40, wherein the at least one processing device stores the automatically identified selected target object type in a database.

74. The non-transitory computer readable medium of claim 40, wherein the target object type input indicates a human, and wherein the one or more image parameter variability controls enable anatomical variation in the synthetic dataset of one or more of eye color, eye shape, hair color, hair length, hair texture, face shape, weight, gender, height, skin tone, facial hair, or clothing.

75. The non-transitory computer readable medium of claim 40, wherein the target object type selector is configured to receive a custom object type specified by the user.

76. The non-transitory computer readable medium of claim 75, wherein the custom object type is defined based on one or more sample images uploaded via the at least one graphical user interface.

77. The non-transitory computer readable medium of claim 75, wherein the custom object type is defined based on one or more data files uploaded via the at least one graphical user interface.

78. The non-transitory computer readable medium of claim 40, wherein the at least one graphical user interface further includes an output location control configured to receive from the user a location in an electronic file structure where the generated synthetic dataset is to be stored.

\* \* \* \* \*